United States Patent
Jeon et al.

(10) Patent No.: US 9,210,436 B2
(45) Date of Patent: Dec. 8, 2015

(54) DISTRIBUTED VIDEO CODING/DECODING METHOD, DISTRIBUTED VIDEO CODING/DECODING APPARATUS, AND TRANSCODING APPARATUS

(75) Inventors: Byeungwoo Jeon, Seongnam-si (KR); Dohyeong Kim, Suwon-si (KR); Doug-Young Suh, Seongnam-si (KR); Chulkeun Kim, Gwangju-si (KR); Donggyu Sim, Seoul (KR); Kyungyeon Min, Chungji-si (KR); Seanae Park, Uijeongbu-si (KR)

(73) Assignee: Sungkyunkwan University Foundation For Corporate Collaboration, Suwon-si (KR)

( * ) Notice: Subject to any disclaimer, the term of this patent is extended or adjusted under 35 U.S.C. 154(b) by 665 days.

(21) Appl. No.: 13/521,552

(22) PCT Filed: Jan. 11, 2011

(86) PCT No.: PCT/KR2011/000194
§ 371 (c)(1),
(2), (4) Date: Oct. 15, 2012

(87) PCT Pub. No.: WO2011/084037
PCT Pub. Date: Jul. 14, 2011

(65) Prior Publication Data
US 2013/0044183 A1 Feb. 21, 2013

(30) Foreign Application Priority Data

Jan. 11, 2010 (KR) .................. 10 2010 0002080
Jan. 13, 2010 (KR) .................. 10 2010 0002926
Feb. 11, 2010 (KR) .................. 10 2010 0012743
Mar. 25, 2010 (KR) .................. 10 2010 0026598

(51) Int. Cl.
*H04N 9/47* (2006.01)
*H04N 11/02* (2006.01)
(Continued)

(52) U.S. Cl.
CPC ........... *H04N 19/395* (2014.11); *H04N 19/103* (2014.11); *H04N 19/124* (2014.11);
(Continued)

(58) Field of Classification Search
CPC ..... H04N 19/395; H04N 19/61; H04N 19/46; H04N 19/51; H04N 19/119; H04N 19/513
USPC ........................ 375/240.01–240.29
See application file for complete search history.

(56) References Cited

U.S. PATENT DOCUMENTS

2007/0013561 A1* 1/2007 Xu et al. .................. 341/50
2008/0291065 A1* 11/2008 Lu et al. .................. 341/107
(Continued)

FOREIGN PATENT DOCUMENTS

KR     1992-0020461 A     11/1992
KR     10-0728031 B1      6/2007
(Continued)

OTHER PUBLICATIONS

Korean Office Action issued May 6, 2011 in counterpart Korean Application No. KR 10-2010-0002080 (4 pages, in Korean).
Korean Office Action issued Jul. 12, 2011 in counterpart Korean Application No. KR 10-2010-0026598 (4 pages, in Korean).
Xin Huang, et al. "Improved Side Information Generation for Distributed Video Coding," Multimedia Signal Processing, 2008 IEEE 10th Workshop, pp. 223-228, Oct. 2008 (6 pages, in English).
International Search Report for PCT/KR2011/000194 issued Jul. 14, 2011 (6 pages with English language translation).

*Primary Examiner* — Andy Rao
*Assistant Examiner* — Jared Walker
(74) *Attorney, Agent, or Firm* — NSIP Law

(57) ABSTRACT

Disclosed are a distributed video encoding/decoding method and a distributed video encoding/decoding apparatus, which can improve loss resilience and the quality of service. The distributed video encoding method first involves checking the state of a channel, determining a channel coding rate and the size of video data to be transmitted based on the checked state of a channel, determining the number of motion prediction performance steps based on the determined size of video data to be transmitted, encoding the video data to be transmitted by performing motion predictions according to the determined number of motion prediction performance steps, and channel-coding the encoded video data according to the determined channel coding rate. Accordingly, it is possible to improve loss resilience, even without additionally occupying network resources, thereby being capable of reducing the probability of decoding failure.

18 Claims, 32 Drawing Sheets

(51) Int. Cl.
  *H04N 11/04*   (2006.01)
  *H04N 19/30*   (2014.01)
  *H04N 19/103*  (2014.01)
  *H04N 19/124*  (2014.01)
  *H04N 19/164*  (2014.01)
  *H04N 19/65*   (2014.01)
  *H04N 19/40*   (2014.01)
  *H04N 19/597*  (2014.01)

(52) U.S. Cl.
  CPC ............ *H04N19/164* (2014.11); *H04N 19/40* (2014.11); *H04N 19/65* (2014.11); *H04N 19/30* (2014.11); *H04N 19/597* (2014.11)

(56) References Cited

U.S. PATENT DOCUMENTS

| | | | |
|---|---|---|---|
| 2009/0122868 A1* | 5/2009 | Chen et al. | 375/240.22 |
| 2009/0238270 A1* | 9/2009 | Nishi | 375/240.12 |
| 2009/0245372 A1* | 10/2009 | Yamasaki | 375/240.15 |

FOREIGN PATENT DOCUMENTS

| | | |
|---|---|---|
| KR | 10-2007-0084686 A | 8/2007 |
| KR | 10-2010-0023781 | 3/2010 |

* cited by examiner

Key frame    Side information    Key frame

<Motion vector in generating side
information according to related art>

⟵——— x1/2 =⟵-----

FIG. 3
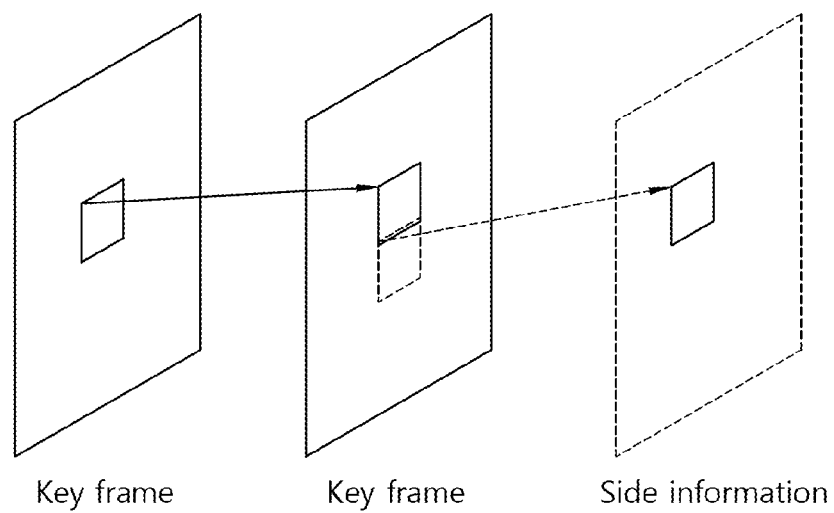
<Motion vector in generating side
information according to related art>
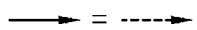

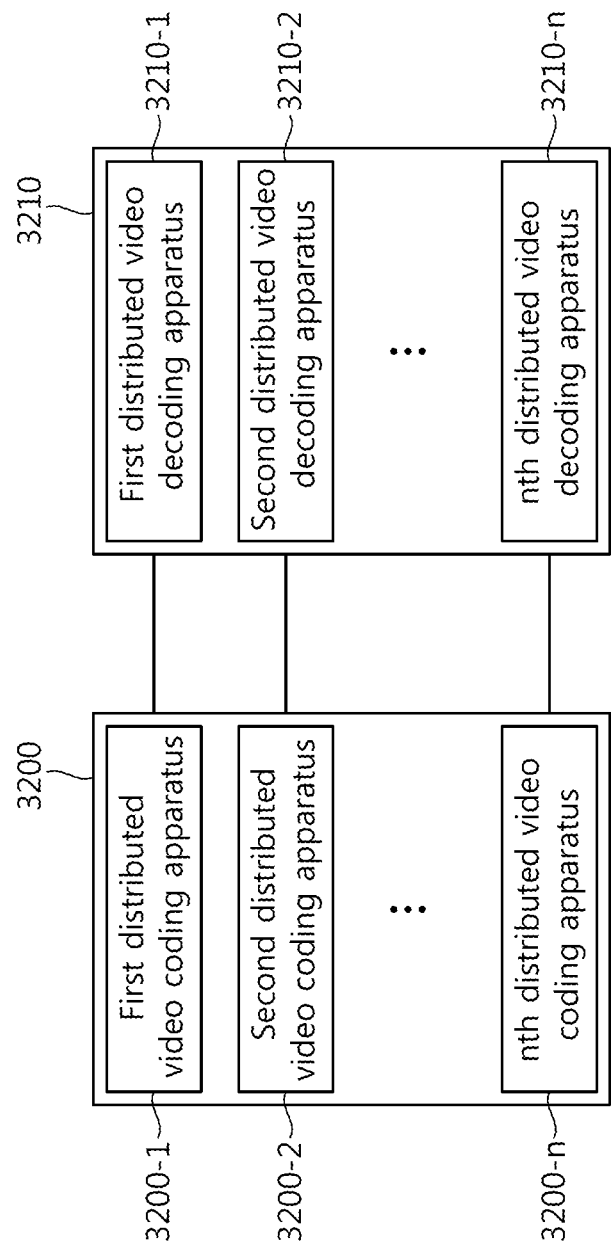

DISTRIBUTED VIDEO CODING/DECODING METHOD, DISTRIBUTED VIDEO CODING/DECODING APPARATUS, AND TRANSCODING APPARATUS

CROSS-REFERENCE TO RELATED APPLICATIONS

This application is a 35 U.S.C. 371 National Stage of International Application No. PCT/KR2011/000194, filed Jan. 11, 2011 and published as WO2011/084037 on Jul. 14, 2011, which claims the benefit of Korean Patent Application No. 10-2010-0002080, filed on Jan. 11, 2010, Korean Patent Application No. 10-2010-0002926, filed on Jan. 13, 2010, Korean Patent Application No. 10-2010-0012743, filed on Feb. 11, 2010, and Korean Patent Application No. 10-2010-0026598, filed on Mar. 25, 2010 the entire disclosures of which are incorporated herein by reference for all purposes.

TECHNICAL FIELD

The present invention relates to video encoding/decoding and, more particularly, to a distributed video encoding/decoding method, distributed video encoding/decoding apparatus, and a transcoding apparatus applicable to a distributed video coding technique.

BACKGROUND ART

Compression standards such as MPEG, H.26x, and the like, have been widely used as an effective compression technique for video players, video-on-demand (VOD) services, video calls, digital multimedia broadcasting (DMB), video transmission in a wireless mobile environment, and the like. The compression standards obtain a great gain in coding efficiency by removing temporal redundancy, and a typical method for reducing temporal redundancy is a motion estimation and compensation technique. However, the motion estimation and compensation technique requires a video encoder to perform a relatively large amount of calculation, disadvantageously increasing power consumption. Thus, reduction in complexity of an encoder toward low power consumption thereof has emerged as a critical technical issue in an environment having limited resources, such as a sensor network, or the like.

A distributed video coding (DVC) technique based on Slepian-Wolf theory and Wyner-Ziv theory has come to prominence as a method for remarkably reducing complexity of a video encoding apparatus. The Slepian-Wolf theory mathematically verifies that although sources having correlation are independently encoded, when decoding is performed thereon by linking them, the same coding gain as that obtained by predictively coding the respective sources in concert can be obtained. The Wyner-Ziv theory extends Slepian-Wolf theory corresponding to lossless compression to a case of lossy compression. The two theories theoretically propose a possibility of shifting a motion prediction and compensation for removing inter-frame temporal redundancy, a crucial factor of video coding, toward a decoding apparatus without causing a loss of a coding gain.

The Wyner-Ziv coding technique is a representative method of a distributed video coding technique whereby a decoding apparatus generates side information regarding a current frame by using similarity between restored neighbor frames, and upon regarding a difference between the generated side information and the current frame as virtual channel noise, the decoding apparatus receives a parity bit generated through channel coding in a encoding apparatus and cancels noise in the side information to restore the current frame.

Namely, the distributed video decoding technique enables a decoder to execute motion prediction, which causes the most amount of calculation in an encoder, to thus reduce complexity of the encoder. Namely, with this technique, the encoder independently encodes video frames and does not scan video frames to detect similarity between video frames as in the related art, thus reducing an amount of calculation of the encoder.

One of the most important things in relation to coding efficiency of a distributed video encoder and decoder to which the foregoing distributed video coding technique is prediction accuracy with respect to side information corresponding to a WZ frame and an error probability of a channel estimation in decoding a parity channel.

Namely, information used to generate a parity bit through channel coding in a distributed video encoder is an original WZ frame, and information used in performing channel decoding by using a transmitted parity bit in a distributed video decoder is side information corresponding to a predicted WZ frame. Thus, as similarity between the original WZ frame and the side information is higher, an amount of parity bits used for channel decoding may be reduced, and accordingly, a required amount of calculation is reduced.

However, in the related art distributed video encoding method, the encoder cannot know prediction accuracy of the side information generated in the decoder, so the encoder has no choice but to transmit a parity bit having a fixed size and quantization data to the decoder, and thus, there are limitations in enhancement of overall coding efficiency.

FIG. 1 is a view illustrating a configuration of an encoder 110 and a corresponding decoder 130 based on the related art Wyner-Ziv coding technique.

The encoder 110 based on the Wyner-Ziv coding technique classifies pictures of source video content into two types of picture. One type is a frame (referred to as a 'WZ frame', hereinafter) to be encoded according to a distributed video coding scheme and the other type is a picture (referred to as a 'key frame', hereinafter) to be coded according to the related art coding scheme, rather than the distributed video coding scheme.

Key frames are coded according to, for example, an H.265/AVC intra-coding scheme in a key frame coding unit 114 and transmitted to the decoder 130. A key frame decoding unit 133 of the decoder 130 corresponding to the encoder 110 based on the related art Wyner-Ziv coding scheme reconstructs the received key frames. A side information generating unit 134 generates side information corresponding to WZ frames by using the reconstructed key frames, and outputs the side information to a channel decoding unit 131.

Assuming a linear motion between key frames positioned before and after a current WZ frame, the side information generating unit 134 generates side information corresponding to a WZ frame to be reconstructed by using interpolation. According to circumstances, extrapolation may be used, but since noise of side information generated through interpolation is less than noise of side information generated through extrapolation, interpolation is used in most cases. Meanwhile, in order to encode the WZ frames, a quantization unit 112 of the encoder 110 performs quantization on the WZ frames and outputs quantization values of the WZ frames to a block unitizing unit 112. The block unitizing unit 111 classifies the input quantized values of the WZ frames by a certain coding unit. A channel coding unit 113 generates parity bits with respect to respective coding units by using a channel code.

The generated parity bits are temporarily stored in a parity buffer (not shown), and then, when the decoder 130 requests the parity bits through a feedback channel, the parity bits stored in the parity buffer are sequentially transmitted. The channel decoding unit 131 of FIG. 1 receives the parity bits transmitted from the encoder 110 and estimates quantized values. An image reconstruction unit 132 of FIG. 1 receives the quantized values estimated by the channel decoding unit 131 and dequantizes the received values to reconstruct WZ frames.

When the parity bits provided from the encoder 110 are not sufficient to guarantee successful decoding so decoding fails, the decoding unit 131 requests a transmission of more parity bits from the encoder 110 through a feedback channel, and this process is repeatedly performed until when decoding is successfully performed.

Due to the foregoing structure, the distributed video encoding method using a feedback channel is advantageous in that channel modeling is accurately performed but disadvantageous in that a transmission delay due to feedback is increased to degrade quality of service (QoS).

Meanwhile, in a distributed video encoding method (e.g., PRISM (Power-efficient, Robust high-compression, Syndrome-based Multimedia Coding) that does not use a feedback channel, channel modeling is performed through a classifier of a encoding apparatus, a bit rate is controlled by the classifier, and whether or not decoding has been successful is ascertained through a cyclic redundancy check (CRC).

Namely, in the distributed video encoding method not using a feedback channel, channel modeling is performed in the encoding apparatus, feedback is not required, thus advantageously reducing a transmission delay. However, since channel modeling is performed in the encoding apparatus, channel modeling is accurately performed.

Thus, in the distributed video encoding method not using a feedback channel, when a motion prediction is performed to supplement the foregoing shortcomings, the accuracy of channel modeling can be enhanced but complexity of the encoding apparatus is increased to dampen the advantages of the distributed video encoding method, and if a motion compensation is not performed, the accuracy of channel modeling is reduced to degrade compression efficiency.

In the foregoing distributed video coding technique, if a channel is lost during a data transmission, decoding of the data fails. In such a case, however, in the case of the distributed video coding using a feedback channel, an additional parity bit may be requested from the encoding apparatus to thereby successfully perform decoding. However, a delay due to feedback and a usage amount of network resources are disadvantageously increased. Or, in the case of the distributed video encoding method not using a feedback channel, quality is degraded due to a failure of decoding.

The related art method for compensating for a channel loss may be divided into a method of using channel coding and a retransmission method. The method of using channel coding is a method of transmitting a forward error correction (FEC) packet additionally when a channel loss is made, and the retransmission method is a method of transmitting a lost packet again. However, in both the method of using channel coding and the retransmission method, a larger amount of data than the original data desired to be transmitted should be transmitted, increasing a usage amount of network resources. Thus, the use of these methods is restricted when network resources are limited.

The distributed video encoding method based on the Wyner-Ziv theory is a technique of reconstructing a current WZ frame by correcting noise added to side information generated by a decoder by using a parity. Thus, as noise added to the generated side information is small, a required amount of parities is reduced, so, in order to have good performance in terms of rate distortion, it is important to properly generate side information without noise.

In the related art method for generating side information, a motion vector is estimated by using a block having a fixed size (e.g., 8×8) existing within a reconstructed key picture, and a motion vector of side information desired to be reconstructed is obtained from a motion vector between the reconstructed key frames in consideration of a distance between the frames. A decoding unit within a key frame indicated by the thusly obtained motion vector of the side information is generated as side information.

FIG. 2 is a view illustrating generation of side information using interpolation according to the related art. Specifically, FIG. 2 illustrates a process of obtaining a motion vector of side information to be reconstructed, from a motion vector obtained by using a block having a fixed size between reconstructed key frames, in which it can be seen that when a distance between frames is considered, a motion vector of side information is half of a motion vector between key frames.

FIG. 3 is a view illustrating generation of side information using extrapolation. Specifically, FIG. 3 illustrates a process of obtaining a motion vector of side information to be reconstructed, from a motion vector obtained by using a block having a fixed size between reconstructed key frames, in which it can be seen that when a distance between pictures is considered, motion vector of the side information is equal to the motion vector between the key frames.

In this manner, in case that the motion vector of the side information desired to be generated is obtained from the motion vector using a block having a fixed size existing in the reconstructed key frame, if a motion between frames is complicated, if a motion is not linearly changed, or if an object or a background abruptly disappears or appears, erroneous side information may be generated. In particular, when the size of the fixed block used to predict motion between the key frames is increased, accuracy of an obtained motion vector is similar to a motion of an actual image in a simple region such as a background, but it is not in a portion in which a complicated object exists.

Conversely, when the size of the fixed block used for predicting a motion between key frames is reduced, the number of pixels used to estimate a motion vector is reduced, causing that a motion vector obtained through a motion prediction between key frames is not congruent with a motion of an actual image. For this reason, 8×8 is generally used as a size of the block used for a motion prediction to generate side information in the related art.

In such a case, however, side information generated by motion prediction using the fixed block size contains a great amount of noise, so noise cannot be sufficiently canceled with a transmitted parity.

DISCLOSURE

Technical Problem

Therefore, a first object of the present invention is to provide a distributed video decoding apparatus using variable block motion prediction.

A second object of the present invention is to provide a distributed video decoding method using variable block motion prediction.

A third object of the present invention is to provide a distributed video encoding/decoding method capable of enhancing coding efficiency and reducing process complexity.

A fourth object of the present invention is to provide a distributed video encoding/decoding apparatus performing the distributed video encoding/decoding method.

A fourth object of the present invention is to provide a transcoder for coding an image, which has been encoded through the distributed video encoding method, such that it can be decoded in a general decoder.

A sixth object of the present invention is to provide a distributed video encoding/decoding method capable of enhancing loss resilience and quality of service (QoS).

A seventh object of the present invention is to provide a distributed video encoding/decoding apparatus capable of enhancing loss resilience and quality of service (QoS).

An eighth object of the present invention is to provide a video encoding method using a plurality of image capturing devices.

A ninth object of the present invention is to provide a video encoding method using a plurality of image capturing devices.

Technical Solution

A distributed video decoding apparatus using variable block motion prediction according to an aspect of the present invention to achieve the foregoing first object, includes: a key frame decoding unit configured to reconstruct a key frame transmitted from a key frame coding apparatus; a motion vector generating unit configured to determine a size of a block for performing motion prediction using the reconstructed key frame to generate a motion vector, and configured to output the generated motion vector; a side information generating unit configured to generate side information by using the reconstructed key frame and the generated motion vector; a channel code decoding unit configured to estimate a quantized value by using a parity bit transmitted from a distributed video encoding apparatus and the side information; and an image reconstruction unit configured to reconstruct a current frame as a target of distributed video decoding based on the quantized value estimated by the channel decoding unit and the side information. The motion vector generating unit may determine a plurality of blocks having different block sizes for the purpose of motion prediction of the side information, obtain motion vectors between the reconstructed key frames based on the determined blocks, and select a motion vector among the obtained motion vectors according to a predetermined criteria. The motion vector generating unit may include: a block size determining unit configured to determine a plurality of block sizes for the purpose of to motion prediction using the reconstructed key frame; a motion prediction performing unit configured to search a region of another key frame among the reconstructed key frames in order to discover a region congruent with a first block of one key frame among the reconstructed key frames, to thus find a second block most congruent with the first block, and generate a motion vector as a difference value between the first block and the second block, with respect to each of the plurality of block sizes; a motion vector storage unit configured to store the motion vectors generated by the motion prediction performing unit; and a motion vector selecting unit configured to measure similarity between a first block of one key picture and a second block of another key picture among the motion vectors, and configured to select a motion vector for a block size corresponding to the highest similarity. The motion vector selecting unit may measure the similarity by using any one of the sum of absolute difference (SAD), a mean absolute difference (MAD), and the sum of square difference (SSD) between the first block and the second block. The block size for performing the motion prediction may be at least one of 16×16, 16×8, 8×16, 8×8, 8×4, 4×8, and 4×4 block sizes. The block size for performing the motion prediction may be determined upon determining a change in a motion between the reconstructed key frames. When there is a little change in the motion between the reconstructed key frames, the block size determining unit may determine a block size for performing the motion prediction by at least one of the 16×16, 16×8, and 8×16 block sizes. When there is a significant change in the motion between the reconstructed key frames, the block size determining unit may determine a block size for performing the motion prediction by at least one of the 8×8, 8×4, 4×8, and 4×4 block sizes.

A distributed video decoding method using variable block motion prediction according to an aspect of the present invention to achieve the foregoing second object, includes: reconstructing a key frame transmitted from a key frame decoding apparatus; determining a block size for performing motion prediction using the reconstructed key frame to generate a motion vector; generating side information by using the reconstructed key frame and the generated motion vector; estimating a quantized value by using a parity bit transmitted from a distributed video encoding apparatus and the side information; and reconstructing a current frame as a target of distributed video decoding by using the estimated quantized value and the side information. The generating of a motion vector by determining a block size for performing motion prediction using the reconstructed key frame may include: determining a plurality of blocks having different sizes for the purpose of to motion prediction of the side information; obtaining motion vectors between the reconstructed key frames based on the plurality of determined blocks; and selecting a motion vector among the obtained motion vectors according to a predetermined criteria. The obtaining of motion vectors between the reconstructed key frames based on the plurality of determined blocks may include: searching for a region of another key frame among the reconstructed key frames in order to discover a region congruent with a first block of one key frame among the reconstructed key frames, to thus find a second block most congruent with the first block; and generating a motion vector as a difference value between the first block and the second block with respect to each of the plurality of block sizes. The selecting of a motion vector among the obtained motion vectors based on the predetermined criteria may include: measuring similarity between the first block of one key frame among the reconstructed key frames and the second block of another key frame among the reconstructed key frames with respect to the respective motion vectors; and selecting a motion vector between the first block and the second block having the highest similarity among similarities measured for the respective motion vectors between first blocks and second blocks. The similarity may be measured by using any one of the sum of absolute difference (SAD), a mean absolute difference (MAD), and the sum of square difference (SSD) between the first block and the second block. The block size for performing the motion prediction may be at least one of 16×16, 16×8, 8×16, 8×8, 8×4, 4×8, and 4×4 block sizes. The block size for performing the motion prediction may be determined upon determining a change in a motion between the reconstructed key frames. When there is a little change in the motion between the reconstructed key frames, the block size determining unit may determine a block size for performing the motion prediction by at least one of the 16×16, 16×8, and 8×16 block sizes. When there is a significant change in the motion between the reconstructed key frames, the block size determining unit may determine a block size for performing the motion prediction by at least one of the 8×8, 8×4, 4×8, and 4×4 block sizes.

A distributed video encoding method for encoding an image input upon being classified into a first frame and a second frame according to an aspect of the present invention to achieve the foregoing third object, includes: coding the first frame and transmitting the encoded first frame; receiving a motion vector from a distributed video decoding apparatus; generating side information corresponding to the second frame based on the received motion vector; obtaining a prediction error of the side information based on the generated side information and the second frame; and quantizing the second frame based on the obtained prediction error. The distributed video coding method may further include: transforming the input second frame; after the side information is generated, transforming the generated side information; and after the second is quantized, performing channel coding on the quantized second frame to generate a parity bit. In the obtaining of the prediction error of the side information based on the generated side information and the second frame, the prediction error may be obtained based on the transformed side information and the transformed second frame. The obtaining of the prediction error of the side information based on the generated side information and the second frame may include: comparing the transformed side information and the transformed second frame to determine a position of a block having an error; determining an amount of errors within the transformed side information; and obtaining a crossover probability based on the determined amount of errors and a length of an encoding code. The quantizing of the second frame based on the obtained prediction error may include: determining a number of quantization bits based on the obtained prediction error; and determining whether to execute quantization on respective blocks constituting the second frame based on the obtained prediction error. In the determining of whether to execute quantization on the respective blocks constituting the second frame based on the obtained prediction error, quantization may not be executed on a block that does not have an error and has a crossover probability smaller than a pre-set threshold value and quantization may be executed on a block that has an error and has a crossover probability equal to or greater than the threshold value, among all the blocks constituting the second frame.

A distributed video decoding method according to an aspect of the present invention to achieve the foregoing third object, includes: decoding an encoded first frame; generating a motion vector based on the at least one decoded first frame; transmitting the generated motion vector to an encoding apparatus; generating side information corresponding to the second frame by using the generated motion vector; correcting the side information by using a parity bit provided from the coding apparatus and the side information; and dequantizing the corrected side information to reconstruct the second frame.

A distributed video encoding apparatus for encoding an image input upon being classified into a first frame and a second frame according to an aspect of the present invention to achieve the foregoing fourth object, includes: a coding unit configured to encode the first frame; a motion compensation unit configured to generate side information corresponding to the second frame based on a motion vector provided from a decoding apparatus and the encoded first frame; a quantization controller configured to obtain a prediction error of the side information based on the generated side information and the input second frame, and quantize the second frame based on the obtained prediction error; and a channel coding unit configured to channel-code the quantized second frame to generate a parity bit. The distributed video encoding apparatus may further include: a first transform unit configured to transform the generated side information; and a second transform unit configured to transform the input second frame. The quantization controller may obtain the prediction error based on the transformed side information and the transformed second frame. The quantization controller may compare the transformed side information and the transformed second frame to determine a position of a block having an error, determine an amount of errors in the transformed side information, and obtain a crossover probability based on the determined amount of errors and a length of an encoding code to thus obtain the prediction error. The quantization controller may determine a number of quantization bits based on the obtained prediction error and determine whether to execute quantization on respective blocks constituting the second frame. The quantization controller may omit quantization on a block that does not have an error and has a crossover probability smaller than a threshold value and execute quantization on a block that has an error or a crossover probability equal to or greater than the threshold value, among all the blocks constituting the second frame.

A distributed video decoding apparatus according to an aspect of the present invention to achieve the foregoing fourth object, includes: a decoding unit configured to decode an encoded first frame; a side information generating unit configured to generate a motion vector based on the at least one decoded first frame and provide the generated motion vector to a coding apparatus, and generate side information corresponding to a second frame by using the motion vector; a transform unit configured to transform the generated side information; a channel decoding unit configured to correct the side information based on the transformed side information and a parity bit provided from the coding apparatus; and a dequantization unit configured to dequantize the corrected side information to reconstruct the second frame.

A transcoding apparatus according to an aspect of the present invention to achieve the foregoing fifth object, includes: a decoding unit configured to decode an encoded first frame; a side information generating unit configured to generate a motion vector based on the at least one decoded first frame and provide the generated motion vector to an encoding apparatus, and generate side information corresponding to a second frame by using the motion vector; a transform unit configured to transform the generated side information; a channel decoding unit configured to correct the side information based on the transformed side information and a parity bit provided from the encoding apparatus; a dequantization unit configured to dequantize the corrected side information to reconstruct the second frame; and a coding unit configured to code the reconstructed second frame. The coding unit may encode the reconstructed second frame and the first frame decoded by the decoding unit. The coding unit may include: a first coding unit configured to code the reconstructed second frame; and a second coding unit configured to encode the first frame decoded by the decoding unit.

A encoding method of a distributed video encoding apparatus according to an aspect of the present invention to achieve the foregoing sixth object, includes: checking a channel state; determining a channel coding rate and a size of video data to be transmitted based on the checked channel status; determining the number of motion prediction performing steps based on the determined size of the video data to be transmitted; encoding the video data to be transmitted by performing motion predictions according to the determined number of motion prediction performing steps; and channel-coding the encoded video data according to the determined channel coding rate. In the checking of the channel state, an available bit rate and a packet loss rate (PLR) may be obtained. In the determining of the channel coding rate and the size of the video data to be transmitted based on the checked channel state, the size of the video data to be transmitted and the size of the channel coding data may be determined based on the available bit rate, the packet loss rate, and the channel coding rate. In the determining of the number of motion prediction performing steps based on the determined size of the video data to be transmitted, the number of motion prediction performing steps among a total of steps of a three step search (TSS) may be determined based on the determined size of the video data to be transmitted. The encoding of the video data to be transmitted by performing motion predictions according to the determined number of motion prediction performing steps may include: providing a motion vector used for motion prediction and information regarding the number of motion prediction performing steps to a distributed video decoding apparatus.

A encoding method of a distributed video encoding apparatus according to an aspect of the present invention to achieve the foregoing sixth object, includes: checking a channel state; determining a channel coding rate and a size of video data to be transmitted based on the checked channel status; determining at least one method among adjustment of the number of motion prediction performing steps and adjustment of a quantization interval, as a method of adjusting a size of video data based on the determined size of the video data to be transmitted; encoding the video data to be transmitted according to the determined method of adjusting the size of the video data; and channel-coding the encoded video data according to the determined channel coding rate. In the determining of at least one method among adjustment of the number of motion prediction performing steps and adjustment of a quantization interval, as a method of adjusting a size of video data based on the determined size of the video data to be transmitted, at least one method among adjustment of the number of motion prediction performing steps and adjustment of a quantization interval may be determined as a method of adjusting a size of video data based on the determined size of the video data to be transmitted, based on at least one pre-set priority among a channel state, user preference, and performance of an encoding apparatus.

A distributed video decoding method according to an aspect of the present invention to achieve the foregoing sixth object, includes: reconstructing a channel loss by channel-decoding provided second encoded data; reconstructing a first frame by decoding provided first encoded data; generating side information by performing motion prediction on the reconstructed first frame based on a provided motion vector and information regarding the number of motion prediction performing steps; correcting the generated side information by using a parity bit; and dequantizing the corrected side information to reconstruct a second frame.

A distributed video encoding apparatus according to an aspect of the present invention to achieve the foregoing seventh object, includes: a first frame coding unit configured to encode an input first frame; a channel monitor unit configured to obtain a packet loss rate (PLR) and determine a channel coding rate based on the obtained packet loss rate; a motion prediction unit configured to determine the number of motion prediction performing steps based on the provided packet loss rate and performing motion prediction according to the determined number of motion prediction performing steps to generate side information; and a second frame coding unit configured to encode the generated side information to generate a parity bit, and configured to perform channel coding according to the determined channel coding rate. The channel monitor unit may determine double the packet loss rate as a forward error correction (FEC) rate. The second frame coding unit may include: a transform and quantization unit configured to transform the generated side information and quantize the same; a first channel coding unit configured to channel-code the transformed and quantized data to generate a parity bit; and a second channel coding unit configured to perform channel coding on data provided from the first channel coding unit to compensate for a channel loss according to the channel coding rate. The motion prediction unit may provide a motion vector used for motion prediction and information regarding the number of motion prediction performing steps to a distributed video encoding apparatus.

A distributed video encoding apparatus according to an aspect of the present invention to achieve the foregoing seventh object, includes: a first frame coding unit configured to encode an input first frame; a controller configured to determine a channel coding rate and a size of video data to be transmitted based on a packet loss rate and an available bit rate, and provide a control signal for adjusting a size of the video data based on the size of the video data to be transmitted; a motion prediction unit configured to perform motion prediction to generate side information when a control signal is provided from the controller; and a second frame coding unit configured to encode the generated side information to generate a parity bit, and perform channel coding according to the determined channel coding rate. The controller may determine at least one of adjustment of the number of motion prediction performing steps and adjustment of a quantization interval, as a method for adjusting a size of video data based on the determined size of the video data to be transmitted, and provide a control signal corresponding to the determined method for adjusting the size of the video data. The motion prediction unit may perform motion prediction according to the number of motion prediction performing steps as a control signal provided from the controller, and provide a motion vector used for motion prediction and information regarding the number of motion prediction performing steps to a distributed video decoding apparatus. The second frame coding unit may include: a transform and quantization unit configured to transform and quantize the generated side information; a first channel coding unit configured to channel-code the transformed and quantized data to generate a parity bit; a second channel coding unit configured to perform channel coding on data provided from the first channel coding unit according to the channel coding rate to compensate for a channel loss. When information regarding a quantization interval is provided from the controller, the transform and quantization unit may perform quantization according to the provided quantization interval information.

An encoding method of a plurality of distributed video encoding apparatuses according to an aspect of the present invention to achieve the foregoing eighth object, includes: performing distributed video encoding on a captured image by using the plurality of distributed video encoding apparatuses; and transmitting the distributed video encoding-performed image data to a distributed video decoding unit through a predetermined communication channel, wherein distributed video encoding performed by at least one of the plurality of distributed video encoding apparatuses, as a distributed video encoding method for encoding an image input upon being classified into a first frame and a second frame, may include: encoding the first frame and transmitting the encoded first frame; receiving a motion vector from a distributed video decoding apparatus; generating side information corresponding to the second frame based on the received motion vector; obtaining a prediction error of the side information based on the generated side information and the second frame; and quantizing the second frame based on the obtained prediction error. The distributed video coding method may further include: transforming the input second frame; after the side information is generated, transforming the generated side information; and after the second frame is quantized, performing channel coding on the quantized second frame to generate a parity bit. In the obtaining of the prediction error of the side information based on the generated side information and the second frame, the prediction error may be obtained based on the transformed side information and the transformed second frame. At least one of the plurality of distributed video encoding apparatuses may be used as a depth image capturing apparatus for obtaining information regarding a depth of a subject, and the plurality of distributed video encoding apparatuses, excluding the depth image capturing apparatus, may capture an image of the subject from a plurality of views to obtain a three-dimensional (3D) image of the subject based on the depth information provided from the depth image capturing apparatus and image information associated with the subject captured from the plurality of views. At least one of the plurality of distributed video encoding apparatuses may include a predetermined sensor for sensing a fire, and the image data captured by the plurality of distributed video encoding apparatuses and fire determination data provided from the sensor may be transmitted by using a wireless network. The plurality of distributed video decoding apparatuses may capture individual images according a plurality of image capture views, and the captured individual images may be decoded according to a distributed video decoding method so as to be provided to a multi-view screen having a plurality of screens or only some of the captured images may be provided according to a particular control signal. When a monitored person appears in a monitoring area, a corresponding motion may be sensed by an operation sensor mounted in each of the plurality of distributed video encoding apparatuses, the plurality of distributed video encoding apparatuses may start to operate, data may be compressed such that the data can be transmittable in a wireless sensor network, by using distributed video encoding in the plurality of distributed video encoding apparatuses, the compressed data may be transmitted to a router and received from the router through the wireless sensor network by a wireless communication module included in each of the plurality of distributed video encoding apparatuses, and subsequently transmitted from the router to a gateway or transmitted from the gateway to the router, and the image data transmitted to the gateway may be transmitted to a server and received from the server through an Ethernet. At least one of the plurality of distributed video encoding apparatuses may be used as an infrared image capturing apparatus to obtain an infrared image of a predetermined subject, and picture quality sharpness of the infrared image may be compared with an image captured by at least one of the plurality of distributed video encoding apparatuses to detect whether or not the subject is forged.

An image encoding method using a plurality of image capturing apparatuses according to an aspect of the present invention to achieve the foregoing ninth object, includes: performing distributed video encoding on an image captured by using a distributed video coding unit included in each of the plurality of image capturing apparatuses; and transmitting the distributed video encoding-performed image data to a distributed video decoding unit through a predetermined communication channel, wherein the distributed video encoding performed in at least one of the plurality of distributed video encoding apparatuses may include: checking a channel state; determining a channel coding rate and a size of video data to be transmitted based on the checked channel status; determining at least one method among adjustment of the number of motion prediction performing steps and adjustment of a quantization interval, as a method of adjusting a size of video data based on the determined size of the video data to be transmitted; encoding the video data to be transmitted according to the determined method of adjusting the size of the video data; and channel-coding the encoded video data according to the determined channel coding rate. In the checking of the channel state, an available bit rate and a packet loss rate (PLR) may be obtained. In the determining of the number of motion prediction performing steps based on the determined size of the video data to be transmitted, the number of motion prediction performing steps among a total of steps of a three step search (TSS) may be determined based on the determined size of the video data to be transmitted. The encoding of the video data to be transmitted by performing motion predictions according to the determined number of motion prediction performing steps may include: providing a motion vector used for motion prediction and information regarding the number of motion prediction performing steps to a distributed video decoding apparatus. At least one of the plurality of distributed video encoding apparatuses may be used as a depth image capturing apparatus for obtaining information regarding a depth of a subject, and the plurality of distributed video encoding apparatuses, excluding the depth image capturing apparatus, may capture an image of the subject from a plurality of views to obtain a three-dimensional (3D) image of the subject based on the depth information provided from the depth image capturing apparatus and image information associated with the subject captured from the plurality of views. At least one of the plurality of distributed video encoding apparatuses may include a predetermined sensor for sensing a fire, and the image data captured by the plurality of distributed video encoding apparatuses and fire determination data provided from the sensor may be transmitted by using a wireless network. The plurality of distributed video decoding apparatuses may capture individual images according a plurality of image capture views, and the captured individual images may be decoded according to a distributed video decoding method so as to be provided to a multi-view screen having a plurality of screens or only some of the captured images may be provided according to a particular control signal. When a monitored person appears in a monitoring area, a corresponding motion may be sensed by an operation sensor mounted in each of the plurality of distributed video encoding apparatuses, the plurality of distributed video encoding apparatuses start to operate, data may be compressed such that the data can be transmittable in a wireless sensor network, by using distributed video encoding in the plurality of distributed video encoding apparatuses, the compressed data may be transmitted to a router and received from the router through the wireless sensor network by a wireless communication module included in each of the plurality of distributed video encoding apparatuses, and subsequently transmitted from the router to a gateway or transmitted from the gateway to the router, and the image data transmitted to the gateway may be transmitted to a server or received from the server through an Ethernet. At least one of the plurality of distributed video encoding apparatuses may be used as an infrared image capturing apparatus to obtain an infrared image of a predetermined subject, and picture quality sharpness of the infrared image may be compared with an image captured by at least one of the plurality of distributed video encoding apparatuses to detect whether or not the subject is forged.

Advantageous Effects

As described above, in the case of the distributed video encoding/decoding method, the distributed video encoding/decoding apparatus, and the transcoding apparatus according to embodiments of the present invention, when side information used in the decoding process of the distributed video coding is generated, a size of a block for motion prediction between key pictures is variably applied based on a predetermined discrimination reference.

Also, in distributed video coding, the video decoding apparatus provides a generated motion vector to the distributed video coding apparatus, and the distributed video coding apparatus generates side information by using the motion vector and subsequently determines a prediction error of the generated side information to adjust quantization.

Besides, a size of video data to be coded is reduced by adjusting complexity and/or a quantization interval of the coding apparatus according to a channel state, and data for compensating for a channel loss is added by the reduced amount of data and transmitted.

Thus, a motion vector between key pictures can be more precisely estimated to thus considerably improve performance of a reconstructed image. Namely, a motion vector of side information desired to be generated is estimated by variably applying a size of a block existing within a reconstructed key picture, thereby obtaining more precise motion vector than a motion vector estimated by using a fixed size in the related art. Thus, picture quality of the reconstructed image can be improved by reducing noise of the generated side information.

Also, coding efficiency can be enhanced, a decoded image having excellent quality can be obtained, and calculation complexity of the coding apparatus and the decoding apparatus can be reduced. In addition, an image coded according to the distributed video coding method may be decoded in a general decoding apparatus through the transcoding apparatus to which the distributed video coding and distributed video decoding method are applied.

Moreover, loss resilience can be enhanced without additionally occupying network resource, and thus, a decoding failure probability can be reduced. Also, since the use of a feedback channel is minimized by reducing decoding failure probability, quality of service (QoS) of a service susceptible to delay can be guaranteed.

DESCRIPTION OF DRAWINGS

FIG. 3 is a conceptual view illustrating a generation of side information using extrapolation according to the related art.

FIG. 32 is a conceptual view illustrating a distributed video encoding apparatus including a plurality of distributed video coding units according to an embodiment of the present invention.

BEST MODES

Figure 1:
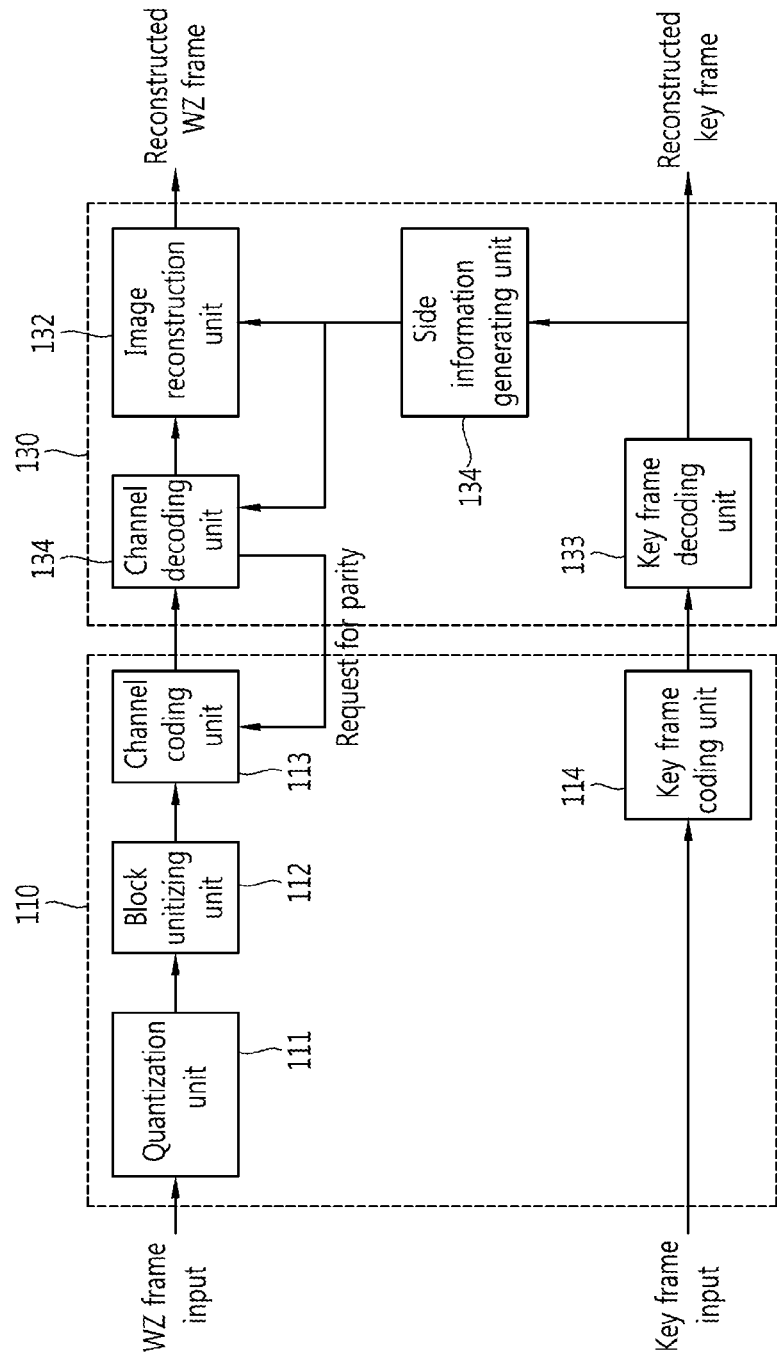
FIG. 1 is a block diagram illustrating a configuration of a encoder and a corresponding decoder based on the conventional Wyner-Ziv coding technique.

The embodiments of the present invention will be described with reference to the accompanying drawings, and it will be apparent to those skilled in the art that various modifications and variations can be made in the present invention without departing from the scope of the invention. Thus, the technical idea of the present invention should be interpreted to embrace all such alterations, modifications, and variations in addition to the accompanying drawings. Like reference numerals designate like elements throughout the specification.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

The exemplary embodiments of the present invention will now be described with reference to the accompanying drawings, in which like numbers refer to like elements throughout and repeated description of the same elements will be omitted.

Figure 4:
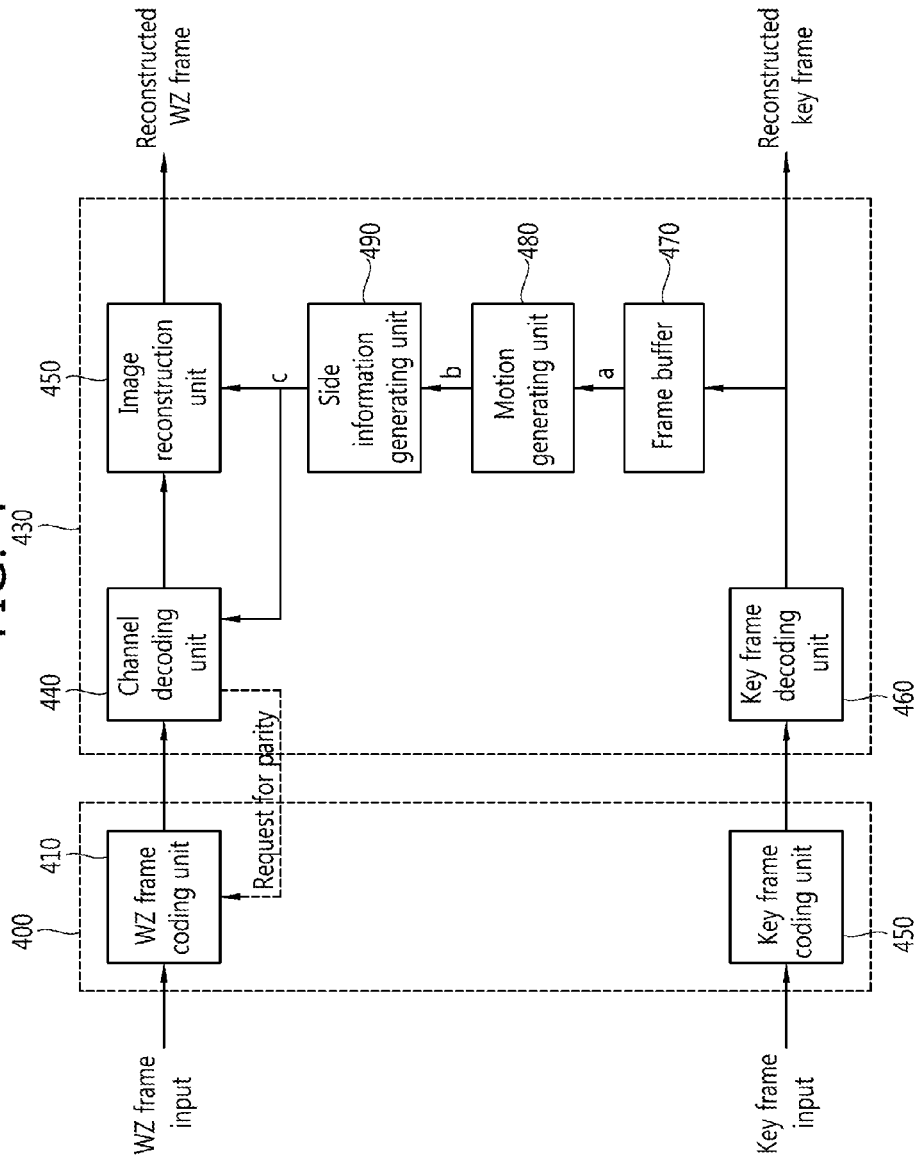
FIG. 4 is a block diagram illustrating a configuration of a decoding apparatus of a distributed video encoded image according to an embodiment of the present invention.

FIG. 4 is a block diagram illustrating a configuration of a decoding apparatus of a distributed video encoded image according to an embodiment of the present invention.

A distributed video encoding and decoding apparatus according to an embodiment of the present invention includes a distributed video encoding apparatus 400 for decoding a Wyner-Ziv (WZ) frame and a distributed video decoding apparatus 430 having a function of generating side information through motion prediction using a variable block.

Referring to FIG. 4, the distributed video encoding apparatus 400 includes a WZ frame coding unit 410 and a key frame coding unit 420.

The WZ frame coding unit 410 divides frames of source video contents into WZ frames and key frames according to a Wyner-Ziv coding scheme. For example, even numbered frames of source video content may be selected as key frames, or odd numbered frames may be selected as WZ frames.

The WZ frame coding unit 410 encodes the WZ frames and the key frames and provides the same to the distributed video decoding apparatus 430.

The distributed video decoding apparatus 430 includes a key frame decoding unit 460, a channel decoding unit 440, an image reconstruction unit 450, a side information generating unit 490, a motion vector generating unit 480, and a picture buffer 470.

The key frame decoding unit 460 reconstructs a key frame by using information received from the key frame coding unit 420.

The motion vector generating unit 480 determines a size of a block to be used for a motion prediction by using the reconstructed key frame.

The side information generating unit 490 generates side information regarding a current WZ frame to be reproduced by using the reconstructed key frame and the motion vector generated by the motion vector generating unit 480.

The channel coding unit 440 estimates quantized values by using the side information received from the side information generating unit 490 and a parity bit received from the distributed video encoding apparatus 400.

The channel decoding unit 440 may be configured such that when the channel coding unit 440 discriminates that reliable quantized values cannot be estimated in performing channel code decoding, the channel decoding unit 440 continuously requests and receives a parity bit from the distributed video encoding apparatus 400 within a certain limit until when a reliable quantized value is estimated.

In this case, since distributed video encoding apparatus 400 receives only an amount of parities required for decoding from the distributed video encoding apparatus 400, it is effective in terms of rate-distortion performance. This is possible when a reverse channel (i.e., a feedback channel) requesting a parity bit exists.

In order to lessen the problem, the channel decoding unit 440 may be configured to receive a predetermined amount of parity bits at a time in advance, rather than requesting a parity each time, so the channel decoding unit 440 does not request a parity to a reverse channel in the middle of using the parity.

Also, in this case, the distributed video decoding apparatus 430 may be configured to further request parity bits from the distributed video encoding apparatus 400 when it determines that reliability is still low even after the received parity bits are all used up. Also, when it is assumed that a reverse channel is not used, it may be configured such that the distributed video encoding apparatus 400 sends a previously calculated or preset certain amount of parities to the distributed video decoding apparatus 430 and the distributed video decoding apparatus 430 does not request a parity bit.

Also, as a channel code used in the channel decoding unit 440, a turbo code revealed to substantially reach a Shannon limitation or an LDPC channel code may be used. Besides, any other channel codes having excellent coding efficiency and error correction may be used.

The image reconstruction unit 450 reconstructs a current WZ frame by using the quantized value estimated by the channel decoding unit 440 and the side information. The side information is generated by the side information generating unit 490.

The side information generating unit 490 generates the side information by using interpolation which generally assumes a linear change between frames. In this case, a change between video frames is caused by a motion of an object, a motion of a camera, an exposed region, and a change in light. Except for an exposed region and a change in light, a difference between frames corresponds to a motion of pixels between frames. When a motion vector of a pixel is precisely known, pixels of a frame to be interpolated can be precisely predicted.

Namely, the side information generating unit 490 generates the side information based on a motion vector provided from the motion vector generating unit 480.

The side information generating unit 490 generates the side information corresponding to a WZ frame based on a motion vector provided from the motion vector generating unit 480 by using the key frame reconstructed by the key frame decoding unit 460, and outputs the side information to the channel decoding unit 440. On the assumption of a linear motion between key frames positioned before and after the current WZ frame, the side information generating unit 490 generates the side information corresponding to the WZ frame to be reconstructed by using interpolation.

The motion vector generating unit 480 generates a motion vector based on key frames, and provides the generated motion vector to the side information generating unit 490.

In detail, the motion vector generating unit 480 estimates a motion of a quadrangular section or block.

Figure 5:
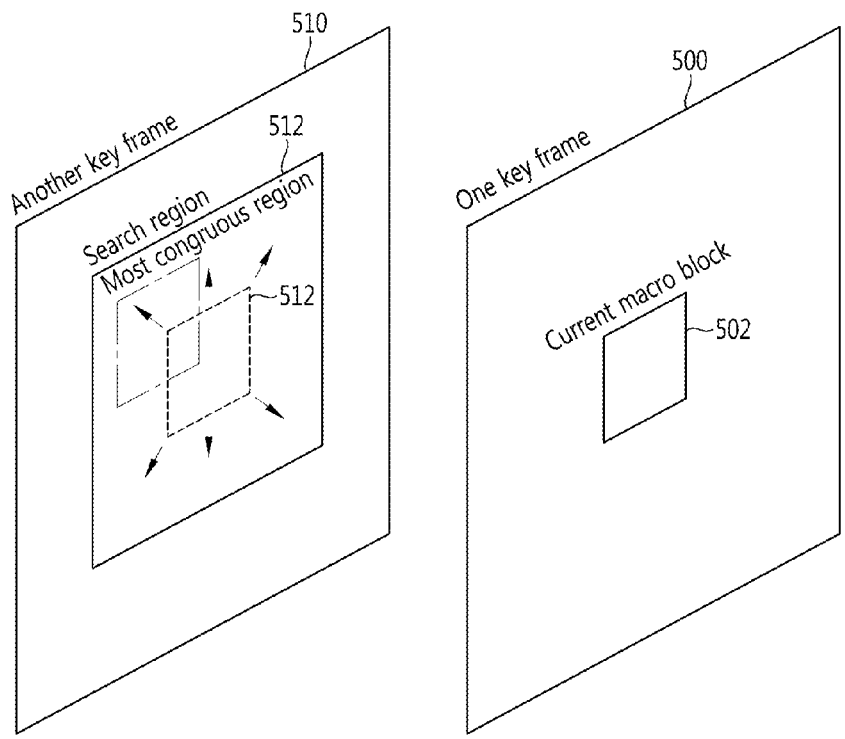
FIG. 5 is a conceptual view illustrating a process of generating a motion vector according to an embodiment of the present invention.

FIG. 5 is a conceptual view illustrating a process of generating a motion vector according to an embodiment of the present invention.

Referring to FIG. 5, the motion vector generating unit 480 checks a search region 520 of another key frame 510 in order to fine an M×N sample region 512 congruent with an M×N sample block 502 of one key picture 500. The motion vector generating unit 480 compares the M×N block 502 of one frame with all or some of M×N blocks available in the search region (in general, a region based on a position of a current block) 520 to find the most congruent region 512. Subsequently, the motion vector generating unit 480 generates a difference value, i.e., a motion vector, between the position of the current M×N block 502 and the position of the candidate region 512.

As for a size of a macro clock for a motion prediction, it may be more effective to use various block sizes for a motion prediction because the sizes of an object moving in a video image are diverse. A block size for a motion prediction may be one of 16×16, 16×8, 8×16, 8×8, 8×4, 4×8, and 4×4 in a compression standard of H.264/AVC (Advanced Video Coding).

The motion vector generating unit 480 according to an embodiment of the present invention determines sizes of a plurality of macro blocks for a motion prediction, obtains motion vectors by using the macro blocks having certain sizes, and selects an appropriate motion vector from among the obtained motion vectors.

Figure 6:
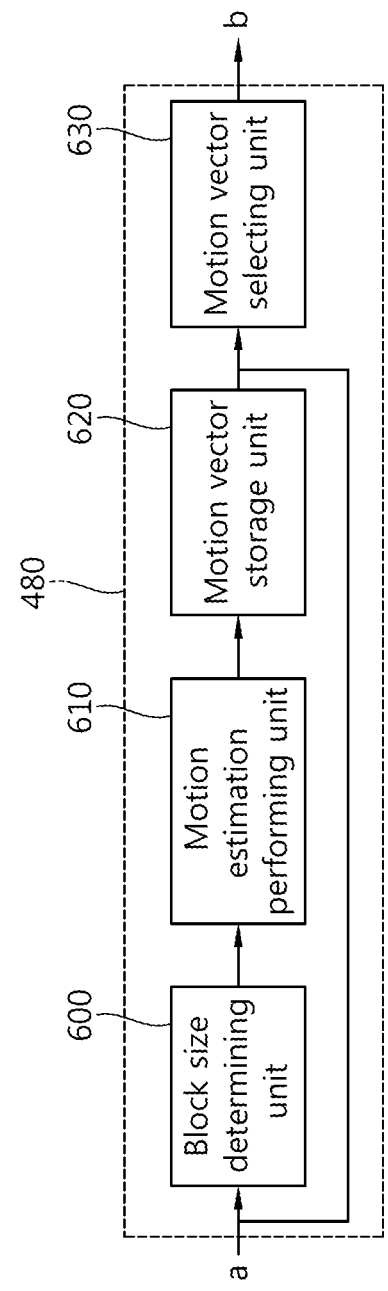
FIG. 6 is a block diagram illustrating a configuration of a motion vector generating unit according to an embodiment of the present invention.

FIG. 6 is a block diagram illustrating a configuration of the motion vector generating unit according to an embodiment of the present invention.

Referring to FIG. 6, the motion vector generating unit 480 according to an embodiment of the present invention includes a block size selecting unit 600, a motion prediction performing unit 610, a motion vector storage unit 620, and a motion vector determining unit 630.

The block size determining unit 600 determines a size of a macro block for a motion prediction based on a key frame. The macro block may have a square shape, a rectangular shape, and/or a certain shape according to an embodiment of the present invention.

In other words, the block size determining unit 600 determines sizes of a plurality of macro blocks. According to an embodiment of the present invention, when a motion between key frames is monotonous and has little difference, the block size determining unit 600 may determine large block sizes for a motion prediction, and when there is a fine motion between key frames or when there is a significant motion therebetween, the block size determining unit 600 may determine small block sizes for a motion prediction. Large block sizes may include block sizes such as 16×16, 16×8, and 8×16, and the small block sizes may include block sizes such as 8×8, 8×4, 4×8, and 4×4. In another embodiment, the block size determining unit 600 may determine sizes of all the macro blocks that may be used for a motion prediction, for a motion prediction. When block sizes for a motion prediction are determined, the block size determining unit 600 provides the determined block sizes to the motion prediction performing unit 610.

The motion prediction performing unit 610 performs a motion prediction on the respective block sizes used for a motion prediction to generate motion vectors. In detail, in order to discover a sample region congruent with a sample block of one key frame, the motion prediction performing unit 610 searches a region of another key frames, finds the most congruent block, and generates a motion vector, i.e., a difference value therebetween.

The motion prediction performing unit 610 repeatedly performs the process of generating and storing motion vectors by the number of block sizes.

The motion prediction performing unit 610 stores the generated motion vectors in the motion vector storage unit 620.

The motion vector selecting unit 630 measures similarity between blocks by using the motion vectors obtained from the different block sizes existing within the key frames, and selects a motion vector determined to be the most similar. Namely, the motion vector selecting unit 630 measures similarity between a block of one key frame and a block corresponding to another key frame among the motion vectors, and selects a motion vector for a block size corresponding to the highest similarity.

Here, in general, similarity between respective blocks existing within the key frames may be calculated by using a method such as the sum of absolute difference (SAD), a mean absolute difference (MAD), the sum of square difference (SSD), or the like, of the blocks existing in the respective key frames. In addition, of course, similarity between respective blocks existing within key frames may also be measured by using any other appropriate method than the foregoing enumerated similarity measurement methods.

The motion vector selecting unit 630 provides the selected motion vector to the side information generating unit 490.

The operation of the motion vector generating unit 480 having such a configuration will be described as follows.

Figure 7:
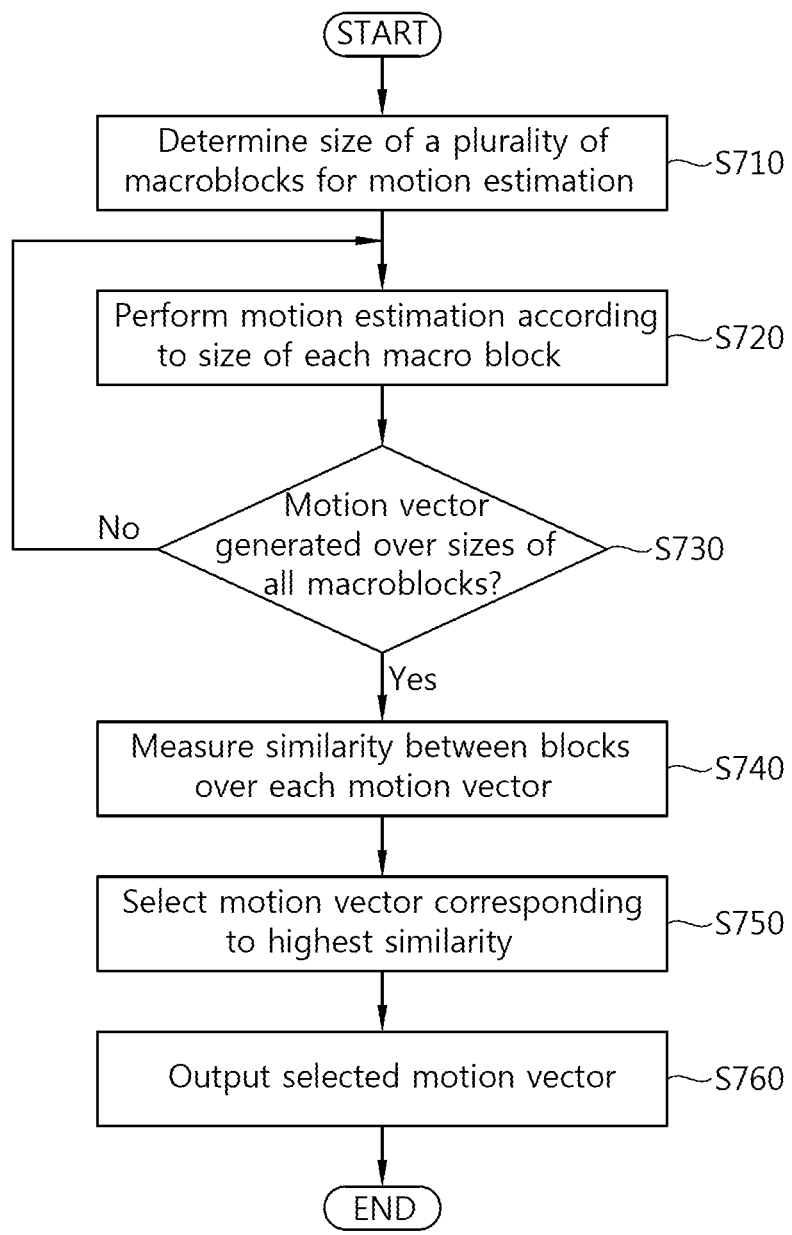
FIG. 7 is a flow chart illustrating a process of generating a motion vector according to an embodiment of the present invention.

FIG. 7 is a flow chart illustrating a process of generating a motion vector according to an embodiment of the present invention.

Referring to FIG. 7, first, the motion vector generating unit 480 determines a plurality of macro block sizes for a motion prediction in step S710.

In this case, the macro block sizes may be determined according to characteristics of an image. For example, when there is a fine or complicated motion between frames or when there is a significant motion between frames, the motion vector generating unit 480 may determine small block sizes for a motion prediction. Or, when a motion between frames is monotonous or when there is not much difference between frames, the motion vector generating unit 480 may determine large block sizes for a motion prediction. Or, all macro block sizes that may be used for a motion prediction may be determined.

Next, the motion vector generating unit 480 generates motion vectors by performing a motion prediction according to the sizes of the respective macro blocks. In detail, in order to fine an M×N sample region 512 congruent with an M×N sample block 502 of one frame 500, the motion vector generating unit 480 searches a region 520 of another key frame 510. The motion vector generating unit 480 compares the M×N block 502 of one picture with all or some of available M×N blocks in the search region 520 (in general, a region based on the position of a current block) to fine the most congruent region, namely, a candidate region 512. Subsequently, the motion vector generating unit 480 generates a motion vector, a difference value, between the position of the current M×N block 502 and the position of the candidate region 512.

Subsequently, the motion vector generating unit 480 determines whether or not motion vectors with respect to the all the sizes of the macro blocks determined in step S730 have been generated. When motion vectors with respect to all the determined sizes of the determined macro blocks have been generated, the motion vector generating unit 480 measures similarity between a block of one picture and a block of another frame with respect to the respective motion vectors. According to an embodiment of the present invention, the block may have a square shape. Also, in order to measure similarity between the blocks existing within key frames, the sum of absolute difference (SAD), a mean absolute difference (MAD), the sum of square difference (SSD), or the like, between blocks using motion vectors may be used.

Figure 2:
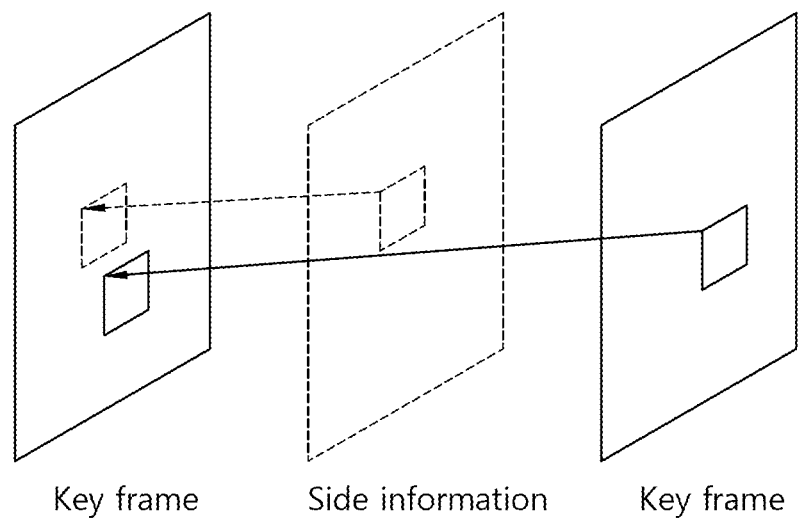
FIG. 2 is a conceptual view illustrating a generation of side information using interpolation according to the related art.

However, the scope of the present invention is not limited thereto, and of course, the block size may have a certain shape, rather than a square shape, and a different method may be selected to measure similarity between blocks existing within key frames. Also, as illustrated in FIG. 2, the present invention may be applicable to any cases in which side information is performed through interpolation or through extrapolation, and the like.

Subsequently, the motion vector generating unit 480 selects a motion vector corresponding to the highest similarity among the generated motion vectors. Namely, a motion having the highest similarity between blocks may guarantee excellent motion compensation.

The motion vector generating unit 480 outputs the selected motion vector to the side information generating unit 490 in step S760.

In decoding based on the Wyner-Ziv coding technique according to an embodiment of the present invention, a selective hash information using method and apparatus thereof may be used, and meanwhile, a detailed embodiment of the present invention has been described but there may be various modifications without departing from the subject of the present invention. Thus, the scope of the present invention may be determined by the claim coverage and equivalence of the claim coverage, rather than by the embodiment described above.

Figure 8:
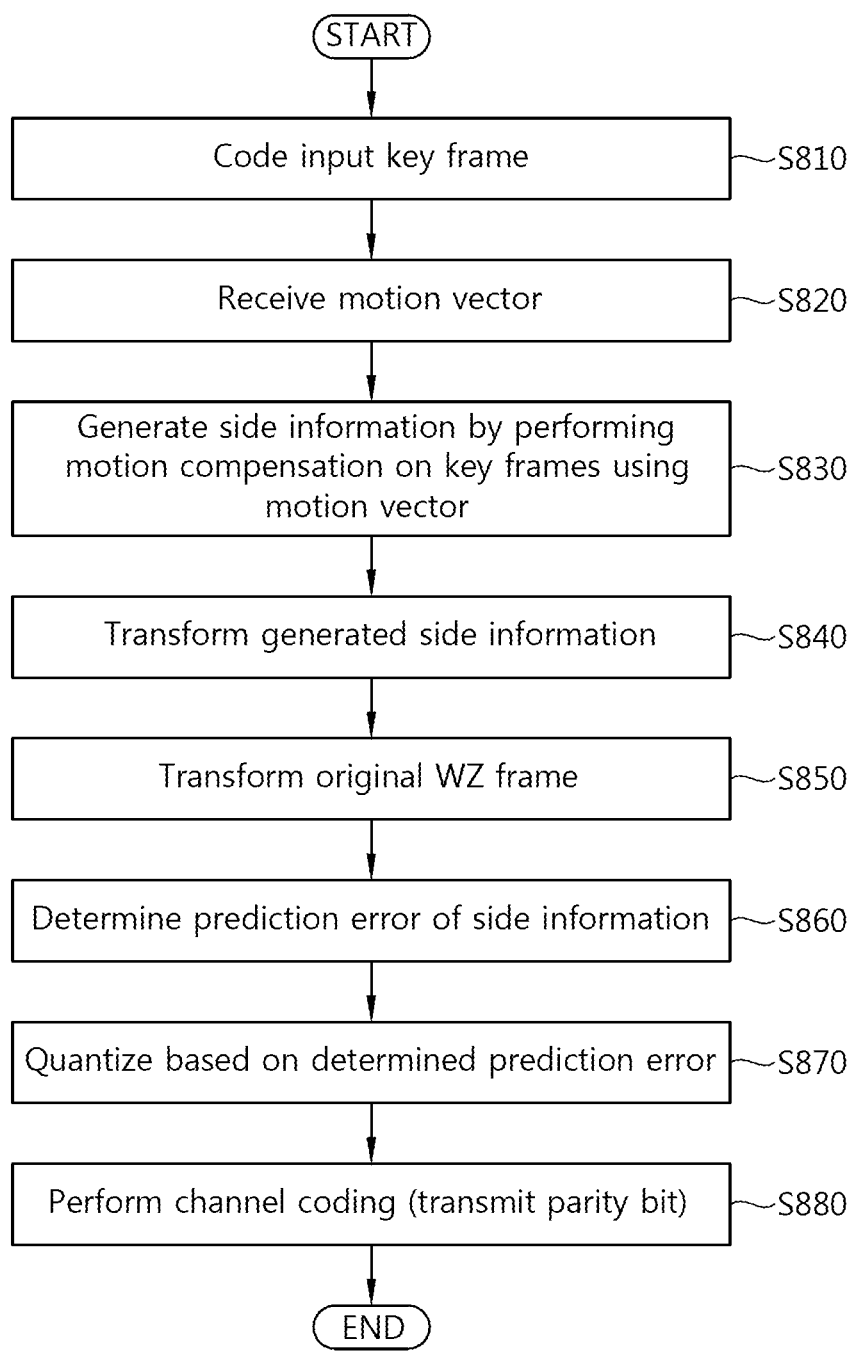
FIG. 8 is a flow chart illustrating a distributed video encoding method according to another embodiment of the present invention.

FIG. 8 is a flow chart illustrating a distributed video encoding method according to another embodiment of the present invention.

Referring to FIG. 8, first, a distributed video encoding apparatus encodes an input key frame and transmits the encoded key frame to a distributed video decoding apparatus (step S810). Here, the distributed video encoding apparatus may encode the key frame through various known coding techniques such as H.264/AVC, MPEGx, or the like.

Next, the distributed video encoding apparatus receives a motion vector from the distributed video decoding apparatus (step S820), and executes motion compensation on the encoded key frame by using the received motion vector to generate side information corresponding to a WZ frame (step S830). Here, since the generated side information is identical to the side information generated in the distributed video decoding apparatus, the distributed video encoding apparatus recognizes the side information generated by the distributed video decoding apparatus Thereafter, the distributed video encoding apparatus transforms the generated side information (step S840).

The distributed video encoding apparatus transforms the original WZ frame (step S850), and determines a prediction error of the side information based on the transformed original WZ frame and the side information transformed in step S840 (step S860). Here, a point in time at which the input original WZ frame is transformed is not limited to the order illustrated in FIG. 8 and the input original WZ frame may be transformed according to a point in time at which the original WZ frame was input.

When a prediction error is determined, the distributed video encoding apparatus performs quantization based on the determined prediction error (step S870), performs channel coding on the quantized data to generate a parity bit, and subsequently provides the generated parity bit to the distributed video decoding apparatus (step S880). Here, the distributed video encoding apparatus may perform quantization by the coding units as image regions, such as macro blocks, or the like, having a predetermined size which are encoded together at a time.

Figure 9:
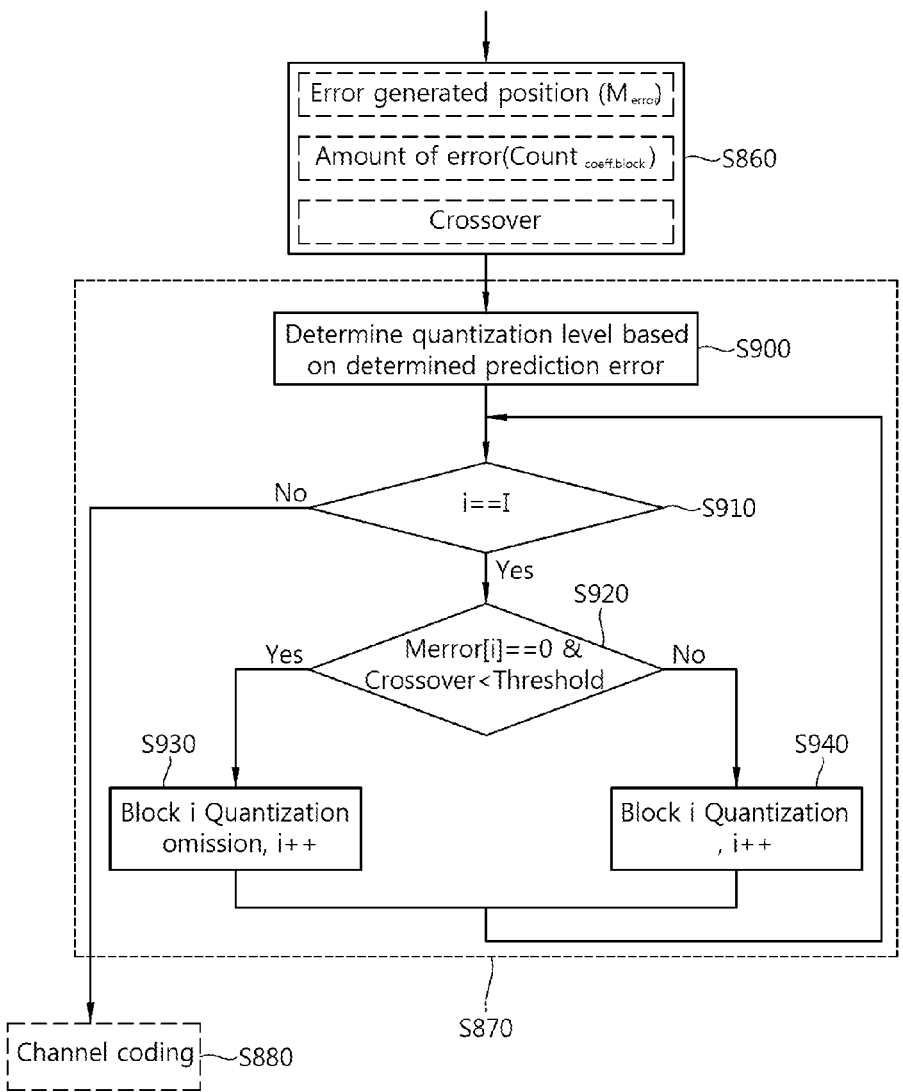
FIG. 9 is a detailed flow chart illustrating a prediction error determining step and a quantization step according to another embodiment of the present invention.

FIG. 9 is a detailed flow chart illustrating a prediction error determining step and a quantization step according to another embodiment of the present invention.

Referring to FIG. 9, in order to determine a prediction error of the side information frame, the distributed video encoding apparatus calculates an amount of errors generated in the side information frame, a position ($M_{error}$) of a block having an error, and a crossover probability (step S860). Here, the calculated values are used to determine a quantization level of each block and whether to perform quantization.

In detail, the position ($M_{error}$) in which an error occurs in the side information frame may be calculated by using Equation 1 shown below:

$$M_{error}[i] = \begin{cases} 1, & \sum_{j=0}^{J} \sum_{k=0}^{K} | ORI_{i,j,k} - SI_{i,j,k} | > 0 \\ 0, & \text{otherwise} \end{cases} \quad i < I \quad \text{[Equation 1]}$$

In Equation 1, ORI is the original WZ frame, and SI is a side information frame, i is an index of a block, I is the number of blocks within a frame, j is an index of a coefficient in a block, J is the number of coefficients in a block, k is an index of a bit plane, and when k is 0, it indicates the most significant bit, and as the value of k is increased, it indicates a least significant bit. K is the number of bit planes in a coefficient.

Also, an amount of errors in the side information frame may be calculated by using Equation 2 shown below.

$$\text{Count}_{coeff.Mode}[I, J, K] = \sum_{i=0}^{I} \sum_{j=0}^{J} \sum_{k=0}^{K} (M_{error}[i] \times |ORI_{i,j,k} - SI_{i,j,k}|) \quad \text{[Equation 2]}$$

Since the size of the original WZ frame is greater than the length of an LDPCA (Low Density Parity Check Accumulate), a coding code, the entirety of frames are not encoded at a time but divided and encoded. A crossover probability may be measured as shown in Equation 3 below by using the amount of errors in the original WZ frame performed at a time and the length of the LDPCA code.

$$\text{Crossover} = \frac{\text{Count}_{coeff.Mode}\left[\frac{I}{\text{length}_{LDPG1}}, J, K\right]}{\text{length}_{LDPCA}} \times 100 \quad \text{[Equation 3]}$$

As described above, after the positions of the errors, the amount of errors, and the crossover probability are calculated by using Equations 1, 2, and 3, the distributed video encoding apparatus determines a quantization level of the original WZ frame based on the calculated values (step S900). For example, the distributed video encoding apparatus may determine a quantization bit based on the calculated values.

Thereafter, the distributed video encoding apparatus determines whether or not there is an error and whether or not a crossover probability is smaller than a pre-set threshold value with respect to each of the blocks within the WZ frame (steps S910 and S920). The distributed video encoding apparatus omits quantization on a block that does not have an error and a crossover probability smaller than the threshold value (S930), and performs quantization on a block that has an error or that has a crossover probability equal to or higher than the threshold value (S940).

When quantization performed on all the blocks within the frames is completed in steps S810 to S940, the distributed video encoding apparatus performs channel coding.

As described above, in the distributed video encoding method according to an embodiment of the present invention, by using the mark $M_{error}$ error indicating whether or not a block has an error or not, a block determined not to have an error is adaptively quantized. Namely, when errors are concentrated in blocks having errors, quantization is performed to lower a crossover probability, and when a crossover probability is sufficiently low although only blocks having errors are encoded, quantization is not performed on a block that does not have an error. This is to effectively use bits by allocating bits to a block having a great amount of errors and allocating bits according to a crossover probability to enhance performance of LDPCA.

In the distributed video encoding method according to an embodiment of the present invention, under the assumption that the distributed video encoding apparatus knows about channel decoding capability of the distributed video decoding apparatus, the encoding apparatus transmits the proportion of bits having no error and bits having an error according to a crossover probability by which decoding can be performed. Thus, the amount of bits to be transmitted according to an image may be increased, but a decoding failure probability is minimized to increase stability of a decoder and effectively use bits.

Figure 10:
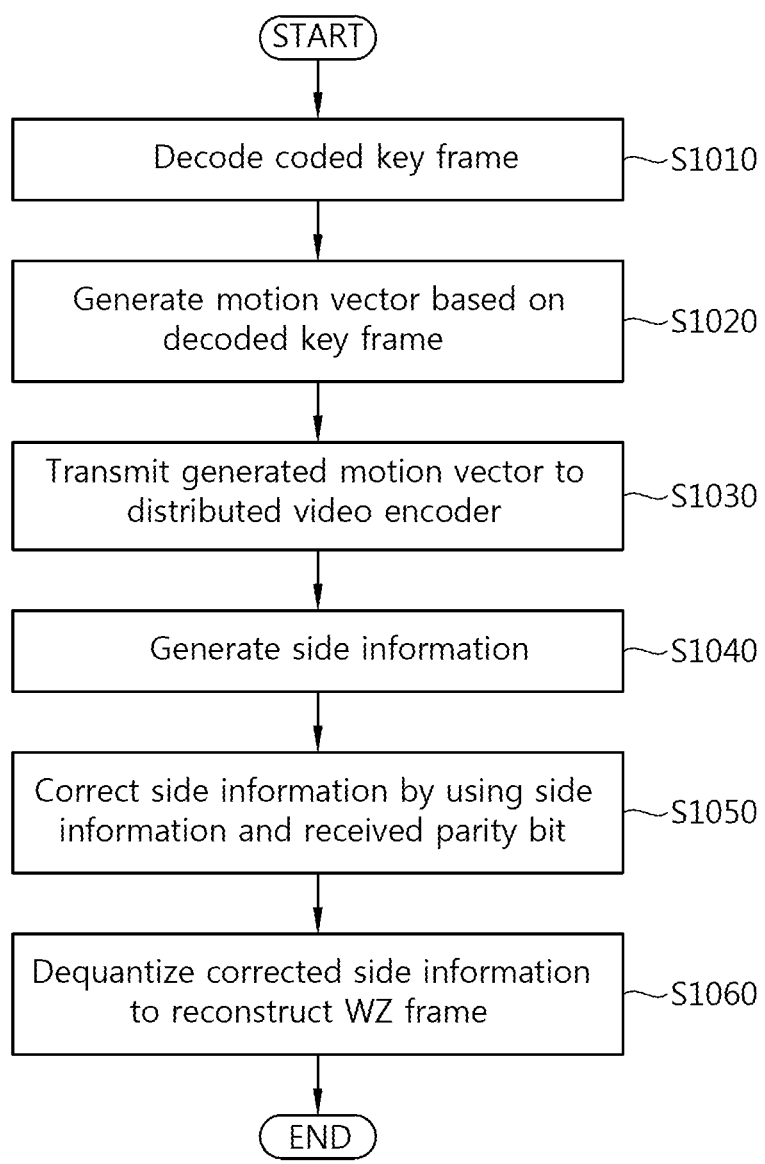
FIG. 10 is a flow chart illustrating a distributed video decoding method according to another embodiment of the present invention.

FIG. 10 is a flow chart illustrating a distributed video decoding method according to another embodiment of the present invention.

Referring to FIG. 10, first, a distributed video decoding apparatus decodes a encoded key frame transmitted from a distributed video encoding apparatus (step S1010). Here, the distributed video decoding apparatus may decode the key frame through various known decoding techniques such as H.264/AVC, MPEGx, or the like.

Next, the distributed video decoding apparatus generates a motion vector based on the decoded key frame (step S1020), and transmits the generated motion vector to the distributed video encoding apparatus (step S1030).

Also, the distributed video decoding apparatus performs motion compensation by using the generated motion vector to generate side information (step S1040). For example, the distributed video decoding apparatus estimates a motion vector between reconstructed key frames, a motion vector of the side information corresponding to a WZ frame desired to be reconstructed from the motion vector between the reconstructed key frames in consideration of a distance between frames. A decoding unit within a key frame indicated by the obtained motion vector of the side information may be generated as side information.

When the side information is generated as described above, the distributed video decoding apparatus corrects noise included in the generated side information by using a parity bit transmitted from the distributed video encoding apparatus (step S1050) and perform dequantization thereon to reconstruct a WZ frame (step S1060).

Figure 11:
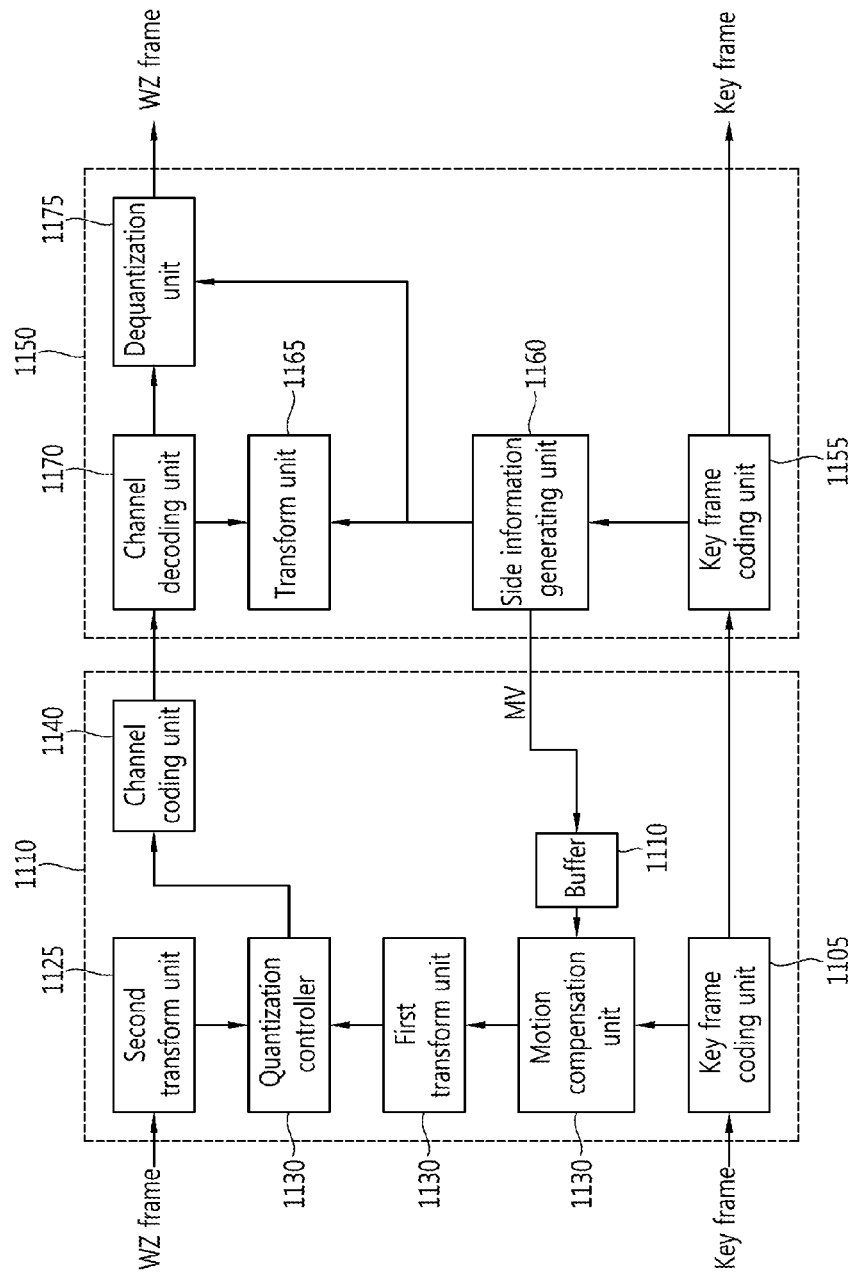
FIG. 11 is a block diagram illustrating a configuration of a distributed video encoding apparatus and a distributed video decoding apparatus according to another embodiment of the present invention.

FIG. 11 is a block diagram illustrating a configuration of a distributed video encoding apparatus and a distributed video decoding apparatus according to another embodiment of the present invention.

Referring to FIG. 11, a distributed video encoding apparatus 1110 may include a key frame coding unit 1105, a buffer 1110, a motion compensation unit 1115, a first transform unit 1120, a second transform unit 1125, a quantization controller 1130, and a channel coding unit 1140.

First, an input image to be encoded is classified into a key frame and a WZ frame, and the key frame is provided to the key frame coding unit 1105 and the WZ frame is provided to the second transform unit 1125. The key frame coding unit 1105 encodes the key frame, and provides the encoded key frame to the motion compensation unit 1115 and a key frame decoding unit 1155 of the distributed video decoding apparatus. Here, the key frame coding unit 1105 may encode the key frame through various know coding techniques such as H.264/AVC, MPEGx, or the like.

The buffer 1110 temporarily stores a motion vector (MV) provided from a side information generating unit 1160 of the distributed video decoding apparatus 1150, and provides the same to the motion compensation unit 1115.

The motion compensation unit 1115 reads the motion vector stored in the buffer 1110 after being transmitted from the distributed video decoding apparatus 1150, performs motion compensation on the encoded key frame by using the read motion vector to generate side information, and provides the generated side information to the first transform unit 1120.

Here, the motion compensation unit 1115 has performed motion compensation on the key frame by using the motion vector provided from the distributed video decoding apparatus 1150, the side information generated in the distributed video encoding apparatus 1110 and the distributed video decoding apparatus 1150 are identical, and thus, the distributed video encoding apparatus 1100 can be aware of the side information generated in the distributed video decoding apparatus 1150 and reflects it in coding.

The first transform unit 1120 transforms side information provided from the motion compensation unit 1115 and provides the same to the quantization controller 1130, and the second transform unit 1125 transforms the input original WZ frame and provides the same to the quantization controller 1130. Here, the first and second transform units 1120 and 1125 may use the same transform method.

The quantization controller 1130 determines a prediction error of the side information based on the transformed side information frame provided from the first transform unit 1120 and the original WZ frame provided from the second transform unit, determines a quantization level of the respective blocks constituting the original WZ frame and whether to perform quantization thereon, performs quantization thereon, and provides the same to the channel coding unit 1140.

The channel coding unit 1140 generates a parity bit with respect to quantized data by using a channel code, and transmits the generated parity bit to a channel decoding unit 1170 of the distributed video decoding apparatus 1150. Here, the generated parity bit may be stored in a separately prepared buffer (not shown), and thereafter, may be transmitted to the distributed video decoding apparatus according to a transmission request therefrom.

The distributed video decoding apparatus 1150 may include the key frame decoding unit 1155, the side information generating unit 1160, the transform unit 1165, the channel coding unit 1170, and a dequantization unit 1175.

The key frame decoding unit 1155 may perform decoding on a decoded key frame provided from the key frame coding unit 1105 of the distributed video encoding apparatus 1100 to provide the same to the side information generating unit 1160. The key frame decoding unit 1155 may decode the key frame through various known decoding techniques such as H.264/AVC, MPEGx, or the like.

The side information generating unit 1160 performs a motion estimation by using a decoded key frame and subsequently performs motion compensation to generate side information corresponding to a WZ frame. Also, the side information generating unit 1160 provides a motion vector generated during the process of performing a motion estimation to the distributed video encoding apparatus 1100. Here, the side information generating unit 1160 may estimate a motion vector between reconstructed key frames, obtain a motion vector of side information corresponding to the WZ frame desired to be reconstructed from the motion vector between reconstructed key frames in consideration of a distance between the frames, and generate a decoding unit within a key frame indicated by the obtained motion vector of the side information, as side information.

The transform unit 1165 transforms the side information provided from the side information generating unit 1160 and provides the same to the channel decoding unit 1170. The channel decoding unit 1170 corrects noise included in the transformed data provided from the transform unit 1165 by using the parity bit transmitted from the distributed video encoding apparatus 1100, thus estimating quantized data.

The dequantization unit 1175 receives the estimated quantized data from the channel decoding unit 110 and dequantizes the received data to reconstruct the WZ frame. Here, ambiguity generated during dequantization may be solved with reference to the side information provided from the side information generating unit 1160.

As illustrated in FIG. 11, the distributed video decoding apparatus 1150 transmits a motion vector used to predict the side information corresponding to the WZ frame to the distributed video encoding apparatus 1100, and the distributed video encoding apparatus 1100 performs motion compensation by using the received motion vector to generate side information to thus obtain the same side information as the side information generated in the distributed video decoding apparatus 1150, calculates a prediction error between the generated side information and the original WZ frame, and adjusts a quantization level and whether to perform quantization, thereby enhancing coding efficiency and obtaining an image of excellent quality.

Figure 12:
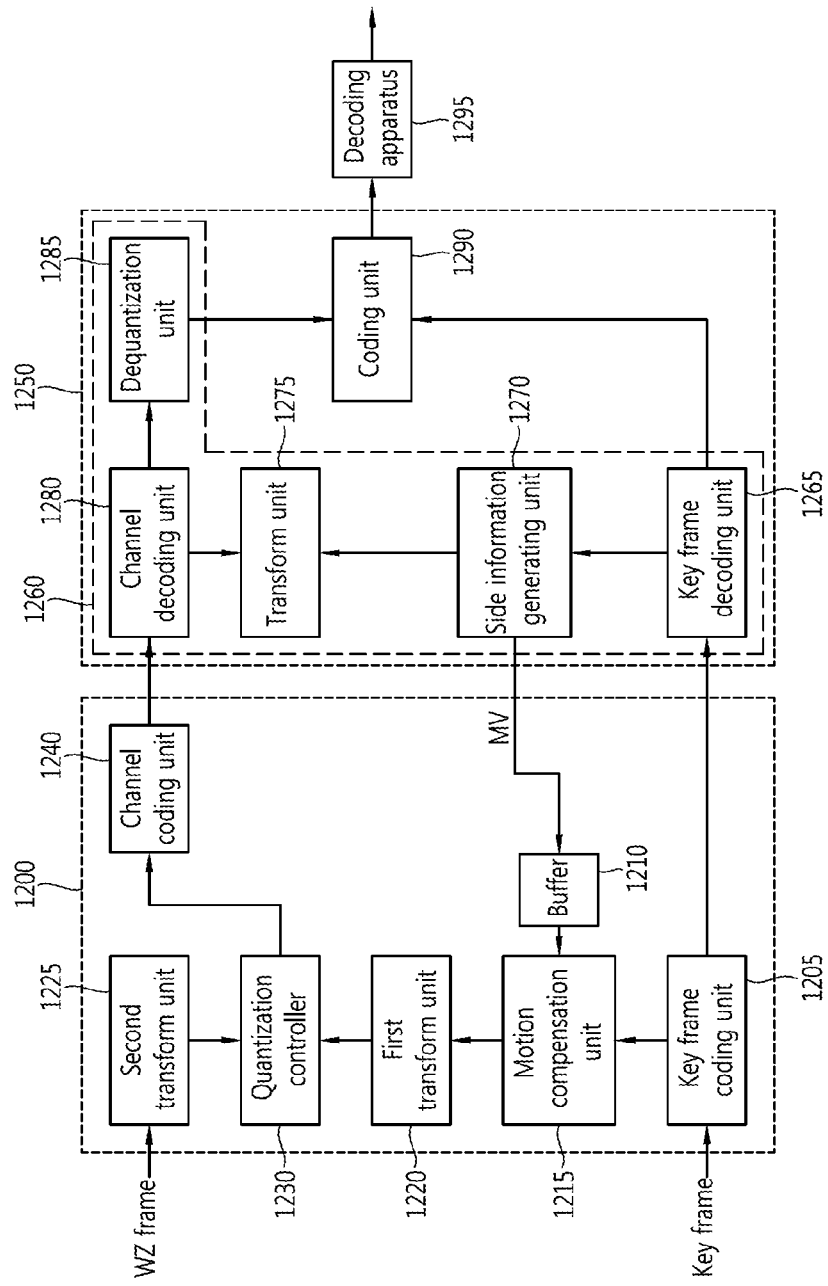
FIG. 12 is a block diagram illustrating a configuration of a transcoding apparatus according to another embodiment of the present invention.

FIG. 12 is a block diagram illustrating a configuration of a transcoding apparatus according to another embodiment of the present invention.

FIG. 12 is a block diagram illustrating a configuration of a transcoding apparatus according to another embodiment of the present invention, showing an example in which the distributed video encoding apparatus 1100 and the distributed video decoding apparatus 1150 are applied. A distributed video encoding apparatus 1200 and a distributed video decoding apparatus 1260 included in a transcoding apparatus 1250 perform the same functions as those of the elements using the same reference numerals illustrated in FIG. 11, so a detailed description thereof will be omitted to avoid redundancy.

The transcoding apparatus performs a transform function to allow the conventional decoding apparatus 1295, which does perform distributed video decoding, to decode an image encoded through the distributed video encoding apparatus 1200 according to an embodiment of the present invention.

Referring to FIG. 12, the transcoding apparatus 1250 according to an embodiment of the present invention may include a distributed video decoding apparatus 1260 and a coding unit 1290.

The distributed video decoding apparatus 1260 decodes a encoded key frame provided from the distributed video encoding apparatus 1200, generates side information by using the decoded key frame, and provides a motion vector generated during the process of generating the side information to the distributed video encoding apparatus 1200.

Also, the distributed video decoding apparatus 1260 corrects the generated side information by using a parity bit provided from the distributed video encoding apparatus 1200, and dequantizes the same to reconstruct a WZ frame.

As described above, the key frame and the WZ frame reconstructed through the distributed video decoding apparatus 1260 are provided to the coding unit 1290, and the coding unit 1290 encodes the received key frame and the WZ frame, and provides the encoded frames to the decoding apparatus 1295. Here, the coding unit 1290 may encode the received key frame and the WZ frame by using various known coding techniques such as H.264/AVC, MPEGx, or the like, and preferably, the same standard technique as the decoding standard technique applied to the decoding apparatus may be applied to the coding.

Figure 13:
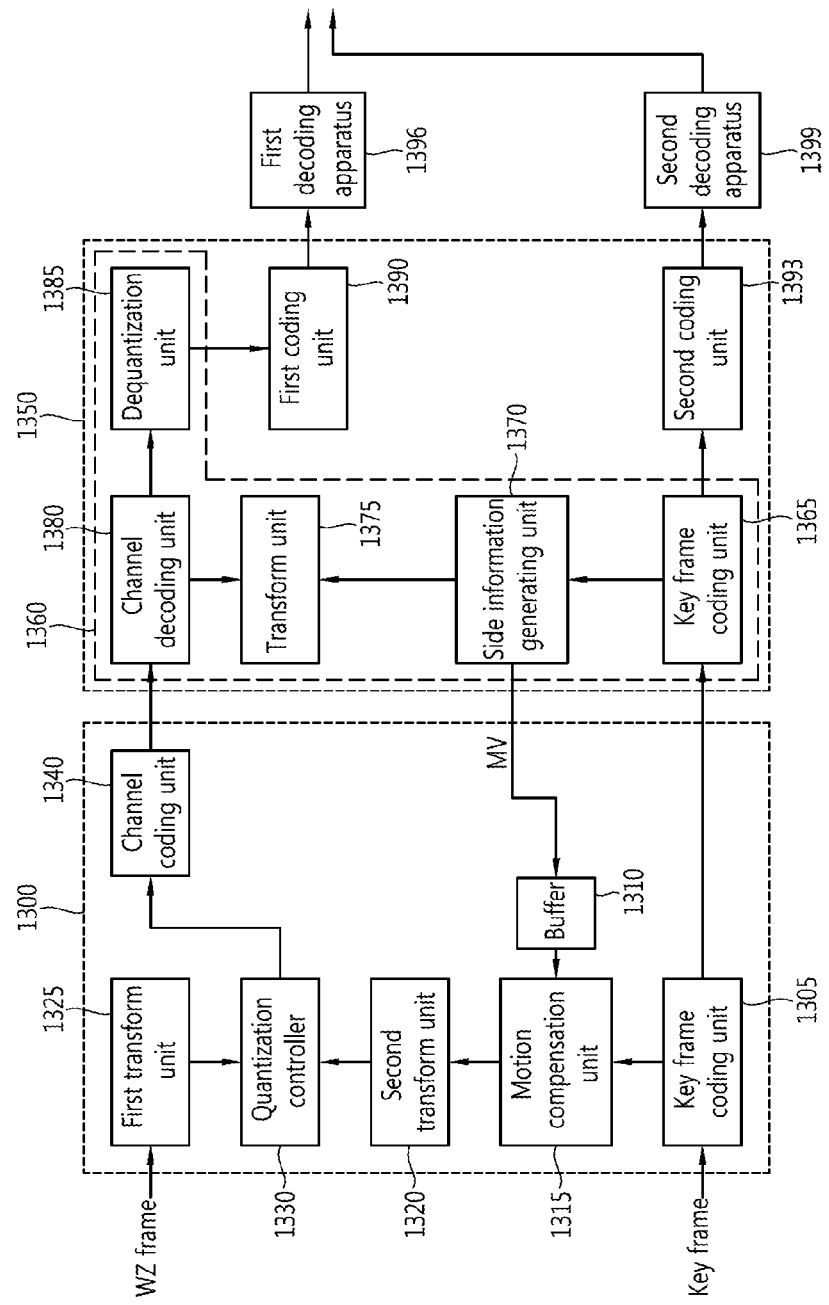
FIG. 13 is a block diagram illustrating a configuration of a transcoding apparatus according to another embodiment of the present invention.

FIG. 13 is a block diagram illustrating a configuration of a transcoding apparatus according to another embodiment of the present invention.

A distributed video encoding apparatus 1300 and a distributed video decoding apparatus 1360 included in a transcoding apparatus 1350 illustrated in FIG. 13 perform the same functions as those of the elements using the same reference numerals illustrated in FIG. 11, so a detailed description thereof will be omitted to avoid redundancy.

Referring to FIG. 13, the transcoding apparatus 1350 according to an embodiment of the present invention may include a distributed video decoding apparatus 1360, a first coding unit 1390, and a second coding unit 1393.

The distributed video decoding apparatus 1360 decodes a encoded key frame provided from the distributed video encoding apparatus 1200, generates side information by using the decoded key frame, and provides a motion vector generated during the process of generating the side information to the distributed video encoding apparatus 1300.

Also, the distributed video decoding apparatus 1360 corrects the generated side information by using a parity bit provided from the distributed video encoding apparatus 1300, and dequantizes the same to reconstruct a WZ frame.

As described above, the WZ frame reconstructed through the distributed video decoding apparatus 1360 is provided to the first coding unit 1390, and the reconstructed key frame is provided to the second 1390. The first coding unit 1390 encodes the reconstructed WZ frame and provides the same to a first decoding apparatus 1396, and the second coding unit 1393 encodes the reconstructed key frame and provides the same to a second decoding apparatus 1399. Here, the first coding unit 1390 and the second coding unit 1393 may encode the received key frame and the WZ frame by using various known coding techniques such as H.264/AVC, MPEGx, or the like, rather than the distributed video encoding method, and preferably, the same standard technique as the decoding standard technique applied to the decoding apparatus may be applied to the coding.

Figure 14:
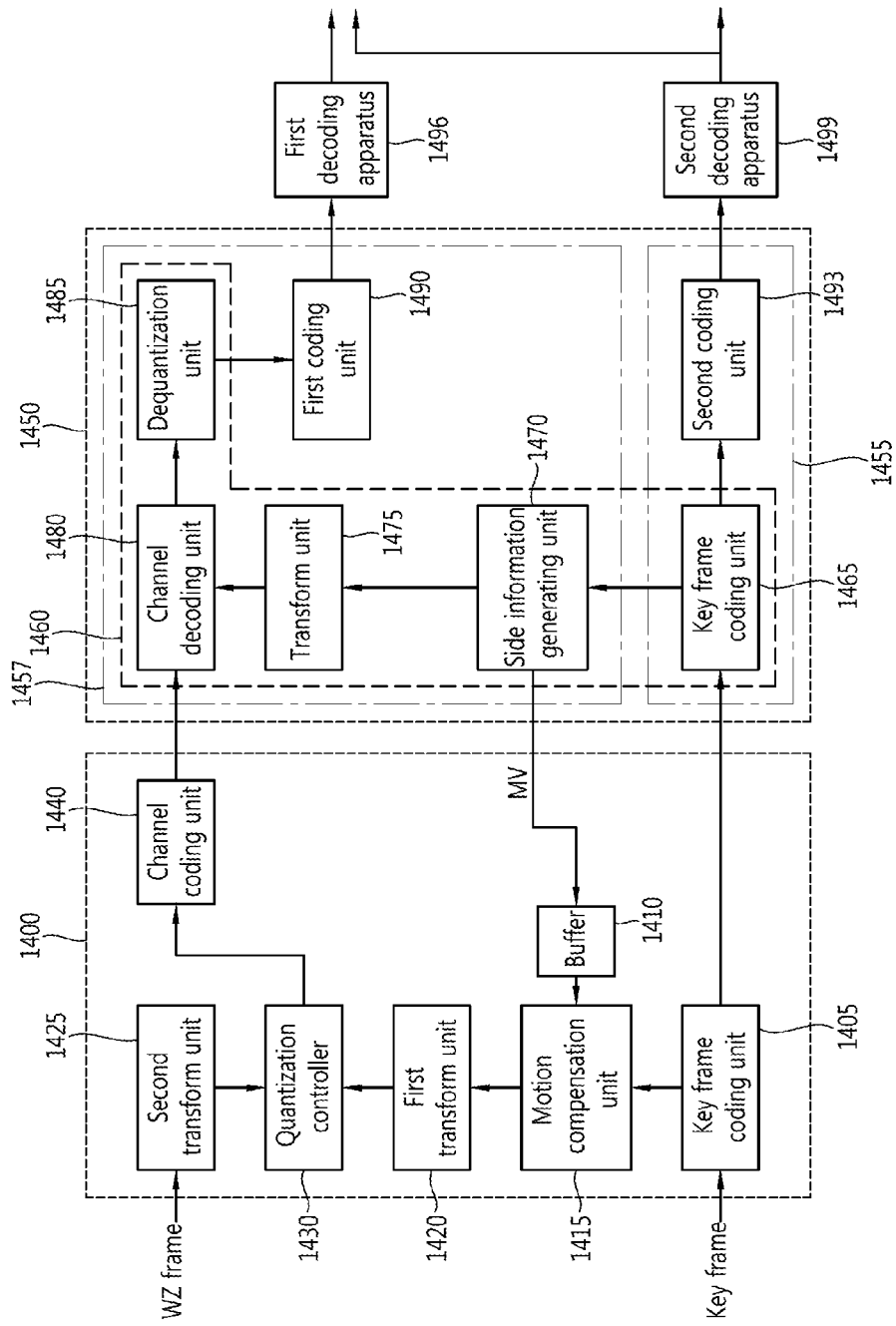
FIG. 14 is a block diagram illustrating a configuration of a transcoding apparatus according to another embodiment of the present invention.

FIG. 14 is a block diagram illustrating a configuration of a transcoding apparatus according to another embodiment of the present invention.

FIG. 14 is a block diagram illustrating a configuration of a transcoding apparatus according to another embodiment of the present invention, showing an example in which a transcoding apparatus 1450 employing a distributed video decoding apparatus 1460 has a scalability in a time axis. A distributed video encoding apparatus 1400 and the distributed video decoding apparatus 1460 included in a transcoding apparatus 1450 illustrated in FIG. 14 perform the same functions as those of the elements using the same reference numerals illustrated in FIG. 11, so a detailed description thereof will be omitted to avoid redundancy.

Referring to FIG. 14, the transcoding apparatus 1450 may include a base layer transcoding unit 1455, and an enhancement layer transcoding unit 1457. The base layer transcoding unit 1455 may include a decoding unit 1465 and a second coding unit 1493, and the enhancement layer transcoding unit 1457 may include a side information generating unit 1470, a transform unit 1475, a channel decoding unit 1480, a dequantization unit 1485, and a first coding unit 1490.

The base layer transcoding unit 1455 decodes a encoded key frame provided from the distributed video encoding apparatus 1400, encodes it through the second coding unit 1493, and provides the same to the second decoding unit 1499. Also, the base layer transcoding unit 1455 provides the decoded key frame to the enhancement layer transcoding unit 1457.

The enhancement layer transcoding unit 1457 generates side information based on the key frame provided from the base layer transcoding unit 1455, corrects the generated side information by using a parity bit provided from the distributed video encoding apparatus 1400, dequantizes the corrected side information, encodes the dequantized side information through the first coding unit, and provides the same to the first decoding apparatus 1496. Here, the enhancement layer transcoding unit 1457 provides a motion vector generated during the process of generating the side information to the distributed video encoding apparatus 1400. The first coding unit 1490 and the second coding unit 1493 may perform coding by using various known coding techniques such as H.264/AVC, MPEGx, or the like, rather than the distributed video encoding method, and preferably, the same standard technique as the decoding standard technique applied to the corresponding decoding apparatus may be applied to the coding.

As illustrated in FIG. 14, the transcoding apparatus according to another embodiment of the present invention encodes the reconstructed key frame through the base layer transcoding unit 1455, encodes the reconstructed WZ frame through the enhancement layer transcoding unit 1457, and provides them to the second decoding apparatus 1499 and the first decoding apparatus 1496, respectively. Thus, in the case of the base layer, only the result decoded in the second decoding apparatus 1499 is output, and in the case of the enhancement layer, result images decoded in the second decoding apparatus 1499 and the first decoding apparatus 1496 are realigned and output.

Figure 15:
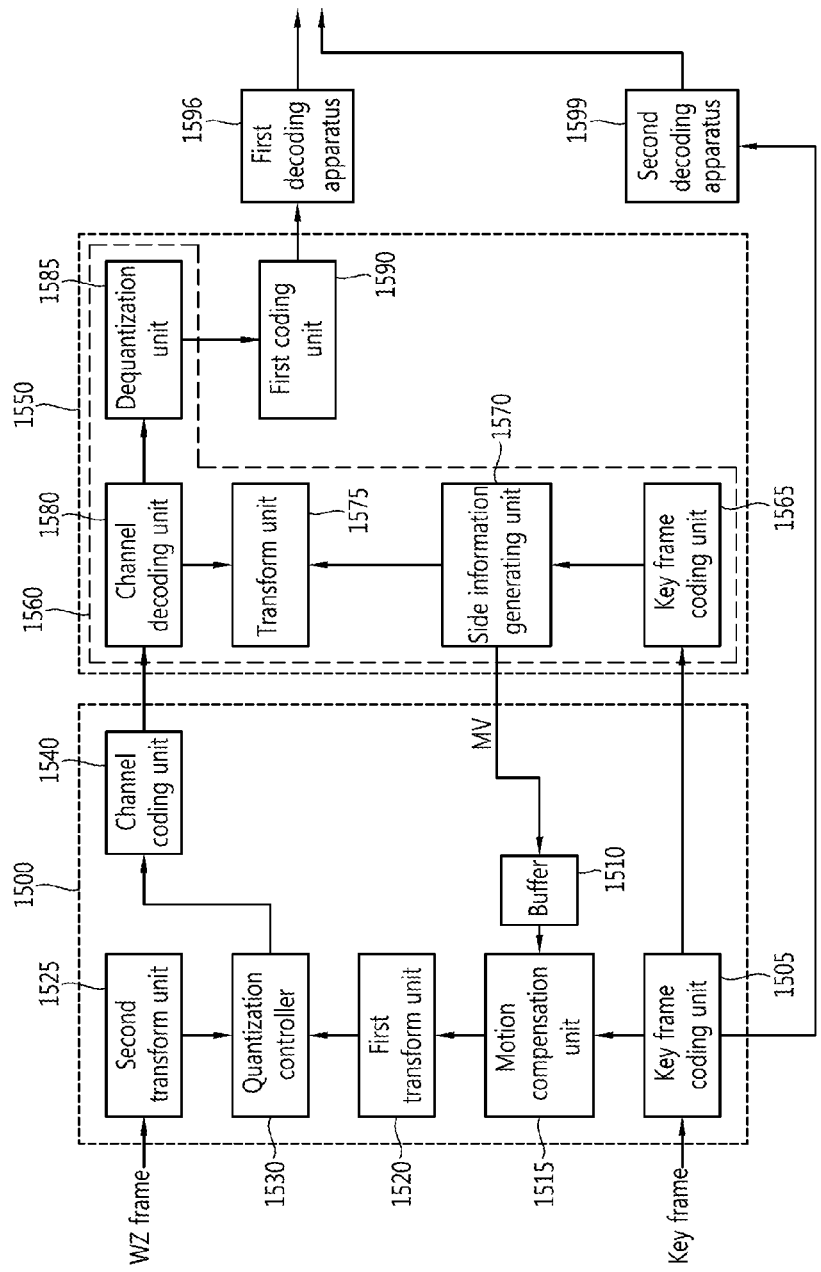
FIG. 15 is a block diagram illustrating a configuration of a transcoding apparatus according to another embodiment of the present invention.

FIG. 15 is a block diagram illustrating a configuration of a transcoding apparatus according to another embodiment of the present invention.

A distributed video encoding apparatus 1500 and a distributed video decoding apparatus 1560 included in a transcoding apparatus 1550 illustrated in FIG. 15 perform the same functions as those of the elements using the same reference numerals illustrated in FIG. 11, so a detailed description thereof will be omitted to avoid redundancy.

Referring to FIG. 15, a key frame encoded in the distributed video encoding apparatus 1500 is provided to a key frame decoding unit 1565 of the transcoding apparatus 1550, and simultaneously, to a second decoding apparatus 1599. Namely, the key frame decoded through a decoding unit 1565 of the transcoding apparatus 1550 is provided only to a side information generating unit 1570 so as to be used only to generate side information, and the decoded key frame is not provided to an external decoding apparatus. Thus, an image decoded in the second decoding apparatus 1599 is an image encoded in a key frame coding unit 1505 of the distributed video encoding apparatus 1500, and the transcoding apparatus 1550 does not perform extra processing to provide the encoded key frame to the second decoding apparatus 1599.

Also, the transcoding apparatus 1550 corrects the side information by using a parity bit provided from the distributed video encoding apparatus 1500, dequantizes the corrected side information, encodes the dequantized side information through a first coding unit 1593, and provides the same to a first decoding apparatus 1596.

Figure 16:
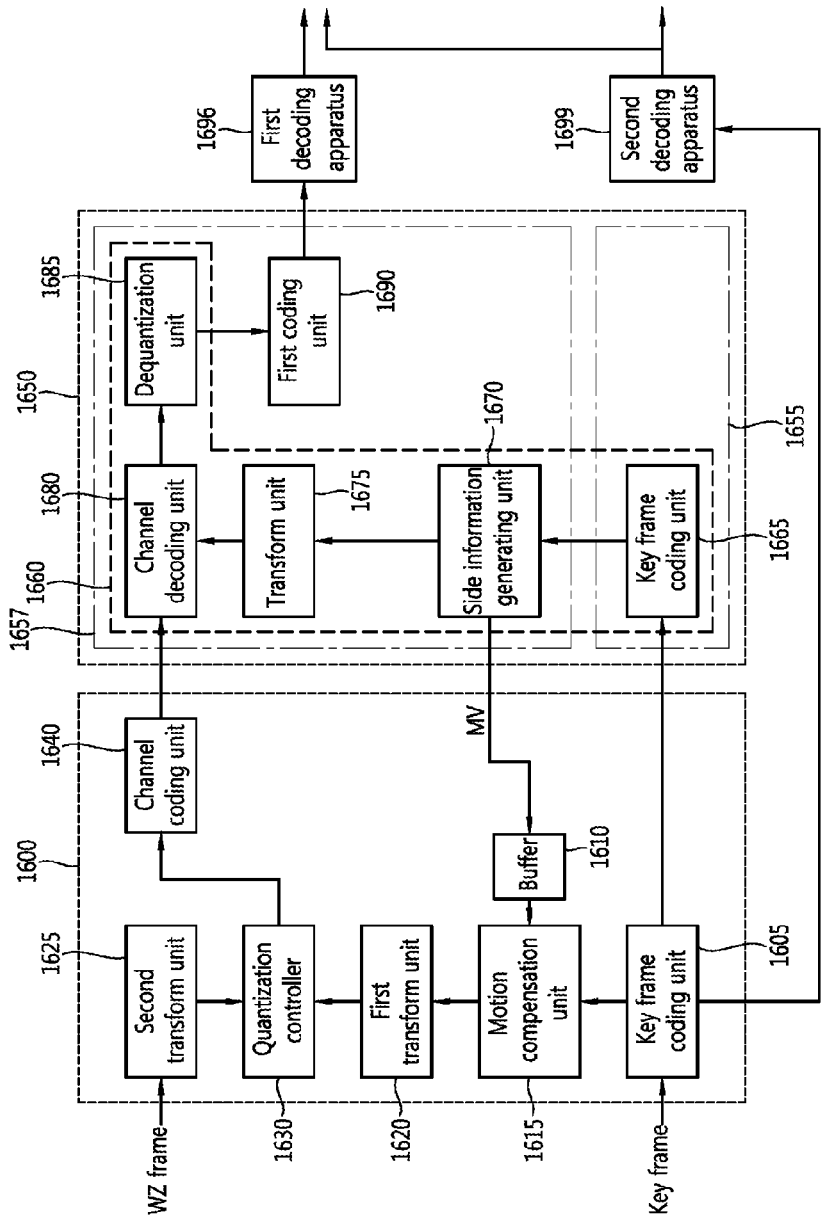
FIG. 16 is a block diagram illustrating a configuration in which the transcoding apparatus illustrated in FIG. 15 has scalability in a time axis.

FIG. 16 is a block diagram illustrating a configuration in which the transcoding apparatus illustrated in FIG. 15 has scalability in a time axis.

Referring to FIG. 16, a transcoding apparatus 1650 may include a base layer transcoding unit 1655 and an enhancement layer transcoding unit 1657. The base layer transcoding unit 1655 may include a decoding unit 1665, and the enhancement layer transcoding unit 1657 may include a side information generating unit 1670, a transform unit 1675, a channel decoding unit 1680, a dequantization unit 1685, and a first coding unit 1690.

The base layer transcoding unit 1655 decodes a encoded key frame provided from the distributed video encoding apparatus 1600 and provides the same to the side information generating unit 1670. Here, the key frame decoded through the base layer transcoding unit 1655 is provided only to a side information generating unit 1670 of the enhancement layer transcoding unit 1657 so as to be used only to generate side information, and the decoded key frame is not provided to an external decoding apparatus. Thus, an image decoded in the second decoding apparatus 1696 is an image encoded a coding unit 1605 of the distributed video encoding apparatus 1600, and the base layer transcoding unit 1655 does not perform extra processing to provide the encoded key frame to the second decoding apparatus 1696.

The enhancement layer transcoding unit 1657 generates side information based on the key frame provided from the base layer transcoding unit 1655, corrects the generated side information by using a parity bit provided from the distributed video encoding apparatus 1600, dequantizes the corrected side information, encodes the dequantized side information through the first coding unit 1690, and provides the same to the first decoding apparatus 1693. Here, the enhancement layer transcoding unit 1657 provides a motion vector generated during the process of generating the side information to the distributed video encoding apparatus 1600.

As illustrated in FIG. 16, the transcoding apparatus 1650 according to another embodiment of the present invention encodes the reconstructed key frame through the base layer transcoding unit 1655 and provides the same to the enhancement layer transcoding unit 1657, and encodes the reconstructed WZ frame through the enhancement layer transcoding unit 1657, and provides the same to the first decoding apparatus 1693. Thus, in the case of the base layer, only the result decoded in the second decoding apparatus 1696 is output, and in the case of the enhancement layer, result images decoded in the second decoding apparatus 1696 and the first decoding apparatus 1693 are realigned and output.

Figure 17:
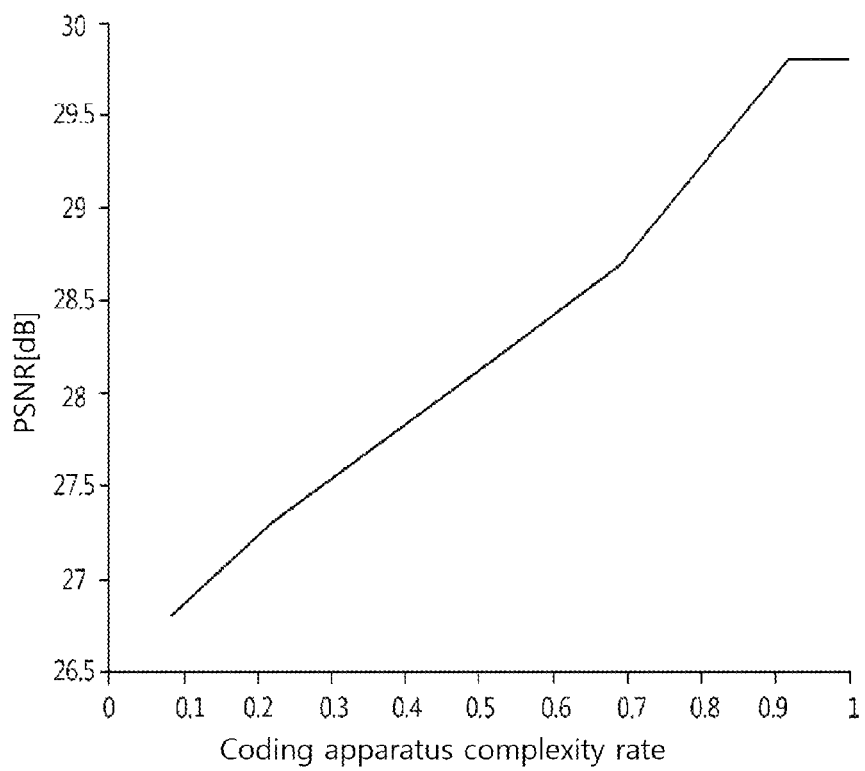
FIG. 17 is a graph showing a relationship between complexity of a coding apparatus and side information.

FIG. 17 is a graph showing a relationship between complexity of a encoding apparatus and side information.

In FIG. 17, the horizontal axis indicates a complexity rate of a distributed video encoding apparatus, which signifies complexity of a motion prediction. Also, the vertical axis indicates a PSNR (Peak Signal to Noise Ratio), which signifies quality of side information (SI).

Referring to FIG. 17, it can be seen that as complexity of the distributed video encoding apparatus is increased, quality of side information is enhanced. When the quality of the side information is enhanced, a difference between the side information and encoded original image is reduced, reducing a parity bit required for decoding. Thus, as the complexity of the distributed video encoding apparatus is increased, coding efficiency is increased.

Figure 18:
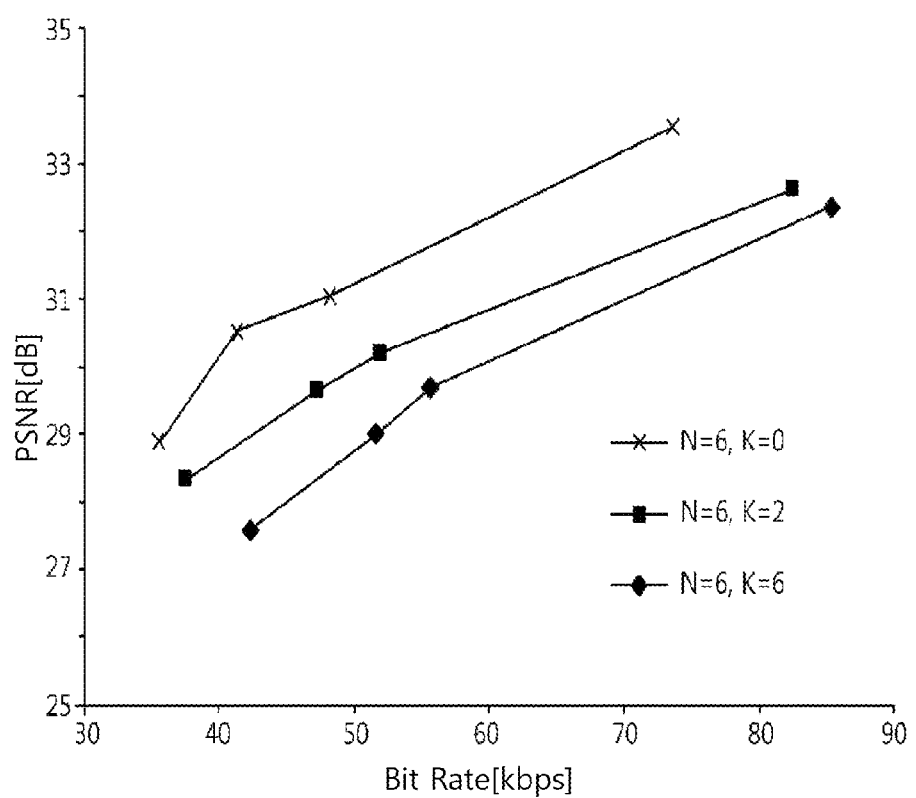
FIG. 18 is a graph showing a change in performance over a motion prediction rate of a encoding apparatus.

FIG. 18 is a graph showing a change in performance over a motion prediction rate of a encoding apparatus.

FIG. 18 is a graph showing a change in performance over a motion prediction rate of a distributed video encoding apparatus, in which a rate of a motion prediction was adjusted by using TSS (Three Step Search), one of motion prediction methods, and a corresponding PSNR was measured and illustrated.

In FIG. 18, N is a total number of steps of TSS, and K is the number of TSS steps performed in the encoding apparatus.

Referring to FIG. 18, it can be seen that as the size of K is increased, coding efficiency is enhanced. For example, when PSNR is 30 dB, if K is 2, coding efficiency was enhanced by about 20% in comparison to a case in which K is 0, and when K is 6, coding efficiency was increased by about 35% in comparison to a case in which K is 0. Here, when K is 2, FEC data is additionally transmitted by an amount of bits saved in comparison to the case in which K is 0, the total amount of transmitted bits is maintained to be equal to that of the case in which K is 0 and decoded data can be transmitted without a degradation of quality up to 20% of a packet loss rate (PLR).

In the distributed video encoding/decoding method and distributed video encoding/decoding apparatus according to an embodiment of the present invention based on the foregoing characteristics, when a channel loss is made, complexity of the decoding apparatus is increased to increase coding efficiency, and additional FEC data is transmitted by the reduced amount of bits according to the increased coding efficiency, thus increasing loss resilience.

For example, when it is defined that $R_a$ is an available bit rate, $r_{FEC}$ is an FEC rate, and PLR is a packet loss rate, if a channel loss is made when the encoding apparatus transmits data to the decoding apparatus at an available bit rate $R_a$, the decoding apparatus normally receives only $(1-PLR)R_a$. The encoding apparatus determines the FEC rate ($r_{FEC}$) by using the available bit rate ($R_a$) indicating a channel state and a prediction value of the PLR. When the FEC ($r_{FEC}$) is determined, data transmitted by the encoding apparatus is $(1-r_{FEC} \times PLR) \times R_a$, and the FEC data is $r_{FEC} \times PLR \times R_a$. Here, the available bit rate ($R_a$) and the PLR are changed according to a channel state, so the value $r_{FEC}$ is also changed according to a channel state. Thus, when the available bit rate ($R_a$) is reduced, the size of the transmittable FEC data is reduced.

In an embodiment of the present invention, in order to minimize an increase in the use of network resources according to an addition of FEC data, the complexity of the encoding apparatus is increased to enhance coding efficiency, whereby a size of data to be transmitted is reduced and FEC data is added by the reduced amount of data, and thus, loss resilience can be increased without additionally using network resources.

Figure 19:
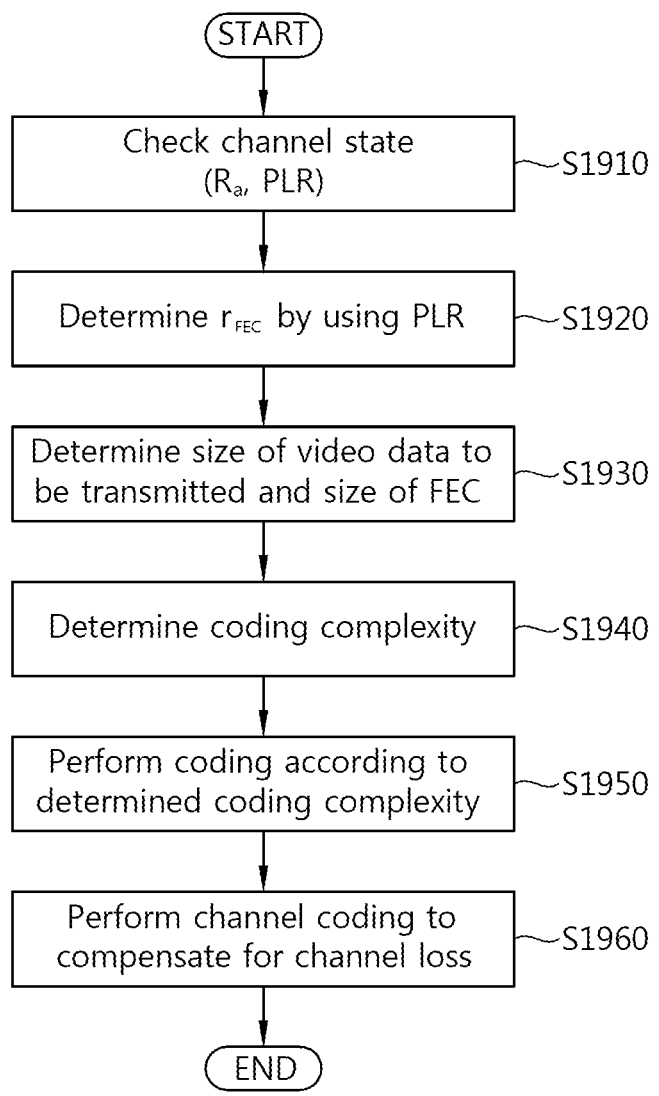
FIG. 19 is a flow chart illustrating a distributed video encoding method according to another embodiment of the present invention.

FIG. 19 is a flow chart illustrating a distributed video encoding method according to another embodiment of the present invention.

FIG. 19 is a flow chart illustrating a distributed video encoding method according to another embodiment of the present invention, showing a process of increasing loss resilience in consideration of both an variable available bandwidth and loss according to a channel state.

Referring to FIG. 19, first, the encoding apparatus checks a channel state by obtaining an available bit rate ($R_a$) and PLR (step S1910).

Next, the encoding apparatus determines an FEC rate ($r_{FEC}$) based on the obtained PLR (S1920). For example, the FEC rate may be determined to be double the obtained PLR, but the present invention is not limited thereto and it may be adjusted into a different value according to a channel state.

And then, the encoding apparatus determines a size of video data to be transmitted and a size of FEC data based on the PLR and the FEC rate (step S1930). Here, the size of the video data to be transmitted may be determined to $(1-r_{FEC} \times PLR) \times R_a$, and the size of the FEC data may be determined to $r_{FEC} \times PLR \times R_a$.

Thereafter, the encoding apparatus determines coding complexity for performing coding according to the determined size of the video data (step S1940). Here, determining of the coding complexity may be performed by determining the number of TSS (Three Step Search) performing steps, one of motion prediction methods, and the number of TSS performing steps may be determined in consideration of the number of TSS performing steeps over a PLR in units of predetermined image frames. Also, as for the number of TSS performing steps over the PLR, an optimal value obtained through a repeated experimentation may be previously stored in the form of a look-up table or the number of TSS performing steps over the PLR may be obtained in real time through arithmetical calculation.

Thereafter, the encoding apparatus performs a motion prediction according to the coding complexity determined in step S1940 to execute encoding (step S1950). Here, the encoding apparatus may provide the motion vector and information regarding a total number of TSS steps, the number of TSS performing steps, and the like, used in motion prediction to the decoding apparatus.

Thereafter, the encoding apparatus performs channel coding to compensate for a channel loss, and provides encoded data to the decoding apparatus (step S1960). Here, the encoding apparatus performs channel coding according to the FEC rate determined in step S1920.

As illustrated in FIG. 19, in the distributed video encoding method according to an embodiment of the present invention, coding efficiency is enhanced by increasing complexity of the encoding apparatus according to a channel state, whereby n number of video packets transmitted according to the related art encoding method can be reduced to n-k number of video packets, and the reduced k number of packets are allocated as additional FEC packets. Thus, resilience to a loss can be enhanced without additionally using network resources, and accordingly, quality of service is guaranteed.

Figure 20:
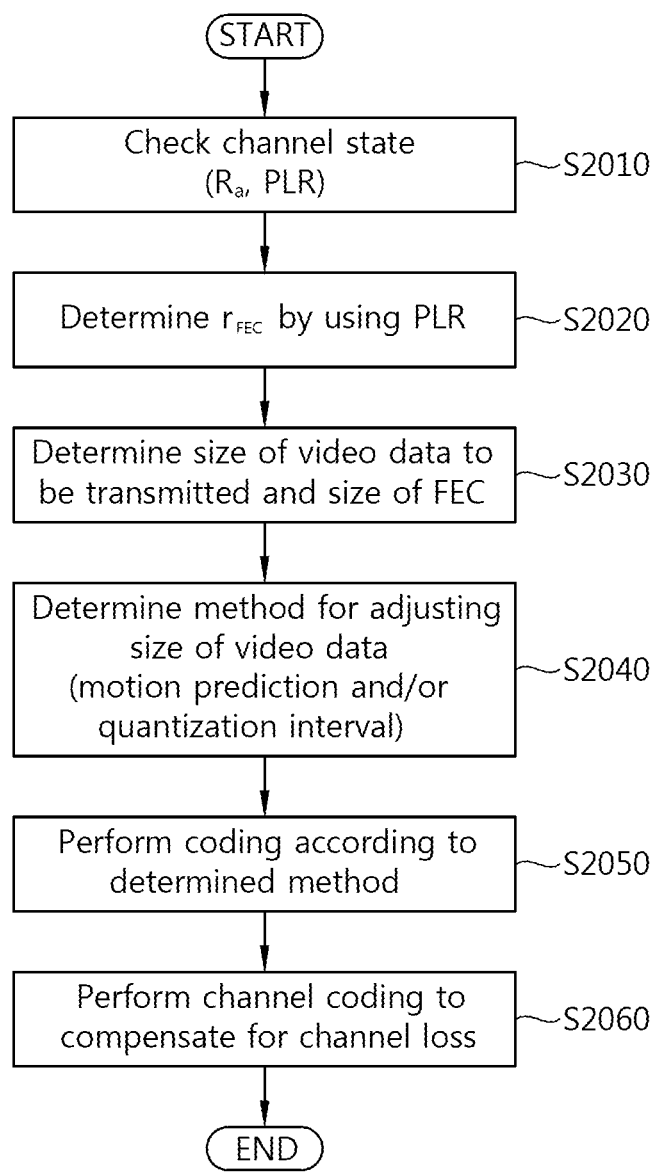
FIG. 20 is a flow chart illustrating a distributed video encoding method according to another embodiment of the present invention.

FIG. 20 is a flow chart illustrating a distributed video encoding method according to another embodiment of the present invention.

Steps S2010 to S2030 illustrated in FIG. 20 are the same as steps S1910 to S1930 illustrated in FIG. 19, so a detailed description thereof will be omitted to avoid redundancy.

Referring to FIG. 20, when a size of video data to be transmitted and a size of FEC data are determined according to a channel state in steps S2010 and S2030, the encoding apparatus determines a method for adjusting the size of video data according to the determined size of video data (S2040).

In the distributed video encoding method according to another embodiment of the present invention, the method of adjusting a video size may include a method of adjusting a quantization interval, a method of increasing complexity of the encoding apparatus, and a method of using the two methods mixedly.

The method of adjusting a quantization interval is advantageous in that there is no increase in complexity and an adjustable width of a data size is large, but when the size of the quantization interval is increased, quality of video may be degraded. Also, the method of adjusting complexity of the encoding apparatus is advantageous in that quality of video can be maintained to be the same because a motion prediction is performed, but complexity thereof is increased to limit adjustment of a video data size. Thus, when a significant loss is made, this method cannot be applied.

In the distributed video encoding method according to another embodiment of the present invention, the size of video data may be adjusted by using any one of the method of adjusting a quantization interval, the method of increasing complexity of the encoding apparatus, and the method of using the both methods mixedly in consideration of pre-set priority (e.g., a channel state, performance of the encoding apparatus, and/or user preference).

For example, in case of adjusting the size of video data by using the two methods mixedly based on user preference, a reference value of the lowest quality allowed by a user may be defined, and when video quality is reduced to below the defined reference value due to adjustment of a quantization interval according to a channel state, the adjustment of the quantization interval is stopped and the complexity of the encoding apparatus may be adjusted to adjust video data size.

Or, when high priority is given to video quality, adjustment of complexity is preferentially applied, and when high priority is given to a usage time, i.e., power consumption, the size of video data may be adjusted by applying adjustment of quantization interval.

As described above, when a method for adjusting a size of video data is determined in step S2040, encoding is performed based on the determined method (step S2050), channel coding is performed to compensate for a channel loss and encoded data is provided to the decoding apparatus (step S2060). Here, the encoding apparatus performs channel coding according to the determined FEC rate.

Figure 21:
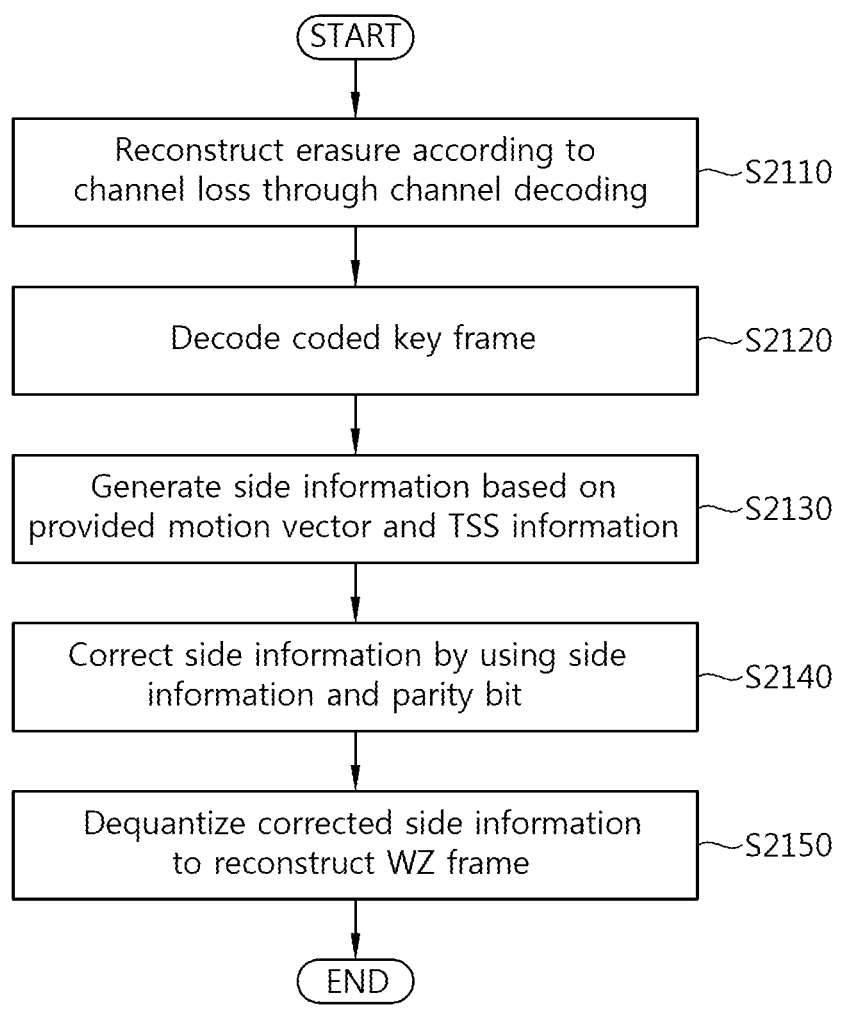
FIG. 21 is a flow chart illustrating a distributed video encoding method according to another embodiment of the present invention.

FIG. 21 is a flow chart illustrating a distributed video encoding method according to another embodiment of the present invention.

FIG. 21 is a flow chart illustrating a distributed video encoding method according to another embodiment of the present invention, showing a decoding method when the distributed video encoding apparatus performs a motion prediction and provides encoded data.

Referring to FIG. 21, the decoding apparatus channel-decodes encoded data transmitted from the encoding apparatus to reconstruct erasure due to a channel loss (step S2110). Here, erasure refers to data lost through a channel loss.

And then, the decoding apparatus decodes a encoded key frame provided from the encoding apparatus (step S2120). The decoding apparatus may decode the key frame through various known decoding techniques such as H.264/AVC, MPEGx, or the like, but preferably, the decoding apparatus decodes the key frame by using the same standard as that used to encode the key frame in the encoding apparatus.

Thereafter, the decoding apparatus performs a motion prediction by using the motion vector and information regarding the total number of TSS steps, the number of TSS performing steps, and the like, provided from the encoding apparatus, to generate side information (SI) (step S2130).

The decoding apparatus decodes the channel loss-reconstructed data to extract a parity bit, corrects the generated SI by using the extracted parity bit (step S2140), and dequantizes the corrected SI to reconstruct a WZ frame (step S2150).

Figure 22:
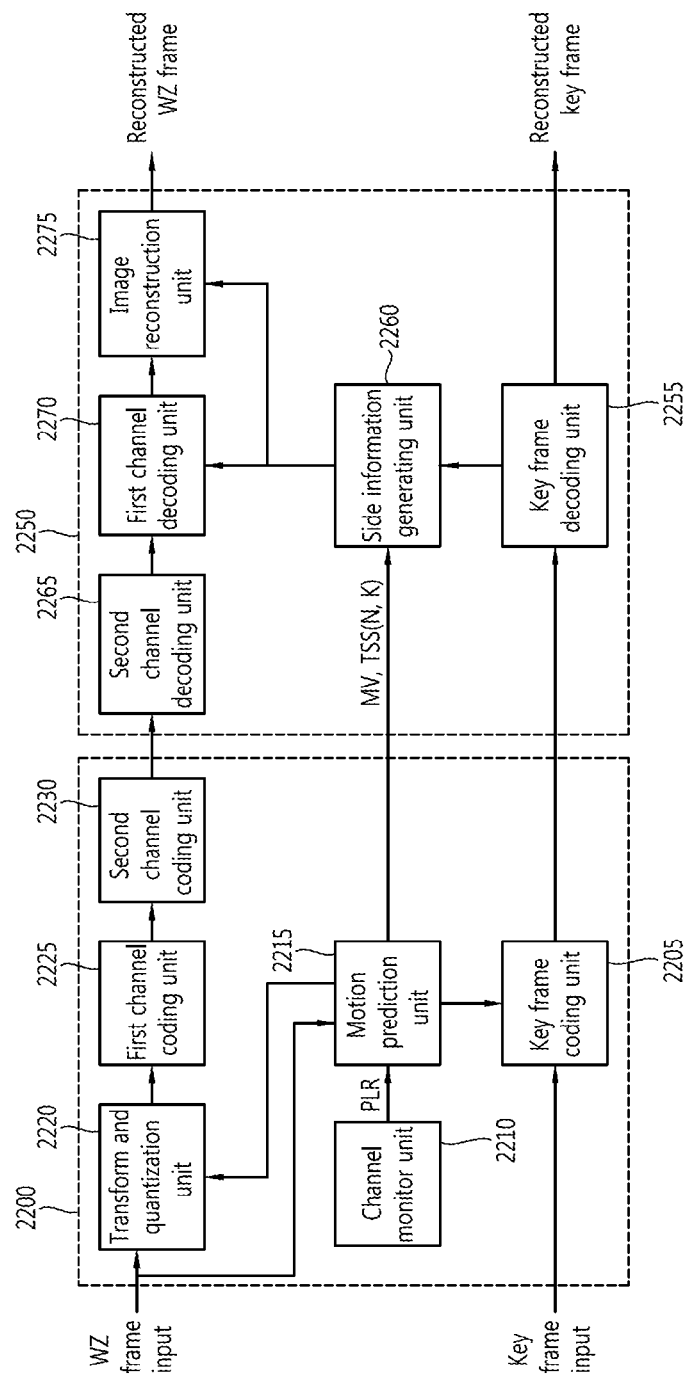
FIG. 22 is a block diagram illustrating a configuration of a distributed video encoding/decoding apparatus according to another embodiment of the present invention.

FIG. 22 is a block diagram illustrating a configuration of a distributed video encoding/decoding apparatus according to another embodiment of the present invention.

Referring to FIG. 22, a distributed video encoding apparatus 2200 according to an embodiment of the present invention may include a key frame coding unit 2205, a channel monitor unit 2210, a motion prediction unit 2215, a transform and quantization unit 2220, a first channel coding unit 2225, and a second channel coding unit 2230. The distributed video encoding apparatus 2200 encodes an input key frame and provides the same to a distributed video decoding apparatus, and over a WZ frame, the distributed video encoding apparatus 2200 determines the number of motion prediction performing steps according to a channel state, generates parity bits by performing a motion prediction according to the determined number of steps, and provides the generated parity bit, the motion vector, and the motion prediction performing information to the distributed video decoding apparatus.

The key frame coding unit 2205 encodes an input key frame, and provides the encoded key frame to the motion prediction unit 2215 and the key frame decoding unit 2270 of the distributed video decoding apparatus 2250. Here, the key frame coding unit 2205 may encode the key frame through various known coding technique such as H.264/AVC, MPEGx, or the like.

The channel monitor unit 2210 obtains an available bit rate ($R_a$) and/or packet loss rate (PLR) to check a channel state, and provides channel state information (PLR) to the motion prediction unit 2215. Also, the channel monitor unit 2210 determines an FEC rate based on the PLR, and provides the determined FEC rate to the second channel coding unit 2230.

The motion prediction unit 2215 determines the number of motion prediction performing steps (i.e., the number K of TSS performing steps) based on the channel state information (PLR) provided from the channel monitor unit 2210, performs motion prediction on the encoded key frame based on the determined number motion prediction performing steps to generate side information, and provides the generated side information too the transform and quantization unit 2220. Also, the motion prediction unit 2215 provides the motion vector MV used for motion prediction and information regarding a total number of TSS steps, the number of TSS performing steps, and the like, as the motion prediction information to the side information generating unit 2260 of the distributed video decoding apparatus 2270.

The transform and quantization unit 2220 transforms the side information provided from the motion prediction unit 2215, quantizes the same, and provides the quantized side information to the first channel coding unit 2225.

The first channel coding unit 2225 generates a parity bit with respect to the quantized data by using a channel code, and subsequently provides the same to the second channel coding unit 2230.

The second channel coding unit 2230 performs channel coding to compensate for erasure due to a channel loss according to an FEC rate provided from the channel monitor unit 2210, and provides the channel-coded data to a distributed video decoding apparatus 2270. The second channel coding unit 2265 may perform channel coding, for example, by using Reed-Solomon code.

When the PLR provided from the distributed video encoding apparatus 2200 to the channel monitor unit 2210 is included within an allowable range, a motion prediction may not be performed, and in this case, the input WZ frame is provided to the transform and quantization unit 2220.

Also, the distributed video decoding apparatus 2250 according to an embodiment of the present invention may include a key frame decoding unit 2255, a side information generating unit 2260, a second channel decoding unit 2265, a first channel decoding unit 2270, and an image reconstruction unit 2275. The distributed video encoding apparatus 2250 decodes a encoded key frame provided from the distributed video encoding apparatus 2200, performs a motion prediction on the decoded key frame by using the provided motion vector and motion prediction information to generate side information, and cancels noise included in the generated side information by using a channel-coded parity bit, thus reconstructing a WZ frame.

In detail, the key frame decoding unit 2255 decodes a encoded key frame provided from the key frame coding unit 2205 of the distributed video encoding apparatus 2200.

The side information generating unit 2260 generates side information by performing a motion prediction on the decoded key frame by using the motion vector and the information regarding the total number of TSS steps and the number of TSS performing steps, and the like, provided from the distributed video encoding apparatus 2225. Here, the side information generated by the side information generating unit 2260 has been generated by using the motion prediction information provided from the distributed video encoding apparatus 2200, so it may be identical to the side information generated by the motion prediction unit 2215.

The second channel decoding unit 2265 may channel-decode data provided from the distributed video encoding apparatus 2200 to reconstruct erasure due to a channel loss.

The first channel decoding unit 2270 may perform channel decoding on the erasure-reconstructed data to extract a parity bit, and correct noise included in the side information by using the extracted parity bit, thus estimating quantized data.

The image reconstruction unit 2275 dequantizes the quantized data estimated by the first channel decoding unit 2270, and inversely transforms the same to reconstruct a WZ frame. Here, ambiguity generated in the dequantization may be solved with reference to the side information provided from the side information generating unit 2260.

Figure 23:
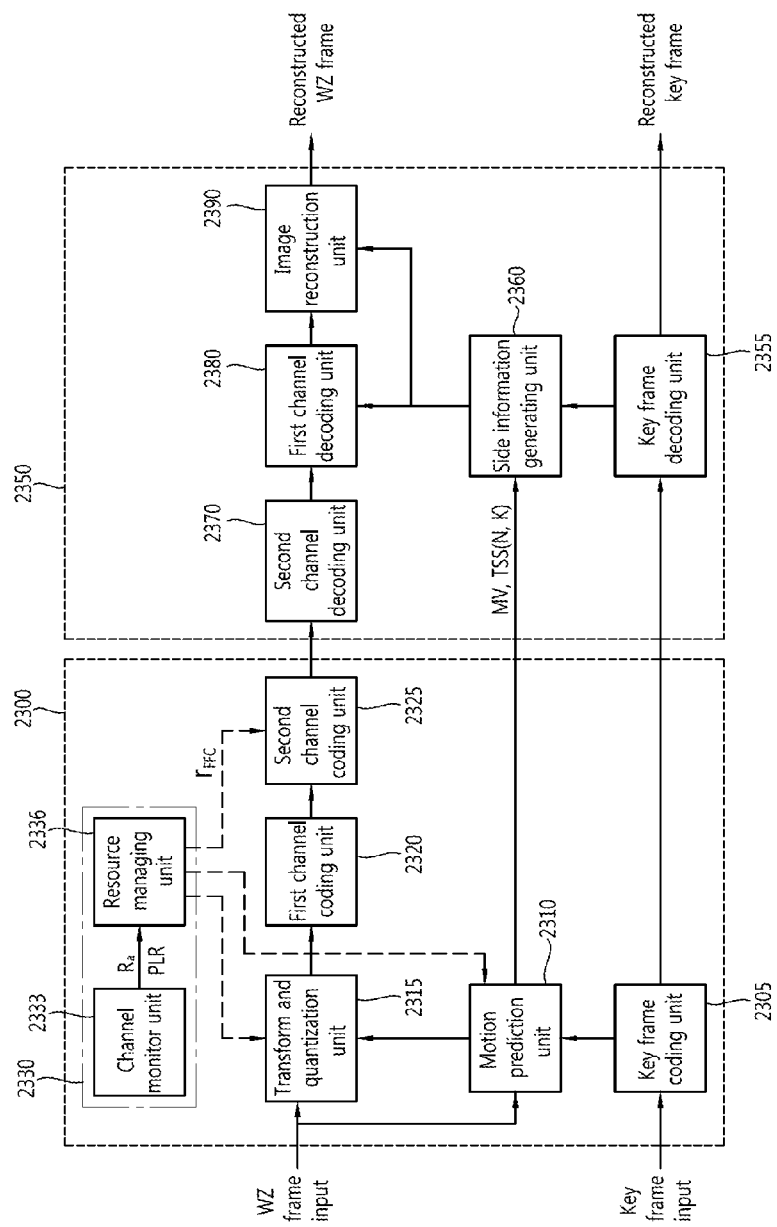
FIG. 23 is a block diagram illustrating a configuration of a distributed video encoding/decoding apparatus according to another embodiment of the present invention.

FIG. 23 is a block diagram illustrating a configuration of a distributed video encoding/decoding apparatus according to another embodiment of the present invention.

Referring to FIG. 23, a distributed video encoding apparatus 2300 according to another embodiment of the present invention may include a key frame coding unit 2305, a controller 2330, a motion prediction unit 2310, a transform and quantization unit 2315, a first channel coding unit 2320, and a second channel coding unit 2325.

The key frame coding unit 2305 encodes an input key frame and provides the encoded key frame to the motion prediction unit 2310 and the key frame decoding unit 2355 of the distributed video decoding apparatus 2350. Here, the key frame coding unit 2355 may encode the key frame through various known coding technique such as H.264/AVC, MPEGx, or the like.

The controller 2330 may include a channel monitor unit 2333 and a resource management unit 2336. The channel monitor unit 2333 obtains an available bit rate ($R_a$) and a packet loss rate (PLR) to check a channel state, and provides the obtained available bit rate ($R_a$) and the PLR to the resource management unit 2336. The resource management unit 2336 sets an FEC rate ($r_{FEC}$) based on the available bit rate ($R_a$) and the PLR provided from the channel monitor unit 2333, and provides the set FEC rate ($r_{FEC}$) to the second channel coding unit 2235. Here, the resource management unit 2336 may set the FEC rate ($r_{FEC}$) to be double the PLR.

Also, the resource management unit 2336 calculates a size $((1-r_{FEC} \times PLR) \times R_a)$ of video data and a size $(r_{FEC} \times PLR \times R_a)$ of FEC data, and determines a method for adjusting a size of video data based on the calculated data size and pre-set priority.

The resource management unit 2336 may adjust the number of motion prediction performing steps (i.e., the number K of performing TSS) or a quantization interval such that it corresponds to the calculated size of video data, and determine to perform a motion prediction and quantization interval adjustment complexly. Here, the resource management unit 2336 may determine any one of adjustment of the quantization interval, the motion prediction performing steps, and the two methods complexly, as a method of adjusting a size of video data in consideration of a channel state, performance of the encoding apparatus, and/or user preference, and provide a control signal corresponding to the determination.

The motion prediction unit 2310 may perform a motion prediction on the encoded key frame based on the number of motion prediction performing steps (i.e., the number K of performing TSS) as a control signal provided from the resource management unit 2336 to generate side information, and provides the generated side information to the transform and quantization unit 2315. Also, the motion prediction unit 2310 provides the motion vector MV used for motion prediction, and the information regarding the total number of TSS steps, the number of TSS performing steps, and the like, as motion prediction information, to the side information generating unit 2360 of the distributed video decoding apparatus 2350.

The transform and quantization unit 2315 transforms side information provided from the motion prediction unit 2310, quantizes the same, and provides the quantized information to the first channel coding unit 2320. When a method for adjusting a size of video data is determined to be a quantization interval adjustment, the transform and quantization unit 2315 may perform quantization according to a quantization interval as a control signal provided from the resource management unit 2336.

The first channel coding unit 2320 generates a parity bit with respect to the quantized data by using a channel code, and provides the same to the second channel coding unit 2325.

The second channel coding unit 2325 performs channel coding to compensate for erasure due to a channel loss, and provides the channel-coded data to the distribution video decoding apparatus 2350. Here, the second channel coding unit 2370 may perform channel coding according to information regarding an FEC rate provided from the resource management unit 2336.

Also, the distributed decoding apparatus 2350 according to another embodiment of the present invention may include a key frame decoding unit 2355, a side information generating unit 2360, a second channel decoding unit 2370, a first channel decoding unit 2380, and an image reconstruction unit 2390.

The key frame decoding unit 2355 decodes a encoded key frame provided from the key frame coding unit 2305 of the distributed video encoding apparatus 2300.

The side information generating unit 2360 generates side information by performing a motion prediction on the decoded key frame by using the motion vector and the information regarding the total number of TSS steps and the number of TSS performing steps, and the like, provided from the distributed video encoding apparatus 2300. Here, the side information generated by the side information generating unit 2360 has been generated by using the motion prediction information provided from the distributed video encoding apparatus 2300, so it may be identical to the side information generated by the motion prediction unit 2310.

The second channel decoding unit 2370 may channel-decode data provided from the distributed video encoding apparatus 2300 to reconstruct erasure due to a channel loss.

The first channel decoding unit 2380 may perform channel decoding on the erasure-reconstructed data to extract a parity bit, and correct noise included in the side information by using the extracted parity bit, thus estimating quantized data.

The image reconstruction unit 2390 dequantizes the quantized data estimated by the first channel decoding unit 2380, and inversely transforms the same to reconstruct a WZ frame. Here, ambiguity generated in the dequantization may be solved with reference to the side information provided from the side information generating unit 2360.

According to the foregoing embodiment of the present invention, the foregoing distributed video encoding method may be used in a plurality of image capturing apparatuses (distributed video encoding apparatuses), and data provided from the plurality of distributed video encoding apparatuses may be decoded in a plurality of distributed video decoding apparatuses.

Namely, a plurality of distributed video encoding apparatuses and a plurality of distributed video decoding apparatuses may be provided according to an embodiment of the present invention.

Hereinafter, various embodiments utilizing the distributed video encoding apparatus and the distributed video decoding apparatus employing the distributed video coding and decoding method will be described.

In the embodiment of the present invention hereinafter, a distributed video encoding apparatus may be used to have the same meaning as an image capturing apparatus or a camera.

A detailed configuration of an image capturing apparatus as a distributed video encoding apparatus and a distributed video decoding apparatus for decoding data provided from the image capturing apparatus is not disclosed for the description purpose, but the image capturing apparatus or camera (the image capturing apparatus, the camera, and the distributed video encoding apparatus are used to have the same meaning in an embodiment of the present invention) and a decoding apparatus for decoding data transmitted from the image capturing apparatus or the camera may use the configuration of the distributed video encoding apparatus and the distributed video decoding apparatus as described above.

For example, an element for capturing an image such as an image capturing apparatus or a camera according to an embodiment of the present invention may include a distributed video encoding apparatus, and an image may be encoded by using an encoding method using distributed video coding according to an embodiment of the present invention. For example, the image capturing apparatus may include a WZ frame coding unit and a key frame coding unit to encode image information.

Also, besides the WZ frame coding unit and the key frame coding unit, a buffer or a motion compensation unit may be additionally included in the image capturing apparatus to perform a motion prediction by using information provided from a distributed video decoder or decoding unit.

Also, the image capturing apparatus or the camera may further include a channel monitor unit for checking a state of a channel for transmitting data from the image capturing apparatus to the distributed video decoding apparatus and determining a channel coding rate and a size of video data to be transmitted, based on the checked channel state.

The distributed video decoding apparatus is a part for decoding a plurality of image data provided from the image capturing apparatus or the camera, which may include a key frame decoding unit, a channel code decoding unit, a side information generating unit, and an image reconstruction unit, which are elements included in the foregoing distributed video decoding apparatus.

Also, an additional coding unit may be included in the distributed video decoding apparatus in order to encode data, which has been decoded in the distributed video decoding apparatus according to a general encoding method, rather than the distributed video encoding method, through a general encoding method to thus allow a general video decoding apparatus to decode a distributed video encoded image.

Hereinafter, an image capturing apparatus and a camera will be taken as an example of an apparatus for performing distributed video coding will be described in an embodiment of the present invention hereinafter, but a configuration in which an apparatus for performing distributed video coding is provided outside an image capturing apparatus and a camera may also be included in the scope of the present invention.

In an embodiment of the present invention hereinafter, it is assumed that when a plurality of image capturing apparatuses are used, all the plurality of image capturing apparatuses perform distributed video coding for the description purpose, but a scheme in which only some of the plurality of image capturing apparatuses may perform distributed video coding and the others may perform general video coding, rather than distributed video coding may also be used.

Figure 24:
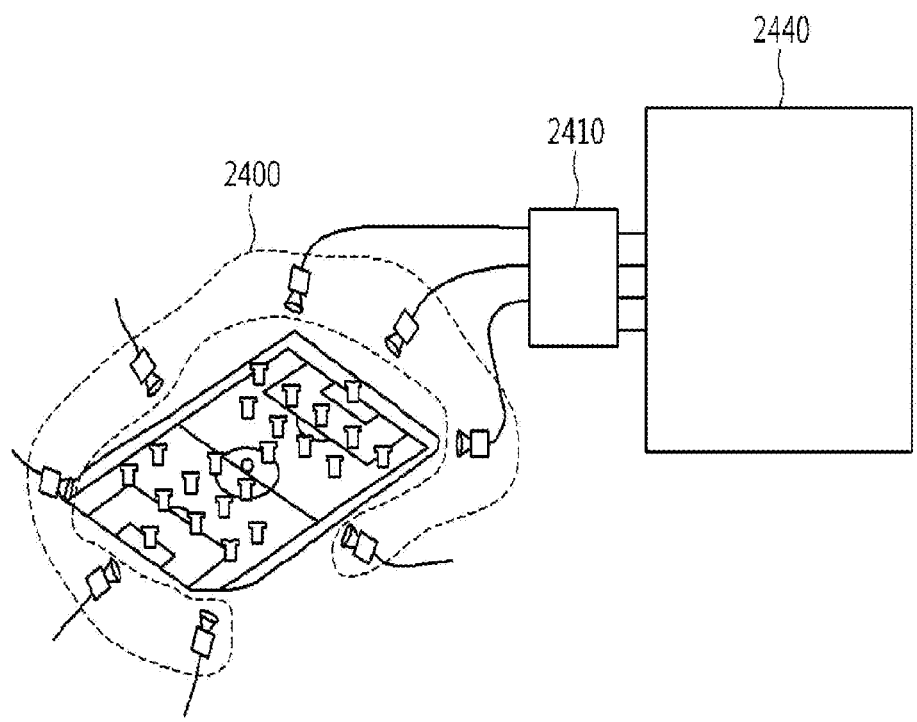
FIG. 24 is a conceptual view of a broadcasting system using a plurality of image capturing apparatuses using distributed video coding according to an embodiment of the present invention.

FIG. 24 is a conceptual view of a broadcasting system using a plurality of image capturing apparatuses using distributed video coding according to an embodiment of the present invention.

Referring to FIG. 24, in order to perform distributed video coding by using a plurality of image capturing apparatuses 2400, the plurality of image capturing apparatuses 2400 performing distributed video coding, a meta data tagging unit 2410 providing attribute information to an image provided from the plurality of image capturing apparatuses 2400, and a distributed video decoding apparatus 2420 for decoding information provided from the plurality of image capturing apparatuses 2400.

According to an embodiment of the present invention, only some of the plurality of image capturing apparatuses 2400 may perform distributed video coding while the others may use general video coding, rather than distributed video coding, but it is assumed that all the plurality of image capturing apparatuses 2400 perform distributed video coding on an image provided through an image capturing unit of the plurality of image capturing apparatuses 2400, for the description purpose.

The image capturing apparatus 2400 may include a distributed video encoding apparatus and encode an image by using an encoding method using distributed video coding according to an embodiment of the present invention. For example, the image capturing apparatus 2400 may include a WZ frame coding unit and a key frame coding unit to encode image information.

As described above, besides the WZ frame coding unit and the key frame coding unit, a buffer or a motion compensation unit may be additionally included in the image capturing apparatus 2400 to perform a motion prediction by using information provided from a distributed video decoding unit. Also, the image capturing apparatus 2400 may further include a channel monitor unit for checking a state of a channel for transmitting data from the image capturing apparatus to the distributed video decoding apparatus 2440 and determining a channel coding rate and a size of video data to be transmitted, based on the checked channel state.

A meta data tagging unit 2410 is a part for providing attribute information related to data to a plurality of image data captured by the image capturing apparatus 2400. The meta data tagging unit 2410 may provide various types of attribute information such as position information, information regarding an image capture subject, an image capture subject motion information, color characteristics of an image, and the like, to the plurality of image data captured by the image capturing apparatus 2400. Meta data is data provided to a plurality of image data contents, and a plurality of images generated based on the meta data provided to a plurality of image data may be selectively decoded.

According to an embodiment of the present invention, the meta data tagging unit 2410 is expressed as an independent device for the description purpose, but it may be included in the image capturing apparatus, or when there is no need to provide attribute information to image data, the meta data tagging unit 2410 may not be used.

The distributed video decoding apparatus 2440 is a part for decoding a plurality of image data provided from the image capturing apparatus 2400. The distributed video decoding apparatus 2440 may include a key frame decoding unit, a channel code decoding unit, a side information generating unit, and an image reconstruction unit, the elements included in the distributed video decoding apparatus 2440 as described above.

Also, an additional coding unit may be included in the distributed video decoding apparatus 2440 in order to encode data, which has been decoded in the distributed video decoding apparatus according to a general encoding method, rather than the distributed video encoding method, through a general encoding method to thus allow a general video decoding apparatus to decode an image.

Referring to FIG. 24, a plurality of image capturing apparatuses 2400 capture an image of a stadium in which a soccer match is held. Some of the plurality of image capturing apparatuses 2400 capture images of individual players, some of them captures images of the entirety of the stadium, and the others collectively capture images of a goal status behind goalpost. Namely, respective cameras captures video of various views according to roles thereof. The meta data tagging unit 2410 tag meta data to multi-video streams input from the plurality of image capturing apparatuses 2400.

According to an embodiment of the present invention, an element for selecting a view captured by a particular image capturing apparatus or an element for providing an image allowing for a particular even to be selectively viewed based on the tagged meta data may be additionally provided to provide image data corresponding to a view desired by a viewer to the user, or an element for selectively providing only a particular event desired by the user may be additionally provided.

Figure 25:
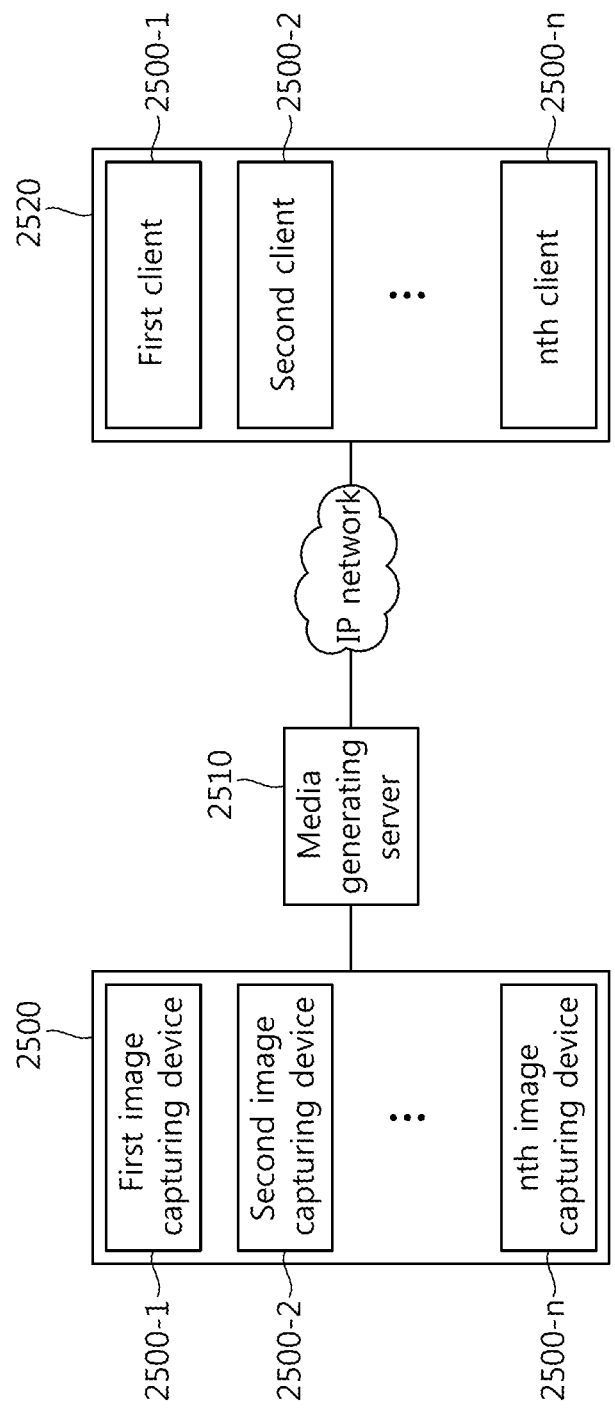
FIG. 25 is a conceptual view illustrating a media sharing system using a plurality of image capturing apparatuses using a distributed video encoding method according to an embodiment of the present invention.

FIG. 25 is a conceptual view illustrating a media sharing system using a plurality of image capturing apparatuses using a distributed video encoding method according to an embodiment of the present invention.

Referring to FIG. 25, the media sharing system includes a media generating device including a plurality of image capturing apparatuses 2500 and a media generating server 2510, and one or more clients 2520 connected to the media generating device through a communication network.

The image capturing apparatuses 2500 are assigned different unique identifiers (global unique identifiers (GUIDs)), and capture images of different views and provide the same to the media generating server 2510. The image capturing apparatuses 2500 may be cameras, or the like, for capturing images.

At least one of the image capturing apparatuses 2500 may include a distributed video coding unit to encode an image captured by an image capturing unit by using distributed video coding. The image capturing apparatuses 2500 may be connected to the media generating server 25510 through a fixed line or wirelessly. The image capturing apparatuses 2500 and the media generating server 2510 may be connected through an IEEE 1394 network or a wireless network.

The media generating server 2510 may include a distributed video decoding apparatus, and decodes image data transmitted from the image capturing apparatuses 2500. A distributed video decoding apparatus may be provided in the client 2520 according to circumstances.

The media generating server 2510 may assign the same multicast address or different port numbers to respective images captured by the image capturing apparatuses 2500, generate an SDP (Session Description Protocol) message including the assigned multicast address and port numbers, and transmit the message to the plurality of clients 2520. Here, the media generating server 2510 receives images from a plurality of image capturing apparatuses by executing a single VP producer, and assigns the same multicast address and different port numbers to the plurality of received images.

Also, the media generating server 25510 is assigned a multicast address different from the assigned multicast address through an SAP (Service Access Point) packet and transmits the SDP message to the clients 2520. Here, the SDP message includes service attribute information including at least one of the assigned multicast address and the plurality of port numbers, a name of a producer, a mail address, a video codec, picture quality of video, a service type.

The clients 2520 analyze the SDP message from the media generating device 2510 to extract the service attribute information, and outputs an image by the image capturing apparatus 2500 selected by the user or a multi-view image by the plurality of image capturing apparatuses 2500.

Also, the clients 2520 may display the multi-view image by the plurality of image capturing apparatuses 2500, as a wide image by using a network-tiled display device.

Figure 26:
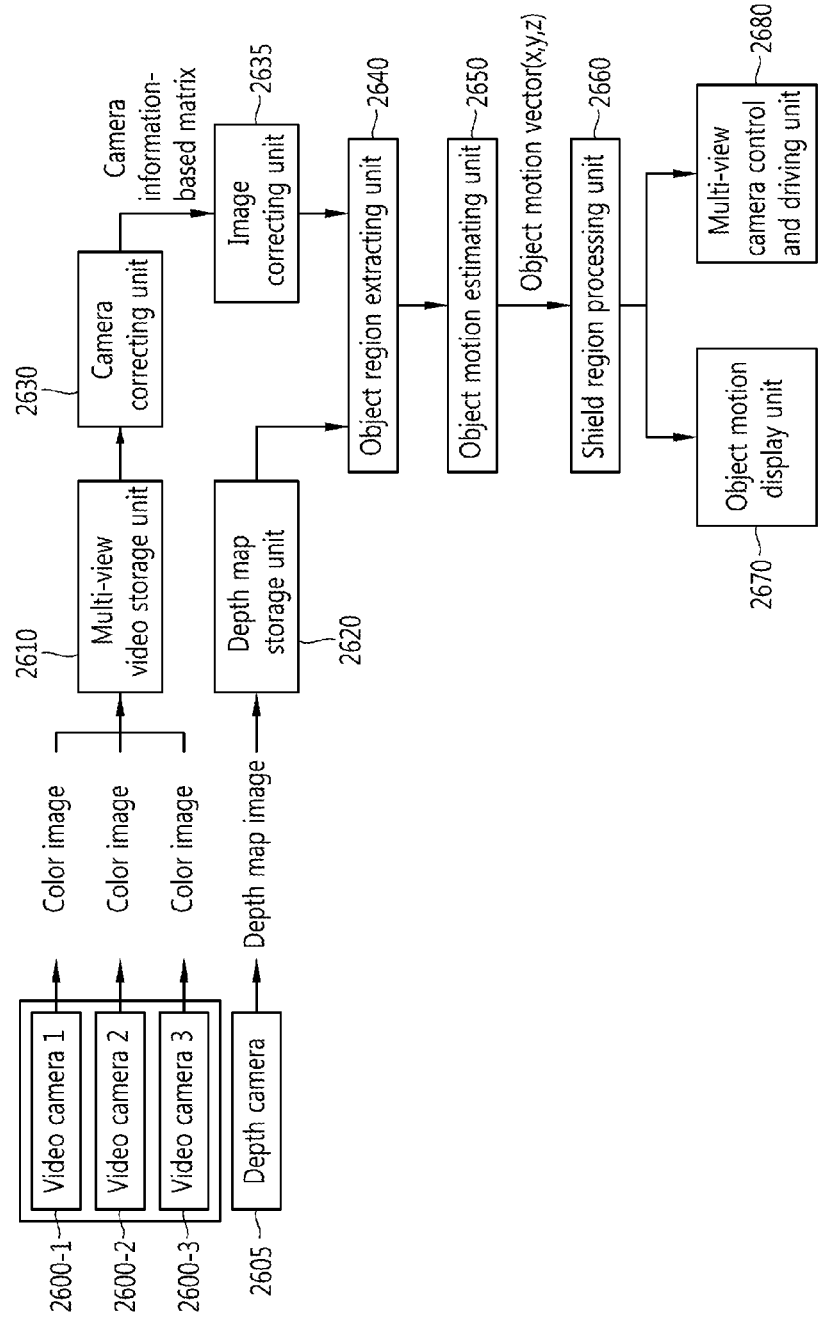
FIG. 26 is a conceptual view of a three-dimensional (3D) object tracking apparatus using a distributed video encoding method according to an embodiment of the present invention.
Figure 27:
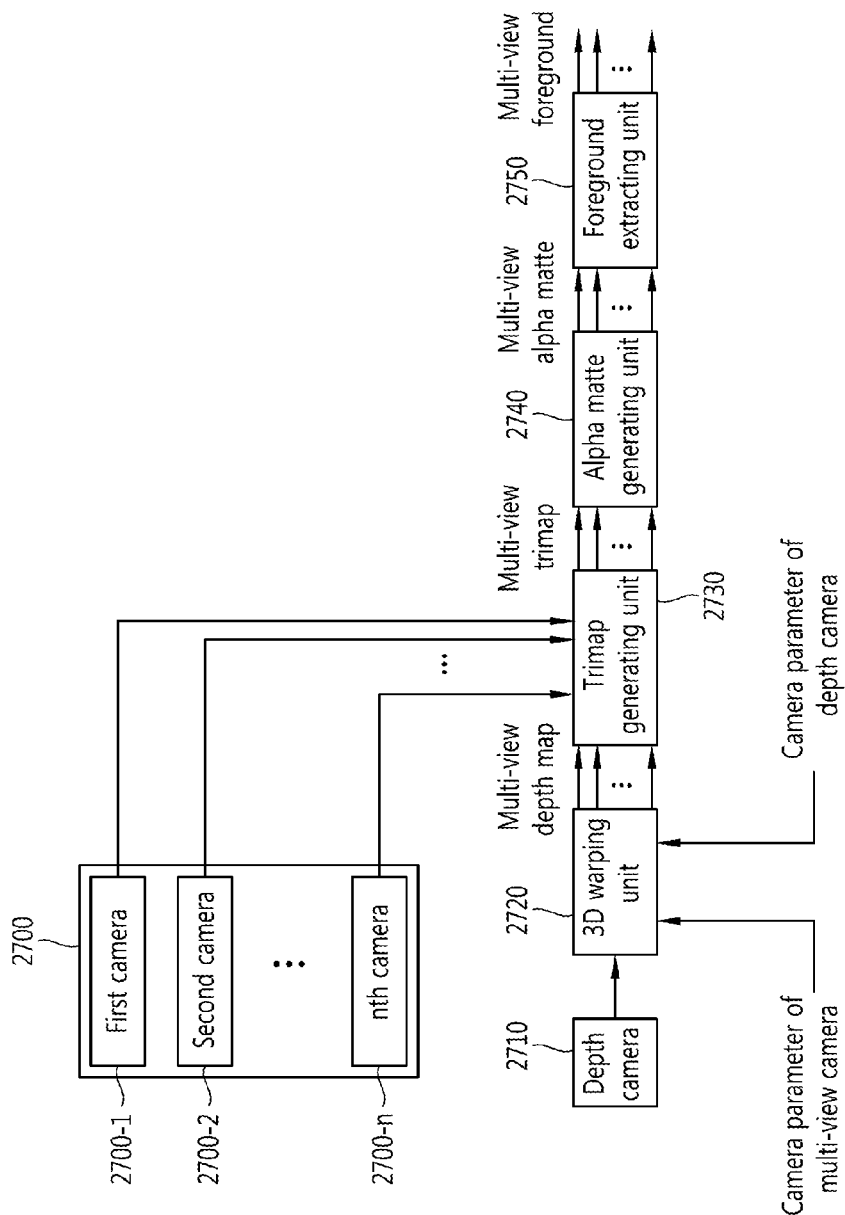
FIG. 27 is a block diagram illustrating a configuration of a multi-view image processing apparatus according to an embodiment of the present invention.

Hereinafter, FIGS. 26 and 27 illustrate a configuration of an apparatus for capturing a stereoscopic image by using distributed video coding and decoding according to an embodiment of the present invention. Such a configuration represents a particular embodiment of a system capturing a stereoscopic image, and a stereoscopic image capturing system using the distributed video encoder or the distributed video decoder according to an embodiment of the present invention as described above may also be included in the scope of the present invention.

FIG. 26 is a conceptual view of a three-dimensional (3D) object tracking apparatus using a distributed video encoding method according to an embodiment of the present invention.

As illustrated in FIG. 26, a 3D object tracking apparatus according to an embodiment of the present invention includes a multi-view video storage unit 2610 storing frame data of images obtained at the same time from at least two (preferably, three or more) video cameras (multi-view cameras) 2600, a depth map storage unit 2620 storing at least one depth map data obtained at the same time from a depth camera 2605 among at least two (preferably, three or more) video cameras, a camera correcting unit 2630 obtaining camera information including a camera focal length of each view, and base matrix with respect to positions between views and directions, an object region extracting unit 2640 extracting a moving object region from a background within an image by using the camera information and base matrix, a multi-view image of a previous frame and a current frame, and depth map data, an object motion estimating unit 2650 detecting a motion object of an extracted object region to obtain a 3D motion vectors of the object, and a shield region processing unit 2660 detecting a shield region from the object region to estimate a shielded position of the object through a reverse motion estimation of the previous frame and the current frame.

Also, the object tracking apparatus according to an embodiment of the present invention further includes a multi-view image correcting unit 2635 for correcting an epipolar line of the image obtained by the multi-view camera 2600 by using the base matrix such that it is consistent. Also, the object tracking apparatus according to an embodiment of the present invention may further include an object motion display unit 2670 for displaying a motion of an extracted object on a screen. Also, the object tracking apparatus according to an embodiment of the present invention may further include a multi-view camera control and driving unit 2680 for adjusting a position of the multi-view camera 2600 such that the object is positioned in the central region in the image in preparation for a case in which the object is out of the image.

The multi-view camera 2600 may encode an image captured by an image capturing unit through distributed video coding using a distributed video coding unit included in the multi-view camera 2600. As distributed video coding performed in the multi-view camera 2600, the same method as those described above may be used.

The multi-view video storage unit 2610 and the depth map storage unit 2620 may store video images obtained from several video cameras and one depth camera in a data storage device such as a video tape, a frame capturing device, or the like, and the stored image information is used as an input in the camera correcting unit 2630, the multi-view image correcting unit 2635, the object region extracting unit 2640, and the object motion estimating unit 2650.

The multi-view video storage unit 2610 and the depth storage unit 2620 may be connected to several video cameras and one depth camera through a wired or wireless network.

The distributed video decoding unit is provided in a part for processing an image in a rear stage of the multi-view storage unit 2610 to decode distributed video-coded image generated by the multi-view camera 2600.

The camera correcting unit 2630 may extract features of several images whose distance from the camera 2600 is known, and obtains a rotation matrix and a translation matrix for interconversion by using corresponding relationships and actual distance information of the features. Also, the camera correcting unit 2630 obtains camera information such as a focal length, or the like, through a camera correction scheme. Such information is used to continuously track an object by using a camera of a different view without a shield region, when a shield region is generated in estimating an object motion by the object motion estimating unit 2650.

The multi-view image correcting unit 2635 adjusts epipolar lines of images obtained from the other remaining cameras such that they are parallel to a line of a reference image of a reference camera by using a camera transformation matrix (base matrix) obtained from the camera correcting unit 2630. Accordingly, a search region and time can be reduced in tracking an object and stereomatching.

The object region extracting unit 2640 extracts pixels of an object region based on a determination reference of object and background pixels using brightness and depth difference between sequentially input current image and previously input image, a bounding box including all these pixels is applied to a current or next frame, and coordinates of a start point and end point are stored in a buffer. This is used to obtain a motion vector in an object motion next frame.

The object motion estimating unit 2650 compares an object region of a current frame extracted by the object region extracting unit 2640 and that of a next frame and detects a position of a block having the highest similarity, while selectively moving points within a block region detected in the next frame to the center of a block having a small row and column size among two region. Here, motion vectors between central points of the respective blocks are detected as motion vectors in x and y directions. Here, only in case that a position difference with the center of the original block is within a particular number of pixels when the similarity is smaller than a pre-set threshold value or when reverse matching is made on the detected block, it is regarded that there is no shielded region in the block and a motion vector of the central point is obtained, or otherwise, the corresponding region is detected as a shielded region by the shield region processing unit 2660.

FIG. 27 is a block diagram illustrating a configuration of a multi-view image processing apparatus according to an embodiment of the present invention.

Referring to FIG. 27, a multi-view image processing apparatus includes a multi-view camera 2700, a depth camera 2710, a 3D warping unit 2720, a trimap generating unit 2730, an alpha matte generating unit 2740, and a foreground extracting unit 2750.

As illustrated, the multi-view camera 2700 includes a plurality of cameras (first to nth cameras 2700-1, 2700-2, 2700-n). Viewpoints of the plurality of cameras are different according to the positions of the cameras, and the plurality of images having different view points are grouped into a multi-view image. The multi-view image obtained from the multi-view camera 2700 includes information regarding colors of respective 2D pixels constituting each image, but does not include 3D depth information.

The depth camera 2710 obtains a depth map having 3D depth information. The depth camera 2710 is a device obtaining depth information in real time by acquiring returning light beams after illuminating an object or a target region by a laser or infrared light. The depth camera 2710 includes a depth sensor for sensing depth information through a laser or an infrared ray.

At least one of the multi-view camera 2700 and the depth camera 2710 includes at least one distributed video encoding apparatus. An image captured by an image capturing unit by using a distributed video encoding apparatus included in the multi-view camera 2700 and the depth camera 2710 may be encoded, and the encoded video data is provided to the trimap generating unit 2730 or the 3D warping unit 2720 so as to be decoded by a distributed video decoding apparatus that may be provided in the trimap generating unit 2730 or the 3D warping unit 2720 or may be transformed into a different image format.

Image data provided from the multi-view camera 2700 and the depth camera 2710 may be provided to the trimap generating unit 2730 or the 3D warping unit 2720 through a fixed line or wirelessly.

Referring back to FIG. 27, a multi-view image obtained from the multi-view camera 2700 and a multi-view depth map from the 3D warping unit 2720 are input to the trimap generating unit 2730, and the trimap generating unit 2730 generates a multi-view trimap including trimaps corresponding to respective images constituting the multi-view image by using the multi-view depth map.

The multi-view trimap from the trimap generating unit 2730 may be input to the alpha matte generating unit 2740, and the alpha matte generating unit 2740 may generate a multi-view alpha matte corresponding to a multi-view image by using the input multi-view trimap.

The multi-view alpha mette generated by the alpha matte generating unit 2740 is input to the foreground extracting unit 2750, and the foreground extracting unit 2750 may extract a multi-view foreground by applying the multi-view alpha matte to the multi-view image from the multi-view camera 2700.

The trimap generating unit 2730 generates trimaps corresponding to respective images constituting the multi-view image by using a target image and a corresponding 3D warped depth map.

The trimap generating unit 2730 may include a segment unit, a foreground region determining unit, a hole removing unit, and an erosion/dilation calculation unit.

The segment unit performs color segmentation on respective images constituting a multi-view image to generate a segmented image. Color segmentation refers to a process of dividing an image into regions (segments) of similar colors.

The segment unit sets adjacent pixels in which a luminance or chrominance difference in a target image subjected to color segmentation is equal to or smaller than a threshold value, into a segment.

In a depth map obtained from the depth camera 2710, in general, no depth value exists or depth values exist sparsely in a region distant from the depth camera 2710, and all the depth values exist or depth values exist very densely in a region close to the depth camera 2710, according to a setting of the depth camera 2710. This is the same in a 3D warped depth map, and here, holes, i.e., pixels, whose depth values are not defined due to 3D warping, are generated. As described above, it may be considered that a discontinuous point of depth values is generated in the boundary of segments, so a region including a great amount of depth values may be determined as a foreground region, and an otherwise region may be determined as a background region in the segments.

Thus, according to segmentation results of respective image by the segment unit, the foreground region determining unit segments respective 3D warped depth maps corresponding thereto, and determines a set of segments in which depth values by a certain rate or greater exist in a corresponding segment, as a foregoing region. The rate may be appropriately determined. For example, a set of segments having depth values equal to or greater than 70% may be determined as a foreground region.

The erosion/dilation calculation unit generates a multi-view trimap by applying an erosion/dilation calculation to the input multi-view depth map. The trimap is an image before an alpha matte essential to perform matting is obtained, which is divided into a foreground, a background, and an uncertain region (or an unknown region) which does not belong to a foreground nor background. The erosion/dilation calculation unit generates the respective depth maps constituting the received multi-view depth map into a binary image according to a predefined threshold value, and inwardly erodes and outwardly dilates edge portions of the binary image to generate an unknown region to thus generate a multi-view trimap.

The 3D warped depth map includes a plurality of holes whose depth value is not defined, and the hole removing unit fills the holes with appropriate values by using neighboring pixel values in the foreground region of the 3D warped depth map. Portions other than the foreground region is not an object of attention, so the holes only in the foreground region may be filled FIG. 28 is a conceptual view illustrating a monitoring camera system using distributed video coding according to an embodiment of the present invention.

Figure 28:
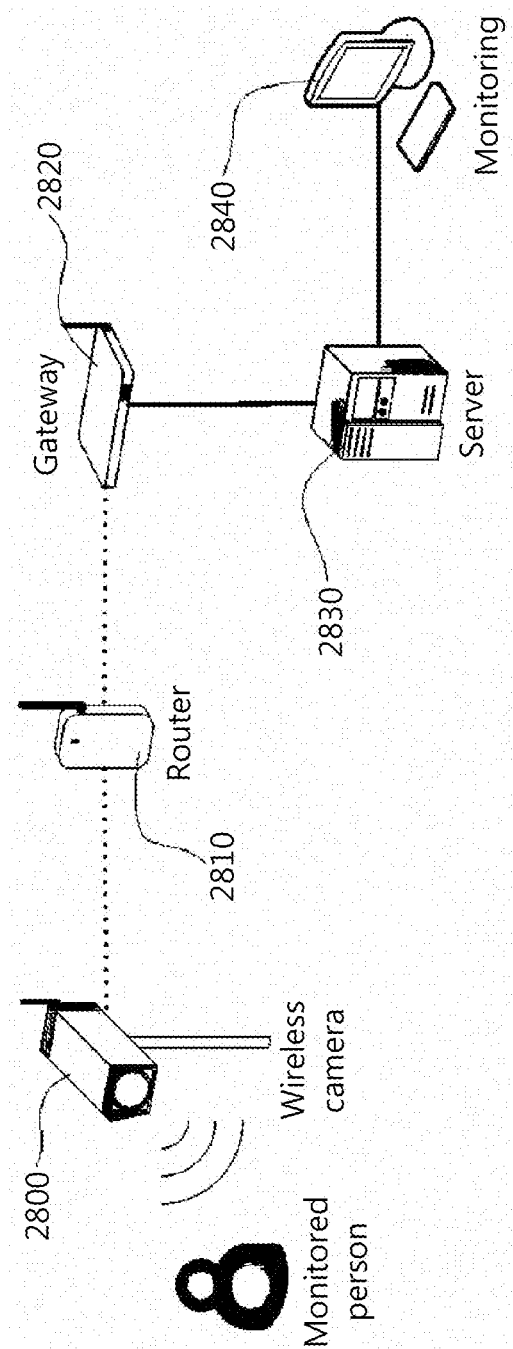
FIG. 28 is a conceptual view illustrating a monitoring camera system using distributed video encoding according to an embodiment of the present invention.

Referring to FIG. 28, when a monitored person appears in a monitoring area of a camera 2800, a movement is sensed by an operating sensor mounted in a low power wireless camera, and the camera operates immediately. In this case, information captured by the camera is compressed such that it can be transmitted in a wireless sensor network, and the compressed data is delivered to a gateway 2820 through the wireless sensor network. Image data transmitted to the gateway 2820 is transmitted to a server 2830 through Ethernet, and image data transmitted to the server 2830 is shown through a monitoring system 2840.

The low power wireless camera 2800 operates in an existing sensor network, so it is required to be operated by a battery like operations of sensor nodes in an existing sensor network system. Thus, due to a limitation in power capacity, the low power wireless camera 2800 is basically configured to operate with low power. However, an image is basically required to be continuously captured, so an operation monitoring sensor is mounted in the camera 2800, and only when a movement is sensed in a monitoring area, the camera 2800 is operated, thus minimizing power consumption.

The camera 2800 includes a distributed video encoding apparatus capable of performing distributed video coding, and the distributed video encoding apparatus may encode an image captured through the camera through distributed video coding.

The low power wireless camera 2800 may include a battery, a MCU (Micro Controller Unit), a movement sensor, a distributed video encoding apparatus, and a wireless communication module.

The operating sensor may be installed on a front portion of the wireless camera 2800 to sense a movement of a person in an area desired to be monitored. Here, a sensed signal is provided to the MCU. The camera 2800 serves to capture an image of the monitored area. According to a signal transferred to the MCU after a movement is sensed by the operating sensor, the MCU applies power to the camera 2800 and starts to capture images. When a movement is not sensed for more than a certain period of time, the image capturing is terminated. The distributed encoding apparatus may encode images captured through the wireless camera 2800 through distributed video coding.

By using a bandwidth of 1M or smaller, a radio signal is compressed to be smaller than the level. The MCU controls the battery and the wireless communication module. Upon receiving information regarding whether or not a movement has been sensed from the operating sensor, the MCU serves to determine whether to operate each unit and apply power. The wireless communication module wirelessly transmits an image distributed-video-encoded by the distributed video encoding apparatus, and handles communication with the wireless sensor network. The battery serves to supply power to each element under the control of the MCU.

The foregoing scheme may also be used for monitoring indoor areas of a house by using a wireless camera that encodes an image captured by using distributed video coding. For example, the foregoing scheme may be used in a baby monitoring system.

Figure 29:
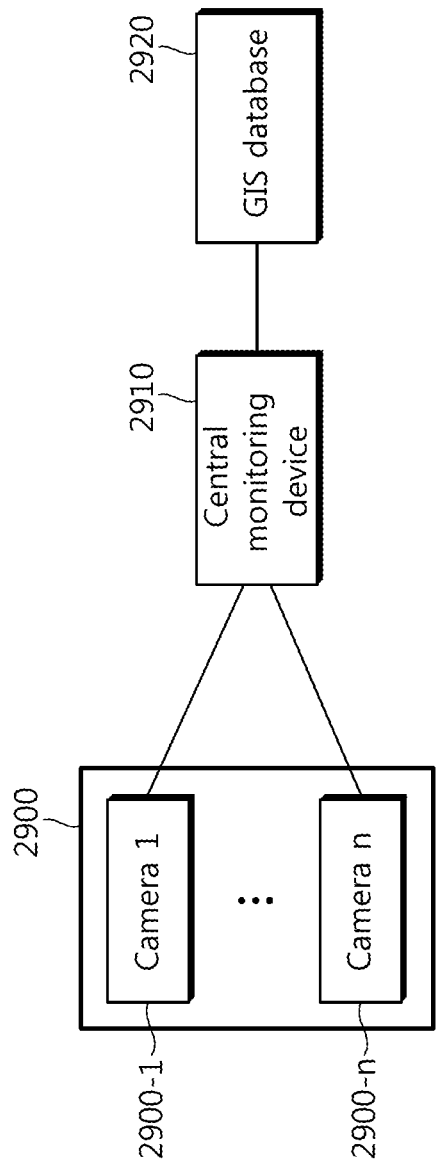
FIG. 29 is a conceptual view of a monitoring system using a plurality of cameras according to an embodiment of the present invention.

FIG. 29 is a conceptual view of a monitoring system using a plurality of cameras according to an embodiment of the present invention.

Referring to FIG. 29, a monitoring system using a plurality of cameras 2900 may generate 3D data by using the plurality of cameras 2900.

As illustrated in FIG. 29, a monitoring system using the plurality of cameras 2900 includes a plurality of cameras 2900 installed in a monitoring target area and a central monitoring device 2910 connected to the plurality of cameras 2900 to receive captured image data from the cameras 2900, and controlling an operation of each camera 2900.

An image captured by an image capturing unit of the plurality of cameras 2900 may be encoded through distributed video coding by using a distributed video coding unit included in the cameras 2900. Distributed video coding performed in the cameras 2900 may be performed according to the same method as described above.

The central monitoring device 2910 includes a GIS database 2920 for displaying geographical information of the monitoring target area, as 3D image data. By using an actual image captured by the camera 2900 and the 3D image data stored in the GIS database 2920, the central monitoring device 2910 in synchronization with a camera screen generates a 3D image depicting the camera screen in the form of 3D graphics, and calculates a particular point on the camera screen or a position of a monitoring target object as 3D coordinates, and based on the calculated 3D coordinate values, the plurality of cameras may interwork to capture an image of the particular point or monitoring target object.

In a method for obtaining 3D coordinates of a camera image using 3D spatial data, 3D spatial data for providing a 3D image of the monitoring target area is established. A variation of angles of view according to a change in zooming of a camera is calculated, the camera screen and the 3D image are synchronized, 3D coordinates with respect to a particular point of the actual camera screen are then calculated to obtain 3D coordinates of the camera image using 3D spatial data.

Figure 30:
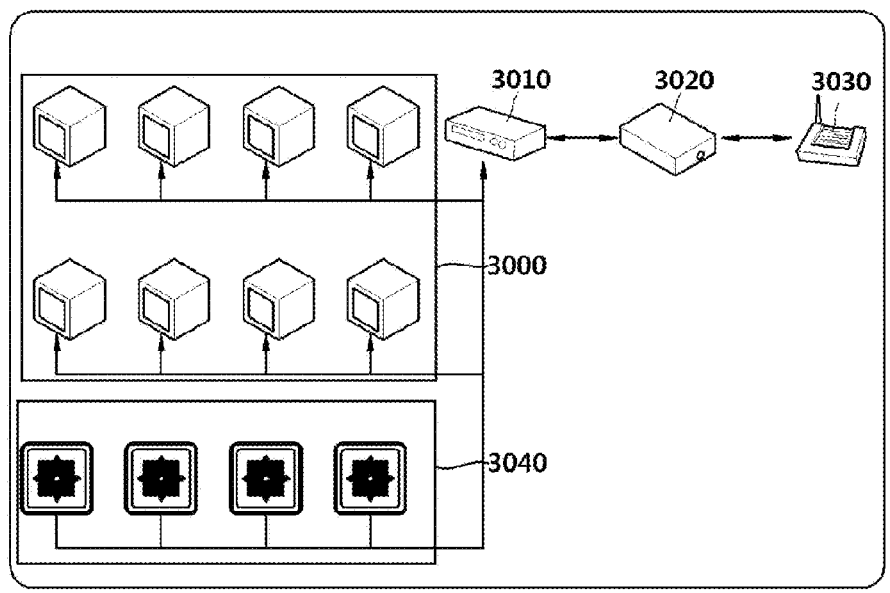
FIG. 30 is a view illustrating a forest fire sensing and ignition tracking system employing a wireless image capturing apparatus according to an embodiment of the present invention.

FIG. 30 is a view illustrating a forest fire sensing and ignition tracking system employing a wireless image capturing apparatus according to an embodiment of the present invention.

According to an embodiment of the present invention, sensing a forest fire is merely illustrative, and a configuration utilizing a wireless image capturing apparatus including a sensor other than a sensor for sensing a forest fire may also be used.

A plurality of wireless image capturing apparatuses 3000 may be installed in proper positions in a wide area such as a mountain or a national park in order to sense a forest fire and track ignition. The wireless image capturing apparatuses 3000 according to an embodiment of the present invention are wireless devices, so they can be easily installed even in a mountainous area in comparison to a general video camera or CCTV which is required to be connected through a fixed line.

The wireless image capturing apparatus 3000 may include a distributed video encoding apparatus capable of performing distributed video coding, and may encode a captured image by using distributed video coding according to an embodiment of the present invention. Image data encoded through distributed video coding may be provided to a distributed video decoding unit so as to be decoded.

Image data generated by the wireless image capturing apparatuses 300 are collected by a gateway 3010 and sent to a monitoring person (or a guard) or a surveillance center that handle sensing a forest fire and ignition tracking through a communication network by way of a line sharer 3020 and a communication modem 3030.

Data regarding an installation spot of individual wireless image capturing apparatus 3000 is secured, so the surveillance center can accurately know an image captured spot. Thus, by using unique numbers assigned to the individual wireless image apparatuses 3000 and matching tables at the installation spots, a state of the place illuminated by the wireless image capturing apparatuses 3000 can be clearly recognized. For example, when a missing person appears to be seen by the wireless image capturing apparatus 3000, a location of the missing person can be accurately recognized. A surveillance server (not shown) of the surveillance center, periodically receiving images generated by the wireless image capturing apparatuses 3000, may determine a fire outbreak through a change in images.

A fire sensor may sense a fire from a CCTV or a thermal vision camera, or may sense a fire according to a sensing signal from a fire sensor 3040. Alternatively, the fire sensor may be positioned in the surveillance sensor to determine a fire.

In order to easily sense a fire outbreak, a plurality of fire sensors 3040 may be employed. As the fire sensors 3040, sensors for sensing temperature, smoke, or a flame may be used, but the present invention is not necessarily limited thereto and any sensor may be used as long as it can sense a fire. Also, a fire sensor that may sense one or more of temperature, smoke, and a flame complexly may also be used.

The fire sensors 3040 may be installed separately from the wireless image capturing apparatuses 3000 or may be installed to be combined with the wireless image capturing apparatuses 3000. A fire sensing signal may be transmitted to the surveillance server of the surveillance center, and in addition, information regarding a location of the fire sensor may also be transmitted together to allow for easy recognition as to where a fire broke out.

When a fire is sensed by the fire sensors 3040, the surveillance server of the surveillance center may recognize a location where a fire broke out, and when the location is recognized, all the neighboring wireless image capturing apparatuses 3000 may be selectively fixed in position to capture images of the spot of the fire. Accordingly, a great deal of image data of the fire spot can be obtained.

Figure 31:
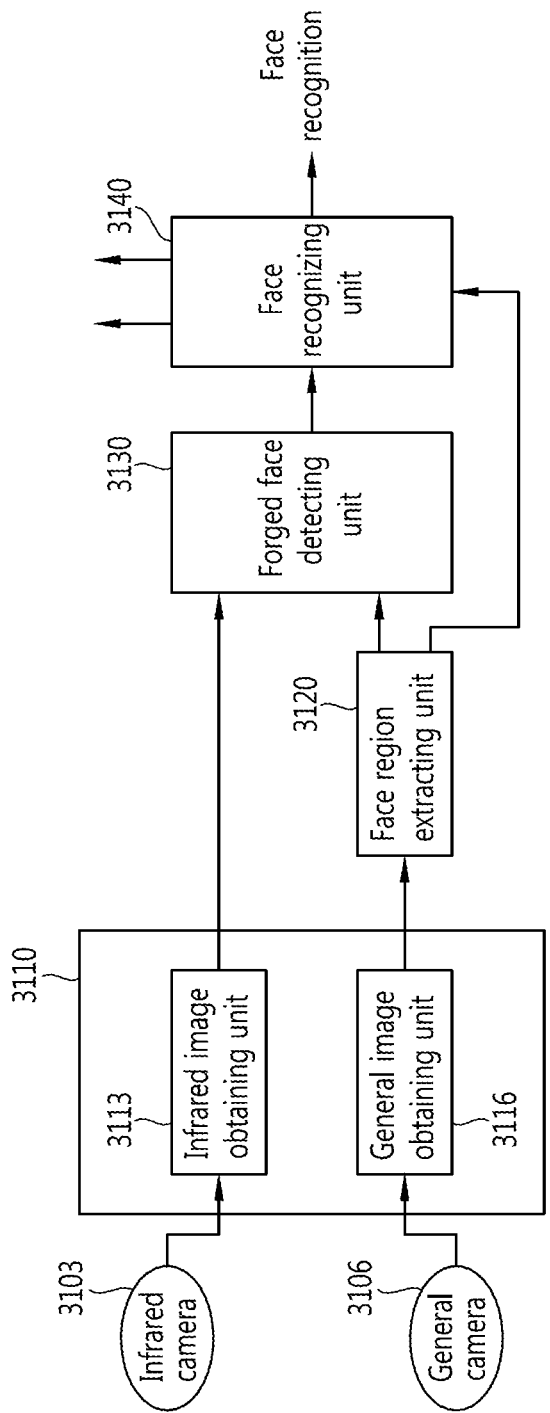
FIG. 31 is a conceptual view illustrating a face detection system using a plurality of cameras according to an embodiment of the present invention.

FIG. 31 is a conceptual view illustrating a face detection system using a plurality of cameras according to an embodiment of the present invention.

FIG. 31 is a block diagram of a forged face detecting apparatus using an infrared image according to an embodiment of the present invention. The forged face detecting apparatus includes an image obtaining unit 3110, a face region extracting unit 3120, a forged face detecting unit 3130, and a face recognizing unit 3140.

The image obtaining unit 3110 includes an infrared image obtaining unit 3113 and a general image obtaining unit 3116. The infrared image obtaining unit 3113 obtains an infrared image captured by an infrared camera 3103 and provides the obtained image to the forged face detecting unit 3130. The general I mage obtaining unit 3116 obtains a general I mage captured by a general camera 3106 and provides the obtained image to the face region extracting unit 3120.

The infrared camera 3103 and the general camera 3106 may include a distributed video coding unit and perform distributed video coding by using the distributed video coding unit. Data distributed-video-encoded by the infrared camera 3103 and the general camera 3106 is wirelessly transmitted to a particular server, and the server may check whether or not the received data is related to the person himself.

The face region extracting unit 3120 extracts a face region from the general image input from the general image obtaining unit 3116 by using a component-based technique using an image processing technique or a pattern recognition technique of Adaboost or SVM (Support Vector Machine).

The forged face detecting unit 3130 includes a face image evaluating unit for evaluating picture quality characteristics of an infrared image, a face presence/absence discriminating unit, and an eyeball characteristics analyzing unit. The face image evaluating unit evaluates picture quality of an infrared image consistent with an input face region upon being extracted by the face region extracting unit 3120 by using a technique of sharpness, and when sharpness of the infrared image is lower than that of the face region according to the evaluation results, the face image evaluating unit detects that it is a forged face and provides the detection results of the forged face to the face recognizing unit 3140. Meanwhile, when the face region and the infrared image are identical, the face region extracting unit 3120 detects that it is not a forged face, and provides the detection results to the face recognizing unit 3140.

In case of an infrared image with respect to photo or a forged face, the face presence/absence discriminating unit discriminates a face presence/absence by using a technique of Adaboost or SVM with respect to a face region input upon being extracted by the face region extracting unit 3120 based on the characteristics of an infrared image that the facial features are not visualized. According to the discrimination results, when a face is absent, the face presence/absence discriminating unit detects that it is a forged face, and provides the detection results that it is a forged face to the face recognizing unit 3140, and according to the discrimination results, when a face is present, the face presence/absence discriminating unit detects that it is not a forged face, and provides the detection results that it is not a forged face to the face recognizing unit 3140.

The eyeball characteristics analyzing unit detects eyeball regions from actual infrared images of respective users in advance and previously set them. Thereafter, the eyeball characteristics analyzing unit analyzes the pre-set eyeball regions and eye regions of infrared images input from the infrared image obtaining unit 3113. When the pre-set eyeball region and the eyeball region of the infrared image are not identical according to the analysis results, the eyeball characteristics analyzing unit detects that it is a forged face, and provides the corresponding detection results to the face recognizing unit 3140. Meanwhile, when a certain eyeball region of the pre-set eyeball regions and an eyeball region of an infrared image are identical according to the analysis results, the eyeball characteristics analyzing unit detects that it is not a forged face, and provides the corresponding detection results to the face recognizing unit 3140.

According to the evaluation results, the discrimination results, and the analysis results that it is not a forged face input from the forged face detecting unit 3130, the face recognizing unit 3140 performs face recognition on a face region input from the face region extracting unit 3120. Meanwhile, according to the evaluation results, the discrimination results, and the analysis results that it is a forged face input from the forged face detecting unit 3130, the face recognizing unit 3140 does not perform face recognition or provides control to attempt re-imaging through the infrared camera 3103 and the general camera 3106.

Thus, in an embodiment of the present invention, face images are captured by using both the infrared and visible light cameras, and the characteristics of the input infrared image are analyzed to detect whether or not it is a forged face, and when it is not a forged face, user authentication is performed by using the general image captured by the visible light camera, whereby various problems such as the difficulty in discriminating actual face information and forged face information by using a general face recognition method and the limitation of using high-priced equipment, and user inconvenience, and the like, can be solved.

Embodiments in FIGS. 24 to 31 show some of embodiments in which the distributed video coding is used according to embodiments of the present invention, and when the foregoing distributed video coding according to embodiments of the present invention is used, the present invention may be utilized in various forms without being limited to the foregoing embodiments.

FIG. 32 is a conceptual view illustrating a distributed video encoding apparatus including a plurality of distributed video coding units according to an embodiment of the present invention.

Referring to FIG. 32, a distributed video encoding apparatus 3200 may include a plurality of distributed video coding units 3200-1, 3200-2, . . . , 3200-n, and a distributed video decoding apparatus 3210 may include a plurality of distributed video decoding units 3210-1, 3210-2, . . . , 3210-n.

The distributed video coding units 3200-1, 3200-2, . . . , 3200-n and the distributed video decoding units 3210-1, 3210-2, . . . , 3210-n are illustrated as individual elements for the description purpose, but the plurality of distributed video coding units 3200 and the plurality of distributed video decoding units 3210 may be integrally configured to share some elements thereof.

Also, respective coding units are all illustrated as coding units for performing distributed video coding for the description purpose, but, besides the plurality of distributed video coding units, a general coding unit that does not perform distributed video coding may be used.

The respective distributed video coding units 3200 and the distributed video decoding units 3210 may have the configuration of the distributed video coding units as described above.

Namely, the distributed video coding units 3200 may include the key frame coding unit, the quantization unit, the block unitizing unit, and the channel coding unit, i.e., the foregoing elements, and also, the distributed video coding units 3200 may include elements such as the motion compensation unit, a first transform unit, a quantization controller, a second transform unit, a motion prediction unit, a channel monitor unit, and the like, as additional elements.

Similarly, the distributed video decoding units 3210 may include the key frame decoding unit, the side information generating unit, the channel decoding unit, and the image reconstruction unit, as the foregoing elements, and additionally includes a picture buffer, a motion vector generating unit, a first coding unit, and a second coding unit, While the present invention has been shown and described in connection with the embodiments, it will be apparent to those skilled in the art that modifications and variations can be made without departing from the spirit and scope of the invention as defined by the appended claims.

The invention claimed is:

1. A distributed video decoding apparatus using variable block motion prediction, comprising:
    a key frame decoding unit configured to reconstruct a key frame transmitted from a key frame coding apparatus;
    a motion vector generating unit configured to determine a size of a block for performing motion prediction using the reconstructed key frame to generate a motion vector, and configured to output the generated motion vector;
    a side information generating unit configured to generate side information by using the reconstructed key frame and the generated motion vector;
    a channel code decoding unit configured to estimate a quantized value by using a parity bit transmitted from a distributed video encoding apparatus and the side information; and
    an image reconstruction unit configured to reconstruct a current frame as a target of distributed video decoding based on the quantized value estimated by the channel decoding unit and the side information;
    wherein the motion vector generating unit is configured to determine a plurality of blocks having different block sizes for the purpose of motion prediction of the side information, obtain motion vectors between the reconstructed key frames based on the determined blocks, and select a motion vector among the obtained motion vectors according to a predetermined criteria; and
    wherein the motion vector generating unit comprises:
        a block size determining unit configured to determine a plurality of block sizes for the purpose of motion prediction using the reconstructed key frame,
        a motion prediction performing unit configured to search for a region of another key frame among the reconstructed key frames in order to discover a region congruent with a first block of one key frame among the reconstructed key frames, to thus find a second block most congruent with the first block, and configured to generate a motion vector as a difference value between the first block and the second block, with respect to each of the plurality of block sizes,
        a motion vector storage unit configured to store the motion vectors generated by the motion prediction performing unit, and
        a motion vector selecting unit configured to measure similarity between a first block of one key picture and a second block of another key picture among the motion vectors, and configured to select a motion vector for a block size corresponding to the highest similarity.

2. The distributed video decoding apparatus of claim 1, wherein the motion vector selecting unit measures the similarity by using any one of the sum of absolute difference (SAD), a mean absolute difference (MAD), and the sum of square difference (SSD) between the first block and the second block.

3. The distributed video decoding apparatus of claim 1, wherein the block size for performing the motion prediction is at least one of 16×16, 16×8, 8×16, 8×8, 8×4, 4×8, and 4×4 block sizes.

4. The distributed video decoding apparatus of claim 3, wherein the block size for performing the motion prediction is determined upon determining a change in a motion between the reconstructed key frames.

5. The distributed video decoding apparatus of claim 4, wherein when there is a little change in the motion between the reconstructed key frames, the block size determining unit determines a block size for performing the motion prediction by at least one of the 16×16, 16×8, and 8×16 block sizes.

6. The distributed video decoding apparatus of claim 4, wherein when there is a significant change in the motion between the reconstructed key frames, the block size determining unit determines a block size for performing the motion prediction by at least one of the 8×8, 8×4, 4×8, and 4×4 block sizes.

7. A distributed video decoding method using variable block motion prediction, comprising:
    reconstructing a key frame transmitted from a key frame decoding apparatus;
    determining a block size for performing motion prediction using the reconstructed key frame to generate a motion vector;
    generating side information by using the reconstructed key frame and the generated motion vector;
    estimating a quantized value by using a parity bit transmitted from a distributed video encoding apparatus and the side information; and
    reconstructing a current frame as a target of distributed video decoding by using the estimated quantized value and the side information;
    wherein the generating of a motion vector, by determining a block size for performing motion prediction using the reconstructed key frame comprises:
        determining a plurality of blocks having different sizes for the purpose of motion prediction of the side information,
        obtaining motion vectors between the reconstructed key frames based on the plurality of determined blocks, and
        selecting a motion vector among the obtained motion vectors according to a predetermined criteria; and
    wherein the obtaining of motion vectors between the reconstructed key frames based on the plurality of determined blocks comprises:

searching for a region of another key frame among the reconstructed key frames in order to discover a region congruent with a first block of one key frame among the reconstructed key frames, to thus find a second block most congruent with the first block, and generating a motion vector as a difference value between the first block and the second block with respect to each of the plurality of block sizes.

8. The method of claim 7, wherein the selecting of a motion vector among the obtained motion vectors based on the predetermined criteria comprises:

measuring similarity between the first block of one key frame among the reconstructed key frames and the second block of another key frame among the reconstructed key frames with respect to the respective motion vectors; and selecting a motion vector between the first block and the second block having the highest similarity among similarities measured for the respective motion vectors between first blocks and second blocks.

9. The method of claim 8, wherein the similarity is measured by using any one of the sum of absolute difference (SAD), a mean absolute difference (MAD), and the sum of square difference (SSD) between the first block and the second block.

10. The method of claim 7, wherein the block size for performing the motion prediction is at least one of 16—16, 16×8, 8×16, 8×8, 8×4, 4×8, and 4×4 block sizes.

11. The method of claim 10, wherein the block size for performing the motion prediction is determined upon determining a change in a motion between the reconstructed key frames.

12. The method of claim 11, wherein when there is a little change in the motion between the reconstructed key frames, the block size determining unit determines a block size for performing the motion prediction by at least one of the 16×16, 16×8, and 8—16 block sizes.

13. The method of claim 11, wherein when there is a significant change in the motion between the reconstructed key frames, the block size determining unit determines a block size for performing the motion prediction by at least one of the 8×8, 8×4, 4×8, and 4×4 block sizes.

14. A distributed video decoding apparatus comprising:
a decoding unit configured to decode a encoded first frame;
a side information generating unit configured to generate a motion vector based on the at least one decoded first frame, and provide the generated motion vector to an encoding apparatus, and configured to generate side information corresponding to a second frame by using the motion vector;
a transform unit configured to transform the generated side information;
a channel decoding unit configured to correct the side information based on the transformed side information and a parity bit provided from the encoding apparatus; and
a dequantization unit configured to dequantize the corrected side information to reconstruct the second frame;
wherein the side information generating unit is configured to determine a plurality of blocks having different block sizes for the purpose of motion prediction of the side information, obtain motion vectors between the reconstructed key frames based on the determined blocks, and select a motion vector among the obtained motion vectors according to a predetermined criteria; and wherein the side information generating unit comprises:
a block size determining unit configured to determine a plurality of block sizes for the purpose of motion prediction using the reconstructed key frame,
a motion prediction performing unit configured to search for a region of another key frame among the reconstructed key frames in order to discover a region congruent with a first block of one key frame among the reconstructed key frames, to thus find a second block most congruent with the first block, and configured to generate a motion vector as a difference value between the first block and the second block, with respect to each of the plurality of block sizes,
a motion vector storage unit configured to store the motion vectors generated by the motion prediction performing unit, and
a motion vector selecting unit configured to measure similarity between a first block of one key picture and a second block of another key picture among the motion vectors, and configured to select a motion vector for a block size corresponding to the highest similarity.

15. A transcoding apparatus comprising:
a decoding unit configured to decode a encoded first frame;
a side information generating unit configured to generate a motion vector based on the at least one decoded first frame, and provide the generated motion vector to an encoding apparatus, and configured to generate side information corresponding to a second frame by using the motion vector;
a transform unit configured to transform the generated side information;
a channel decoding unit configured to correct the side information based on the transformed side information and a parity bit provided from the encoding apparatus;
a dequantization unit configured to dequantize the corrected side information to reconstruct the second frame; and
a encoding unit configured to encode the reconstructed second frame;
wherein the side information generating unit is configured to determine a plurality of blocks having different block sizes for the purpose of motion prediction of the side information, obtain motion vectors between the reconstructed key frames based on the determined blocks, and select a motion vector among the obtained motion vectors according to a predetermined criteria; and
wherein the side information generating unit comprises:
a block size determining unit configured to determine a plurality of block sizes for the purpose of motion prediction using the reconstructed key frame,
a motion prediction performing unit configured to search for a region of another key frame among the reconstructed key frames in order to discover a region congruent with a first block of one key frame among the reconstructed key frames, to thus find a second block most congruent with the first block, and configured to generate a motion vector as a difference value between the first block and the second block, with respect to each of the plurality of block sizes,
a motion vector storage unit configured to store the motion vectors generated by the motion prediction performing unit, and
a motion vector selecting unit configured to measure similarity between a first block of one key picture and a second block of another key picture among the motion vectors, and configured to select a motion vector for a block size corresponding to the highest similarity.

16. The transcoding apparatus of claim 15, wherein the encoding unit encodes the reconstructed second frame and the first frame decoded by the decoding unit.

17. The transcoding apparatus of claim 15, wherein the encoding unit comprises:
- a first coding unit configured to encode the reconstructed second frame; and
- a second coding unit configured to encode the first frame decoded by the decoding unit.

18. A distributed video decoding method comprising:
- reconstructing a channel loss by channel-decoding provided second encoded data;
- reconstructing a first frame by decoding provided first encoded data;
- generating side information by performing motion prediction on the reconstructed first frame based on a provided motion vector and information regarding the number of motion prediction performing steps;
- correcting the generated side information by using a parity bit; and
- dequantizing the corrected side information to reconstruct a second frame;

wherein generating of a motion vector, by determining a block size for performing motion prediction using the reconstructed key frame comprises:
- determining a plurality of blocks having different sizes for the purpose of motion prediction of the side information,
- obtaining motion vectors between the reconstructed key frames based on the plurality of determined blocks, and
- selecting a motion vector among the obtained motion vectors according to a predetermined criteria; and wherein obtaining of motion vectors between the reconstructed key frames based on the plurality of determined blocks comprises:
- searching for a region of another key frame among the reconstructed key frames in order to discover a region congruent with a first block of one key frame among the reconstructed key frames, to thus find a second block most congruent with the first block, and
- generating a motion vector as a difference value between the first block and the second block with respect to each of the plurality of block sizes.

* * * * *